(12) United States Patent
Smith et al.

(10) Patent No.: US 11,827,647 B2
(45) Date of Patent: Nov. 28, 2023

(54) BRANCHED METAL-ORGANIC FRAMEWORK NANOPARTICLES IN MIXED-MATRIX MEMBRANES AND ASSOCIATED METHODS

(71) Applicants: Massachusetts Institute of Technology, Cambridge, MA (US); Aramco Services Company, Houston, TX (US)

(72) Inventors: Zachary Smith, Belmont, MA (US); Lucas Chi, Cambridge, MA (US); Benjamin James Sundell, Cambridge, MA (US); Ke Zhang, Cambridge, MA (US); Steven C. Hayden, Houston, TX (US); Daniel J. Harrigan, Cambridge, MA (US); Hyunhee Lee, Cambridge, MA (US)

(73) Assignees: Massachusetts Institute of Technology, Cambridge, MA (US); Aramco Services Company, Houston, TX (US)

(*) Notice: Subject to any disclaimer, the term of this patent is extended or adjusted under 35 U.S.C. 154(b) by 0 days.

(21) Appl. No.: 17/251,129

(22) PCT Filed: Jun. 11, 2019

(86) PCT No.: PCT/US2019/036577
§ 371 (c)(1),
(2) Date: Dec. 10, 2020

(87) PCT Pub. No.: WO2019/241268
PCT Pub. Date: Dec. 19, 2019

(65) Prior Publication Data
US 2021/0129088 A1    May 6, 2021

Related U.S. Application Data

(60) Provisional application No. 62/683,516, filed on Jun. 11, 2018.

(51) Int. Cl.
*C07F 1/08*   (2006.01)
*C07F 3/06*   (2006.01)
(Continued)

(52) U.S. Cl.
CPC ............ *C07F 1/08* (2013.01); *B01D 67/0079* (2013.01); *B01D 71/028* (2013.01); *B01D 71/64* (2013.01);
(Continued)

(58) Field of Classification Search
None
See application file for complete search history.

(56) References Cited

U.S. PATENT DOCUMENTS 7,306,647 B2   12/2007   Miller et al.
7,842,827 B2   11/2010   Schubert et al.
(Continued)

FOREIGN PATENT DOCUMENTS

CN    101084052 A    12/2007
CN    102006921 A    4/2011
(Continued)

OTHER PUBLICATIONS

Lin, Rijia et al., "Polypropylene/propane selective mixed matrix membranes with grape-branched MOF/CNT filler", Journal of Materials Chemistry A, 2016, 4, pp. 6084-6090. (Year: 2016).*
(Continued)

*Primary Examiner* — Jason M Greene
(74) *Attorney, Agent, or Firm* — Wolf, Greenfield & Sacks, P.C.

(57) ABSTRACT

Compositions, devices, and methods relating to the use of mixed-matrix membranes containing metal-organic frameworks to separate gases are generally described. In some embodiments, branched nanoparticles made at least in part of metal-organic frameworks are described. In some
(Continued)

embodiments, the morphology and size of the branched nanoparticles are controlled by the presence of a chemical modulator during synthesis. In some embodiments, the branched nanoparticles are uniformly distributed in a mixed-matrix membrane. In some embodiments, the mixed-matrix membrane is configured to separate one or more gases from a gas mixture. In some embodiments, the branched nanoparticles contribute at least in part to an increase in permeability, selectivity, and/or resistance to plasticization of the mixed-matrix membrane.

19 Claims, 23 Drawing Sheets

(51) Int. Cl.
    *B01D 67/00*     (2006.01)
    *B01D 71/02*     (2006.01)
    *B01D 71/64*     (2006.01)
    *B01D 53/22*     (2006.01)
    *B01D 69/14*     (2006.01)
    *B82Y 30/00*     (2011.01)
    *B82Y 40/00*     (2011.01)

(52) U.S. Cl.
    CPC .............. *C07F 3/06* (2013.01); *B01D 53/228* (2013.01); *B01D 69/148* (2013.01); *B82Y 30/00* (2013.01); *B82Y 40/00* (2013.01)

(56) References Cited

U.S. PATENT DOCUMENTS

| | | | |
|---|---|---|---|
| 8,142,746 B2 | 3/2012 | Reyes et al. | |
| 8,741,384 B2 | 6/2014 | Maiorano et al. | |
| 10,815,253 B2 | 10/2020 | Chen et al. | |
| 2011/0138999 A1 | 6/2011 | Willis | |
| 2012/0247328 A1 | 10/2012 | Brown et al. | |
| 2015/0101986 A1* | 4/2015 | Odeh ..................... | B01D 71/64 96/10 |
| 2016/0030893 A1* | 2/2016 | Lind ................... | B01D 67/0079 210/500.25 |
| 2016/0367948 A1* | 12/2016 | Song ..................... | B01D 69/148 |
| 2017/0203261 A1 | 7/2017 | Eddaoudi et al. | |
| 2017/0252720 A1 | 9/2017 | Odeh et al. | |
| 2018/0147513 A1 | 5/2018 | Ho et al. | |
| 2019/0152995 A1 | 5/2019 | Gunasekaran et al. | |
| 2019/0168173 A1* | 6/2019 | Tsapatsis ............. | B01D 71/028 |
| 2019/0247804 A1* | 8/2019 | Long ...................... | B01D 71/64 |
| 2021/0130372 A1 | 5/2021 | Smith et al. | |

FOREIGN PATENT DOCUMENTS

| | | |
|---|---|---|
| CN | 104959115 A | 10/2015 |
| CN | 105985362 A | 10/2016 |
| CN | 108079799 A | 5/2018 |
| CN | 201980038276 | 1/2023 |
| JP | 2014-523898 A | 1/2013 |
| JP | 2014-028792 A | 2/2014 |
| JP | 2015-519299 A | 7/2015 |
| JP | 2016-108342 A | 6/2016 |
| JP | 2017-501862 A | 1/2017 |
| WO | WO 2013/005160 A1 | 1/2013 |
| WO | WO 2013/148975 A2 | 10/2013 |
| WO | WO 2015/095044 A1 | 6/2015 |
| WO | WO 2017/078875 A1 | 5/2017 |
| WO | WO 2017/087422 A1 | 5/2017 |
| WO | WO 2020/018897 | 1/2020 |

OTHER PUBLICATIONS

Extended European Search Report for Application EP 19818708. dated Apr. 26, 2022. (Year: 2022).*

EP 19818708.0, Jan. 26, 2022, Partial Supplementary European Search Report.
Extended European Search Report for European Patent Application No. 21156543.7 dated May 18, 2021.
Cravillon et al., Controlling Zeolitic Imidazolate Framework Nano- and Microcrystal Formation: Insight into Crystal Growth by Time-Resolved In Situ Static Light Scattering. Chem. Mater. 2011;23(8):2130-2141. & Supporting Information.
Diring et al., Controlled Multiscale Synthesis of Porous Coordination Polymer in Nano/Micro Regimes. Chem Mater. 2010;22(16):4531-4538.
Li et al., Controllable Synthesis of Metal-Organic Frameworks: From MOF Nanorods to Oriented MOF Membranes. Advanced Mat. Aug. 3, 2010;22(30):3322-3326.
Partial Supplementary European Search Report for EP 19818708.0 dated Jan. 26, 2022.
Chen et al., Amine-Functionalized MIL-53 Metal-Organic Framework in Polyimide Mixed Matrix Membranes for CO(2)/CH4 Separation. American Chemical Society. Incl Eng chem Res. 2012;51:6895-6906.
Lin et al., Propylene/propane selective mixed matrix membranes with grape-branched MOF/CNT filler. J Mater Chem. Jan. 1, 2016;4(16):6084-6090.
Wang et al., Interfacial Design of Mixed Matrix Membranes for Improved Gas Separation Performance. Adv Mater. May 2016;28(17):3399-405. doi: 10.1002/adma.201504982. Epub Mar. 3, 2016. PMID: 26936293.
International Search Report and Written Opinion for PCT/US2019/036577 dated Oct. 23, 2019.
International Preliminary Report on Patentability for PCT/US2019/036577 dated Dec. 24, 2020.
Al-Maythalony et al., Tuning the Interplay between Selectivity and Permeability of ZIF-7 Mixed Matrix Membranes. ACS Appl. Mater. Interfaces, 2017, 939, 33401-33407.
Lin, MOFs-based Mixed Matrix Membranes for Gas Separation. University of Queensland Australia, 2016; Chapter 2, p. 47, FIGS. 2-13 and 2-14; Chapter 5, p. 111, 117, 122-123.
PCT/US2019/036577, Oct. 23, 2019, International Search Report and Written Opinion.
PCT/US2019/036577, Dec. 24, 2020, International Preliminary Report on Patentability.
International Search Report and Written Opinion for PCT/US2019/036566, dated Aug. 22, 2019.
International Preliminary Report on Patentability for PCT/US2019/036566, dated Dec. 24, 2020.
Attfield et al., Crystal growth of nanoporous metal organic frameworks. Dalton Trans. Apr. 14, 2012;41(14):3869-78. doi: 10.1039/c2dt12006b. Epub Dec. 19, 2011.
Cai et al., Controllable Synthesis of Highly Uniform Nanosized HKUST-1 Crystals by Liquid-Solid-Solution Method. Cryst Growth Des. 2019;19:556-561.
Chi et al., Mixed-Matrix Membranes Formed from Multi-Dimensional Metal-Organic Frameworks for Enhanced Gas Transport and Plasticization Resistance. ChemSusChem. Mar. 11, 2019;12(11):2355-2360.
Chi et al., Branched HKUST-1 Mixed-Matrix Membranes for Enhanced Gas Separation Performance and Plasticization Resistance. Abstract. Approx. Apr. 10, 2018. Meeting of the North American Membrane Society.
Chuah et al., Hierarchically Structured HKUST-1 Nanocrystals for Enhanced SF6 Capture and Recovery. J Phys Chem. 2017;121:6748-6755.
Guo et al., Combining Coordination Modulation with Acid-Base Adjustment for the Control over Size of Metal-Organic Frameworks. Chem Mater. 2012;24:444-450.
Huo et al., A versatile, industrially relevant, aqueous room temperature synthesis of HKUST-1 with high space-time yield. J Mater Chem. 2013;1:15220-15223.
Kobayashi et al., Metal Nanoparticles Covered with a Metal-Organic Framework: From One-Pot Synthetic Methods to Synergistic Energy Storage and Conversion Functions. Inorg Chem. Aug. 1, 2016;55(15):7301-10. doi: 10.1021/acs.inorgchem.6b00911. Epub Jun. 20, 2016. PMID: 27322366.

(56) References Cited

OTHER PUBLICATIONS

Liu et al., Metal ion induced porous HKUST-1 nano/microcrystals with controllable morphology and size. CrystEngComm. 2016;18:4127-4132.

Liu et al., Controlled synthesis of porous coordination-polymer microcrystals with definite morphologies and sizes under mild conditions. Chemistry. Nov. 3, 2014;20(45):14783-9. doi: 10.1002/chem.201402923. Epub Sep. 15, 2014.

Liu et al., Facile fabrication and adsorption property of a nano/microporous coordination polymer with controllable size and morphology. Chem Commun (Camb). Sep. 11, 2012;48(70):8814-6. doi: 10.1039/c2cc34192a. Epub Jul. 26, 2012.

Majano et al., Scalable room-temperature conversion of copper(II) hydroxide into HKUST-1 (Cu3 (btc)2). Adv Mater. Feb. 20, 2013;25(7):1052-7. doi: 10.1002/adma.201203664. Epub Nov. 29, 2012.

Millange et al., A time-resolved diffraction study of a window of stability in the synthesis of a copper carboxylate metal-organic framework. CrystEngComm. 2011; 13:103-108.

Morris et al., Role of Modulators in Controlling the Colloidal Stability and Polydispersity of the UiO-66 Metal-Organic Framework. ACS Appl Mater Interfaces. Oct. 4, 2017;9(39):33413-33418. doi: 10.1021/acsami.7b01040. Epub May 16, 2017.

Ranft et al., Additive-mediated size control of MOF nanoparticles. CrystEngComm. 2013;15:9296.

Sundell et al., Novel membrane & materials. Abstract. Approx. Apr. 10, 2018. Meeting of the North American Membrane Society.

Usman et al., Downsizing metal-organic frameworks by bottom-up and top-down methods. NPG Asia Materials. 2020;12:58.

Wang et al., The controlled regulation of morphology and size of HKUST-1 by "coordination modulation method". Micro Meso Mat. 2013;173:181-188.

Xin et al., Effect of various alkaline agents on the size and morphology of nano-sized HKUST-1 for CO2 adsorption. RSC Adv. 2015;5:27901.

Xu et al., Surface acoustic wave (SAW)-induced synthesis of HKUST-1 with different morphologies and sizes. CrystEngComm. 2018;20:7275-7280.

Zacher et al., Nanocrystals of [Cu3(btc)2] (HKUST-1): a combined time-resolved light scattering and scanning electron microscopy study. Chemm Commun. 2009:1031-1033.

Extended European Search Report for EP Application 19818708.0 dated Apr. 26, 2022.

U.S. Office Action for U.S. Appl. No. 17/251,133 dated Jun. 20, 2022.

Altintas et al., High-Throughput Computational Screening of the Metal Organic Framework Database for CH4/H2 Separations. ACS Appl Mat. 2018;10:3668-3679.

Bao et al., 9 Energy and Environmental Science, 3612-3641 (2016) (Year: 2016).

Gross et al., Aqueous room temperature synthesis of cobalt and zinc sodalite zeolitic imidizolate frameworks. Dalton Trans. May 14, 2012;41(18):5458-60. doi: 10.1039/c2dt30174a. Epub Mar. 12, 2012. PMID: 22406684.

Hackley et al., Measuring the hydrodynamic size of nanoparticles in aqueous media using batch-mode dynamic light scattering. Methods Mol Biol. 2011;697:35-52. doi: 10.1007/978-1-60327-198-1_4. PMID: 21116952.

Hendon et al., Grand Challenges and Future Opportunities for Metal-Organic Frameworks. ACS Cent Sci. Jun. 28, 2017;3(6):554-563. doi: 10.1021/acscentsci.7b00197. Epub Jun. 6, 2017. PMID: 28691066; PMCID: PMC5492414.

Khan et al., Key Parameter Controlling the Sensitivity of Plasmonic Metal Nanoparticles: Aspect Ratio. J Phys Chem C. 2016;120:19353-19364.

Liu et al., Surface-supported metal-organic framework thin films: fabrication methods, applications, and challenges. Chem Soc Rev. 2017;46:5730-5770.

Maguire et al., Characterisation of particles in solution—a perspective on light scattering and comparative technologies. Sci Technol Adv Mater. Oct. 18, 2018;19(1):732-745. doi: 10.1080/14686996.2018.1517587. PMID: 30369998; PMCID: PMC6201793.

Murphy et al., Controlling the Aspect Ratio of Inorganic Nanorods and Nanowires. Adv. Mater. 2002;14:80-82.

Yin et al., Recent advances in post-synthetic modification of metal-organic frameworks: New types and tandem reactions. Coord. Chem. Rev. 2019;378:500-512.

Hao et al., Dynamic framework aperture adjustment template effect and application MOF materials. Jilin University. Oct. 2013; 71.

Japanese Office Action dated May 17, 2023, for Application No. JP2020-568537.

Japanese Office Action dated Apr. 26, 2023, for Application No. JP2020-568734.

Chinese Office Action dated Oct. 17, 2022, for Application No. CN201980038239.9.

U.S. Office Action dated Nov. 29, 2022, for U.S. Appl. No. 17/251,133.

Chinese Office Action dated Jan. 19, 2023, for Application No. CN2019800038276.X.

\* cited by examiner

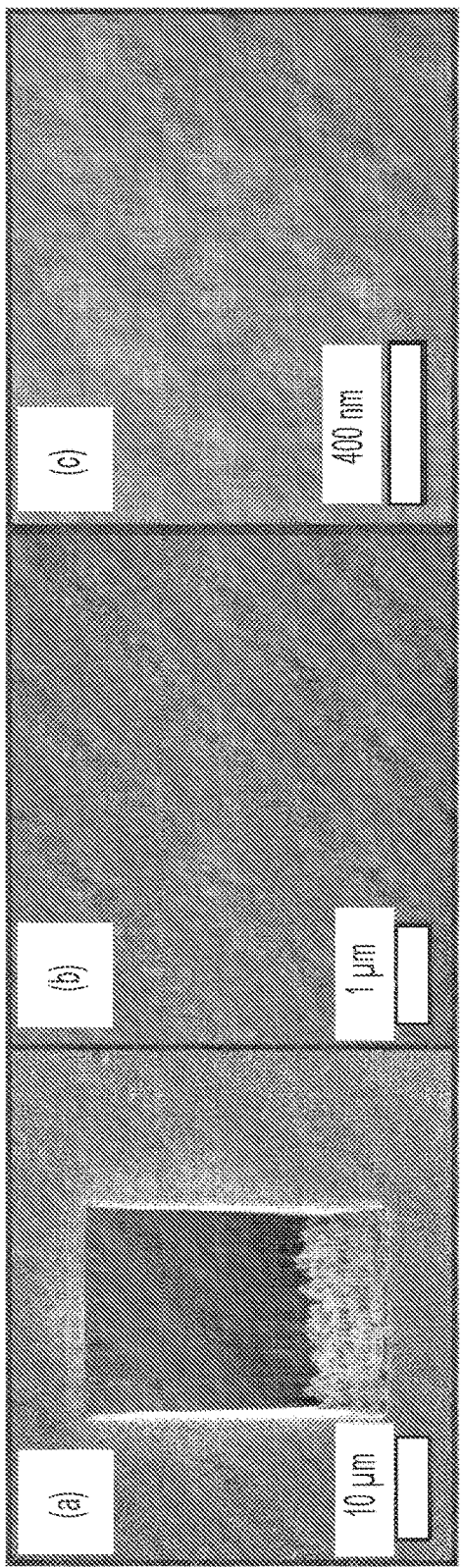
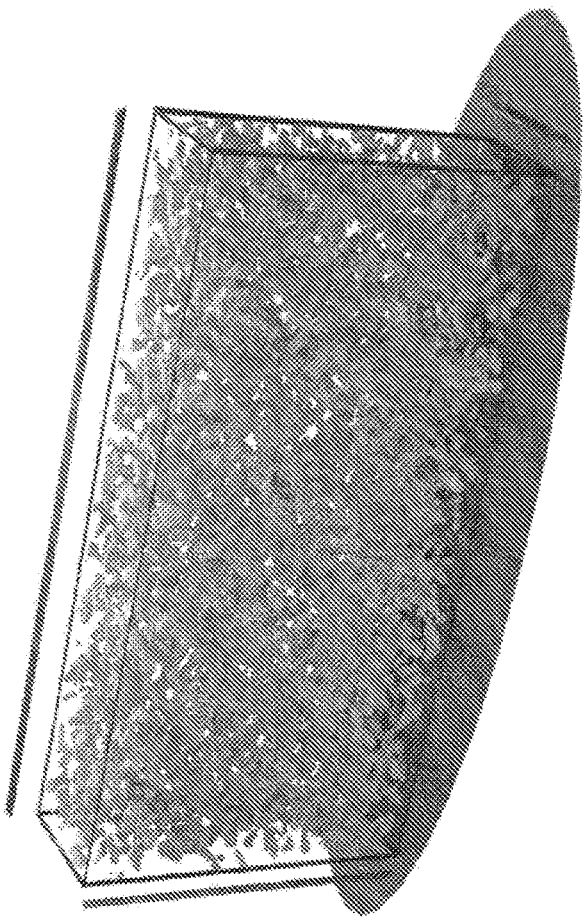
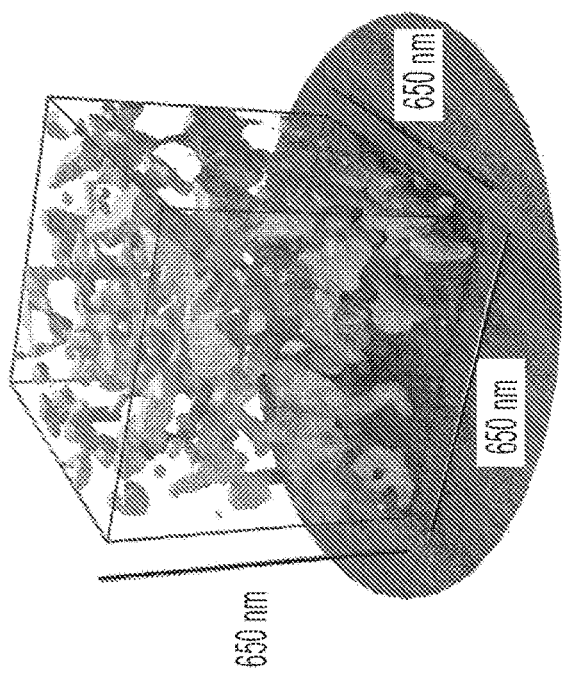
FIG. 5A  FIG. 5B  FIG. 5C  FIG. 5D  FIG. 5E

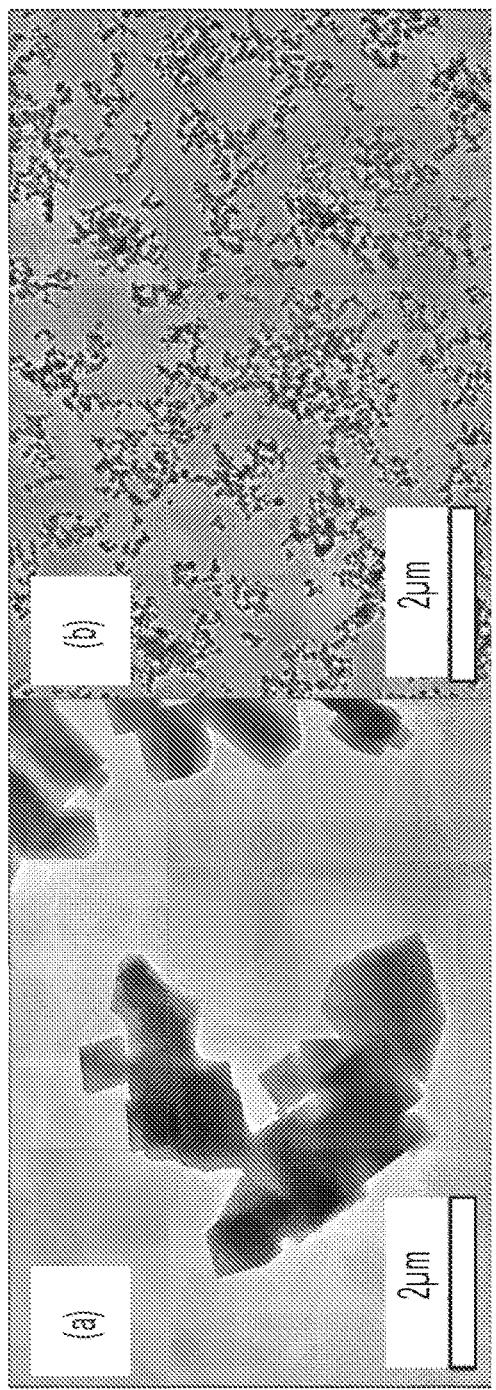
FIG. 6A
FIG. 6B
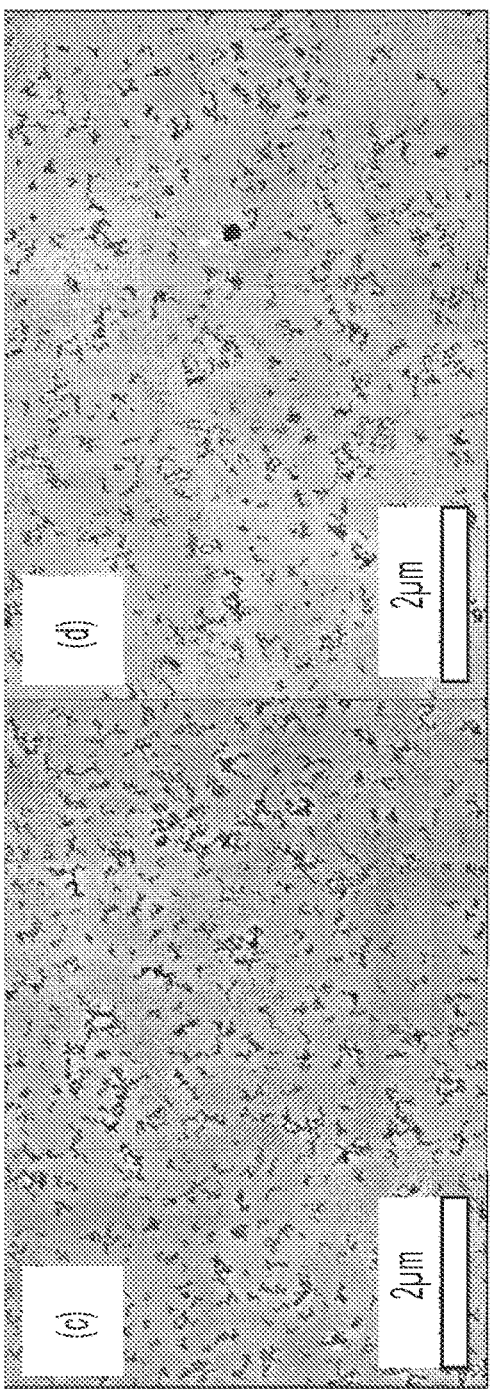
FIG. 6C
FIG. 6D

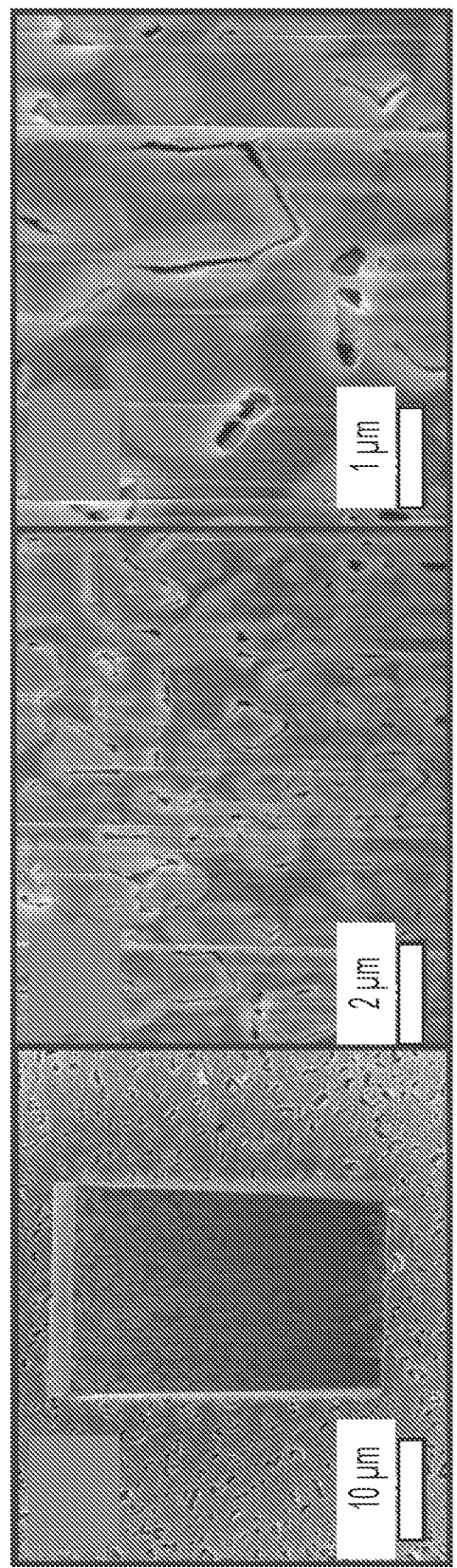

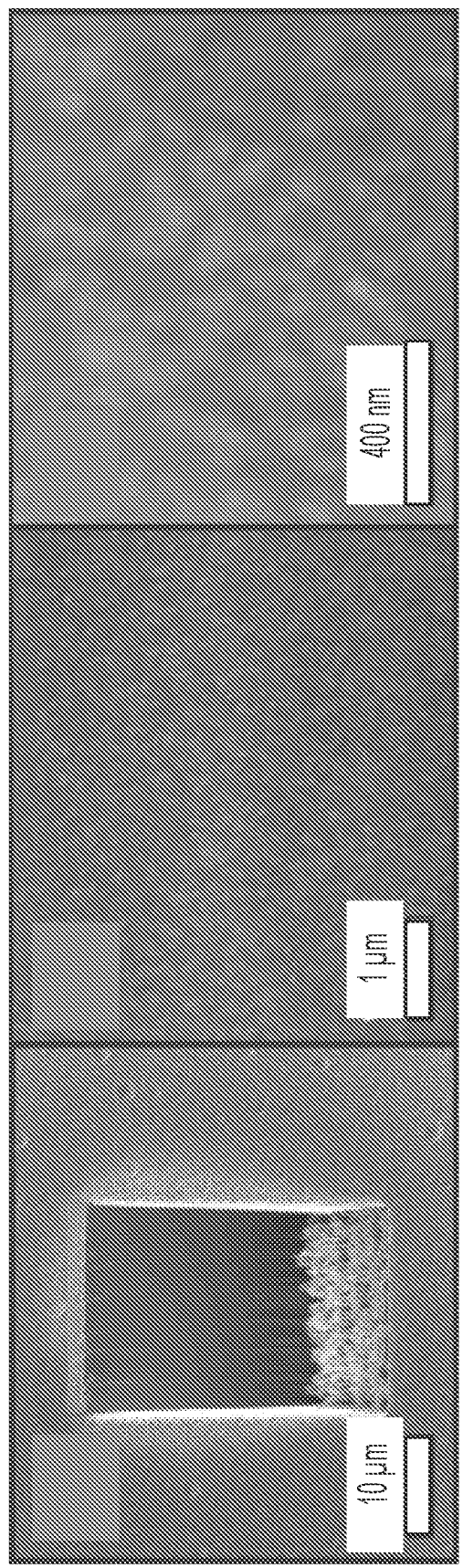

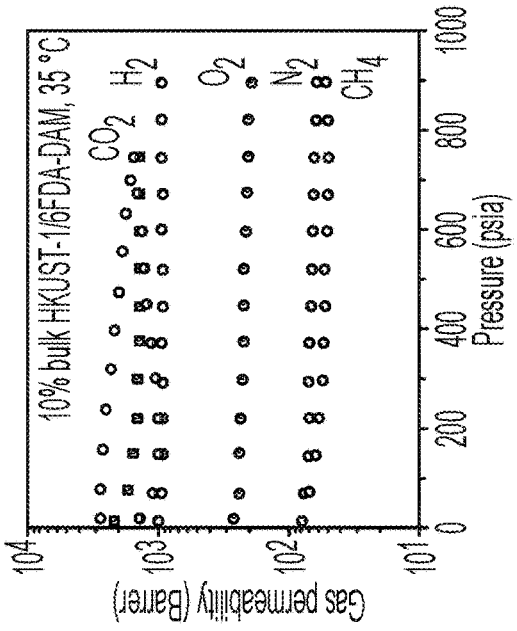
FIG. 11A
FIG. 11B
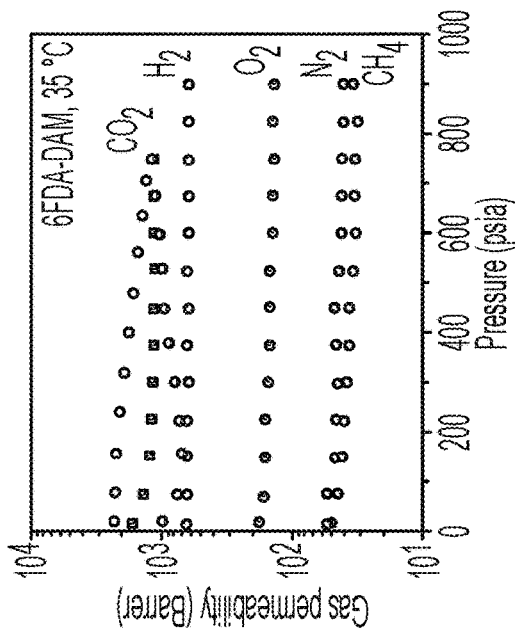
FIG. 11C
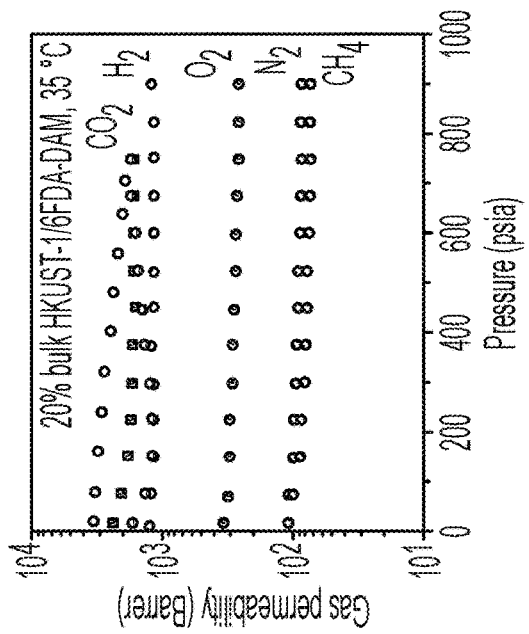
FIG. 11D

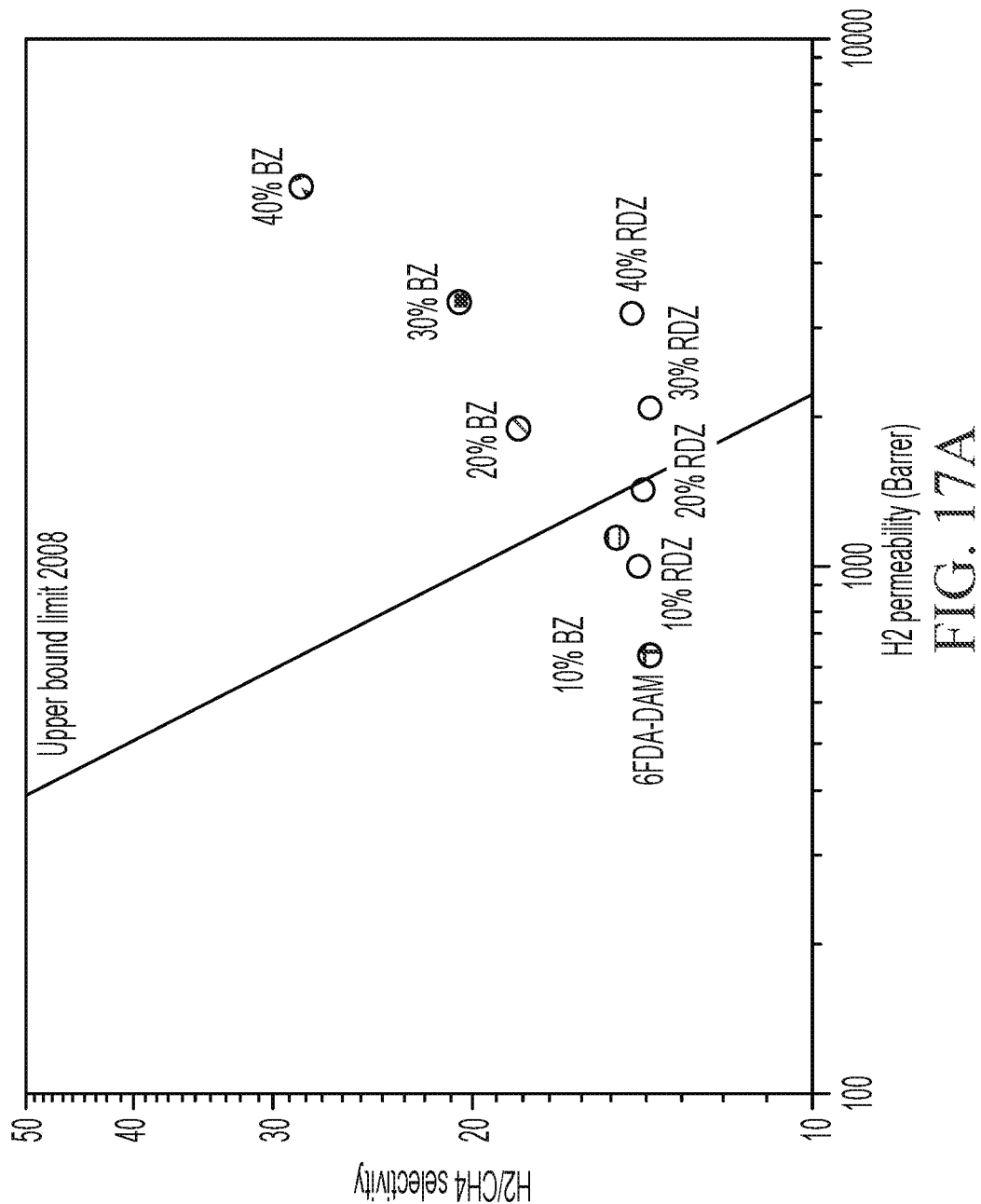

BRANCHED METAL-ORGANIC FRAMEWORK NANOPARTICLES IN MIXED-MATRIX MEMBRANES AND ASSOCIATED METHODS

CROSS-REFERENCE TO RELATED APPLICATIONS

This application is a national stage filing under 35 U.S.C. § 371 of International Patent Application Serial No. PCT/US2019/036577, filed Jun. 11, 2019, and entitled "BRANCHED METAL-ORGANIC FRAMEWORK NANOPARTICLES IN MIXED-MATRIX MEMBRANES AND ASSOCIATED METHODS," which claims the benefit under 35 U.S.C. § 119(e) of U.S. Provisional Patent Application Ser. No. 62/683,516 filed Jun. 11, 2018, and entitled "BRANCHED METAL-ORGANIC FRAMEWORK NANOPARTICLES IN MIXED-MATRIX MEMBRANES AND ASSOCIATED METHODS," each of which is incorporated herein by reference in its entirety for all purposes.

TECHNICAL FIELD

The synthesis of nanoparticles containing metal-organic frameworks and the fabrication of membranes for gas separation that include the nanoparticles are generally described.

BACKGROUND

The chemical and petrochemical industries consume approximately 30% of worldwide energy consumption and produce 16% of direct $CO_2$ emissions. Approximately half of the energy consumed comes from separations processes, most notably thermal separations such as distillation. In the realm of $CO_2$ separations, which are needed for carbon capture applications and natural gas purification, amine absorption is the dominant technology. This process is efficient, but requires a high-energy thermal regeneration cycle and the use of toxic amines. With improved materials design, membranes could significantly reduce the energy consumption and capital costs associated with absorption processes and distillation, thereby providing an energy-efficient and modular alternative to traditional unit operations.

To date, all commercial gas separation membranes are formed using polymer materials, which can be formed into large areas (1,000-500,000 $m^2$) and thin selective layers (~100 nm) that are needed for high volume separations. In contrast to these attractive processing benefits, polymeric membranes have several drawbacks. In terms of efficiency and productivity, traditional polymeric materials are often limited by a trade-off in permeability and selectivity. Additionally, polymeric membranes are often vulnerable to a detrimental process known as plasticization, which describes the swelling of chain-entangled linear polymers in the presence of strongly sorbing molecular diluents that disrupt chain packing. Plasticization often manifests itself in an increase in gas permeability but significant reductions in selectivity. Carbon dioxide is one of the most recalcitrant and prevalent participants in this behavior. Due to these drawbacks, new membrane materials are needed to enhance transport properties and reduce plasticization in real-world separation processes.

Much attention has focused on mixed-matrix membranes, which contain inorganic fillers dispersed in polymers to form composite membranes with relatively high mechanical integrity and superior separation performance while still using practical processable polymer-based systems. A variety of inorganic materials such as metal oxides, zeolites, and carbons have been incorporated into polymers to provide molecular sieving effects with pore dimensions of shapes and sizes defined specifically by the frameworks. However, these inorganic materials lack organic frameworks functionality, therefore leading to poor compatibility between the dispersed phase and the polymer. This compatibility issue results in particle agglomeration and non-selective diffusion pathways in nascent composite membranes. Metal-organic frameworks (MOFs) are an attractive platform of crystalline materials that have metal ions or metal clusters bridged by organic ligands, which provides access to various inorganic topologies, exceptionally high porosity and internal surface area, tunable pore sizes, and chemical properties based on the selection of the MOF building blocks. MOFs also possess a relatively flexible structure with a tunable pore system and better compatibility with a polymer matrix due to the partial organic composition of the framework. These features result in ease-of-incorporation of MOFs into polymers that can be preferable to other inorganic materials needed to achieve efficient gas separations.

HKUST-1 (also called Cu(BTC)) is one MOF that has been investigated for mixed-matrix membrane applications. This MOF, which is composed of $Cu^{2+}$ paddlewheel units and benzene-1,3,5-tricarboxylic acid (trimesic acid), exhibits a cubic, twisted boracite topology with two pores. These two pores have a main pore channel of 9 angstrom diameter and surrounding tetrahedral pockets of 5 angstrom diameter. One particularly intriguing aspect is that the HKUST-1 has coordinatively unsaturated (open) metal sites, which coordinate with weakly bound solvent molecules during synthesis but can be exposed through a solvent exchange and/or heating (so-called, activation) process. Once the weakly bound solvent molecules are removed, the exposed coordination vacancies at the copper metal sites possess Lewis acidity, which can strongly interact with Lewis base polar gas molecules, thereby increasing a gas sorption. For HKUST-1, the activation energy barrier for nucleation is approximately 71.6 kJ $mol^{-1}$ and the activation energy barrier for growth is approximately 63.8 kJ $mol^{-1}$. Therefore, nucleation is typically much slower than growth, which results in the formation of micron-sized particles with a broad particle size distribution compared to other MOFs that energetically favor nucleation over growth and can therefore be more easily formed into uniformly structured nanoparticles. When the typical micron-sized HKUST-1 particles are incorporated in a polymer matrix, they can phase-separate, resulting in MOF agglomerations and 'sieve-in-cage' morphology, which result in non-selective interfacial void spaces between the bulk fillers and the polymer that leads to decreased gas selectivity. Therefore, although HKUST-1 by itself has beneficial properties for gas separation, it can be challenging to form defect-free HKUST-1 mixed-matrix membranes.

SUMMARY

Compositions, devices, and methods relating to the use of mixed-matrix membranes containing metal-organic frameworks to separate gases are generally described. In some embodiments, branched nanoparticles made at least in part of metal-organic frameworks are described. In some embodiments, the morphology and size of the branched nanoparticles are controlled by the presence of a chemical modulator during synthesis. In some embodiments, the branched nanoparticles are uniformly distributed in a mixed-matrix membrane. In some embodiments, the mixed-matrix membrane is configured to separate one or more gases from a gas mixture. In some embodiments, the branched nanoparticles contribute at least in part to an increase in permeability, selectivity, and/or resistance to plasticization of the mixed-matrix membrane. The subject matter of the present invention involves, in some cases, interrelated products, alternative solutions to a particular problem, and/or a plurality of different uses of one or more systems and/or articles.

In one aspect, a device is described. In some embodiments, the device comprises a mixed-matrix membrane. In some embodiments, the mixed-matrix membrane comprises a matrix comprising a polymer, and particles, the particles comprising a metal-organic framework comprising a metal ion and a multidentate ligand. In some embodiments, the particles are uniformly distributed throughout the matrix, and convective transport is not detectable by permeation measurements.

In one aspect, a composition is described. In some embodiments, the composition comprises branched nanoparticles comprising a metal-organic framework, with the metal-organic framework comprising a metal ion and a multidentate ligand. In some embodiments, the branched nanoparticles have a hydrodynamic diameter of less than or equal to 2 µm, an aspect ratio of at least 5, and branches having a diameter of less than or equal to 200 nm. In some embodiments, the composition is constructed and arranged as a gas separation membrane.

In another aspect, a method is described. In some embodiments, the method comprises combining a metal salt comprising a metal ion, a multidentate ligand, and a chemical modulator in a liquid to form branched nanoparticles, the branched nanoparticles comprising a metal-organic framework, the metal-organic framework comprising the metal ion and the multidentate ligand. In some embodiments, the metal salt, multidentate ligand, and/or chemical modulator are selected such that the presence of at least 0.1 equivalents of the chemical modulator with respect to the concentration of the multidentate ligand increases the aspect ratio of the branched nanoparticles by at least a factor of 3 with respect to particles formed under identical conditions in the absence of the chemical modulator. In embodiments, the method further comprises combining the branched nanoparticles with a polymer to form a mixed-matrix membrane comprising a polymer network.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 5A-5E show (FIGS. 5A-5C) FIB-SEM images of a 30 wt % branched HKUST-1/6FDA-DAM MMM with different magnifications, and 3D reconstructed images from FIB-SEM tomogram (FIGS. 5D-5E), in accordance with certain embodiments;

FIGS. 6A-6D show TEM images of a series of HKUST-1 particles formed with various sodium acetate concentrations with a low magnification, in accordance with certain embodiments;

FIGS. 7A-7C include FIB-SEM images of bulk HKUST-1/6FDA-DAM mixed-matrix membranes, in accordance with certain embodiments;

FIGS. 8A-8C include FIB-SEM images of branched HKUST-1/6FDA-DAM MMMs with various HKUST-1, in accordance with certain embodiments;

FIGS. 11A-11D are charts illustrating certain gas permeabilities as a function of feed pressure, in accordance with certain embodiments;

FIGS. 17A-17D are charts showing gas separation performance of mixed-matrix membranes containing rhombic dodacahedral ZIF-8 nanoparticles (RDZ) and branched ZIF-8 nanoparticles (BZ), in accordance with certain embodiments.

DETAILED DESCRIPTION

Figures 1A, 1B:
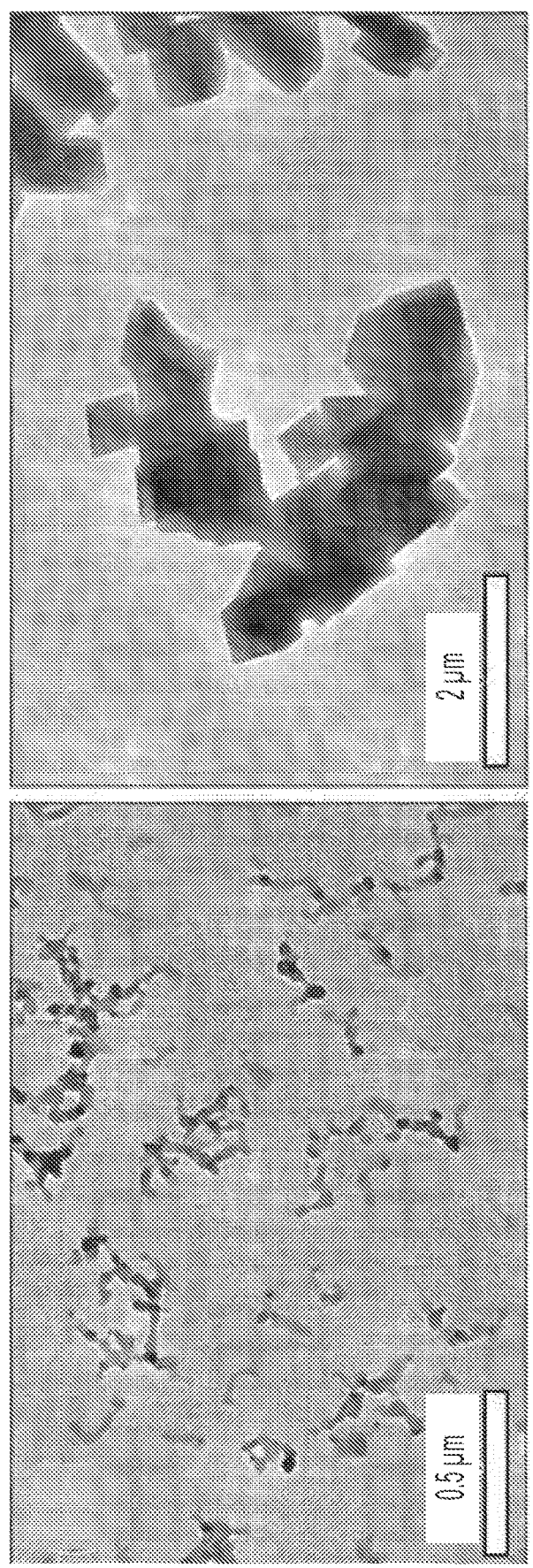
FIG. 1A-1B show transmission electron microscopy (TEM) images of (FIG. 1A) branched and (FIG. 1B) bulk HKUST-1 particles, in accordance with certain embodiments.

Compositions, devices, and methods related to the synthesis of particles and their inclusion in mixed-matrix membranes for use in gas separation applications are generally described. In some embodiments, a synthetic scheme for forming particles comprising metal-organic frameworks (MOFs) is provided. In some embodiments, the particles are branched nanoparticles. The branched nanoparticles have, in accordance with certain embodiments, a relatively high aspect ratio and a relatively low hydrodynamic radius. In some embodiments, the branched nanoparticles have an interconnected structure. In some embodiments, the branched nanoparticles have multidimensional structure. For example, the branched nanoparticles, in accordance with certain embodiments, have relatively narrow branches connected in an end-to-end manner, with the branches being non-collinear. The branched dimensions and morphology of the branched nanoparticles may contribute in part to favorable properties, such as limiting aggregation or agglomeration in suspensions in solution or forming multiple points of contacts in multi-dimensional structures. The branched nanoparticles may comprise a carboxylate-based MOF. For example, the branched nanoparticles may, in accordance with certain embodiments, comprise the MOF HKUST-1. In some embodiments, the branched nanoparticles comprise an imidazolate-based MOF. For example, in some embodiments, the branched MOF nanoparticles comprises the MOF ZIF-8.

The branched nanoparticles may, in some embodiments, be formed by combining a metal salt, a multidentate ligand, and a chemical modulator in a liquid. For example, in accordance with certain embodiments, a metal salt comprising a metal ion (e.g., copper), a multidentate ligand comprising at least two carboxylate groups (e.g., trimesic acid), and a chemical modulator comprising a carboxylate group (e.g., sodium acetate) are combined in a liquid (e.g., 100% methanol) at room temperature and 1 atm pressure to form branched nanoparticles comprising a MOF (e.g., HKUST-1). As another example, in some embodiments, a metal salt comprising a metal ion (e.g., zinc), a multidentate ligand comprising imidazolate (e.g., 2-methyl-imidazolate), and a chemical modulator comprising an amine (e.g., triethylamine) are combined in a liquid (e.g., methanol) at room temperature and 1 atm pressure to form branched nanoparticles comprising a MOF (e.g., ZIF-8). The presence of the chemical modulator and the conditions under which the metal salt and the multidentate ligand are combined may cause, in part, the high aspect ratio, the branched morphology, and/or the relatively low hydrodynamic radius of the particles. For example, in some embodiments, particles formed under identical conditions as the branched particles, but in the absence of the chemical modulator or in a different liquid, may lack the properties of the branched nanoparticles. In other words, for example, the presence of a certain amount (e.g., 0.1 equivalents with respect to the concentration of the multidentate ligand) of chemical modulator may increase the aspect ratio of the resulting particles by a factor of at least 3 with respect to particles formed under identical conditions. In some embodiments, the metal salt, multidentate ligand, and/or chemical modulator are selected such that the high aspect ratio, the branched morphology, and/or the relatively low hydrodynamic radius of the particles are achieved.

The particles may, in another aspect, be incorporated into a mixed-matrix membrane. The mixed-matrix membrane may, in some embodiments, comprise a matrix comprising a polymer. It should be understood that throughout this disclosure, the term "polymer matrix" means a matrix comprising a polymer, where the matrix is defined by the polymer, or the matrix includes the polymer and other materials. The mixed-matrix membrane may be used, in some cases, to separate gases. In some embodiments, the particles comprising MOFs are uniformly distributed throughout the polymer matrix, rather than forming void spaces or undergoing phase separation, which is commonly observed in mixed-matrix membranes comprising MOFs. In some embodiments, the uniform distribution of particles in the polymer matrix of the mixed-matrix membrane limits the extent to which convective transport of gases through the mixed-matrix membrane is observed. In some embodiments, the mixed-matrix membrane comprises branched nanoparticles comprising a MOF (e.g., HKUST-1). In some embodiments, the mixed-matrix membrane comprises branched nanoparticles comprising a MOF, where the MOF is a zeolitic imidazolate framework (e.g., a ZIF, such as ZIF-8). The branched nanoparticles may, in accordance with certain embodiments, form an at least partially percolated network within the mixed-matrix membrane. Such a percolation network may improve gas permeation. Such a percolation network may also increase selectivity, especially in mixed-gas conditions where competitive adsorption may influence the selectivity. For example, a mixed-membrane network comprising a percolated network made of branched nanoparticles of HKUST-1 may show increased selectivity with respect to a mixed-membrane network comprising HKUST-1 particles that do not form a percolation network. As another example, a mixed-matrix membrane network comprising a percolated network made of branched nanoparticles of ZIF-8 may show increased selectivity with respect to a mixed-membrane network comprising ZIF-8 particles that do not form a percolation network. In some embodiments, the branched nanoparticles may form multiple points of contact with polymers within the polymer matrix. These multiple points of contain may improve the durability and structural integrity of the mixed-matrix membrane and limit the degree to which the mixed-matrix membrane undergoes plasticization upon adsorption of certain gases. For example, in some embodiments, a mixed-matrix membrane comprising branched nanoparticles has a plasticization pressure point with respect to a gas (e.g., $CO_2$) that is relatively high compared to the plasticization pressure point of a membrane made of the same polymer but lacking the branched nanoparticles.

Certain embodiments are related to compositions. In some embodiments, the composition comprises branched nanoparticles. In some embodiments, the branched nanoparticles comprise a metal-organic framework (MOF). For example, FIG. 1A shows a transmission electron microscopy image (TEM) of branched nanoparticles comprising a MOF, in accordance with certain embodiments.

In some embodiments, the MOF comprises a metal ion. The metal ion can generally be any metal ion capable of binding a ligand. For example, the metal ion can, in accordance with certain embodiments, be zinc, aluminum, or magnesium. In some embodiments, the metal ion is zinc. In some embodiments, the metal ion is a transition metal ion. Non-limiting examples of transition metal ions that can be included in the MOF include, in accordance with certain embodiments, iron, cobalt, nickel, manganese, zirconium, or chromium. In some embodiments, the metal ion is copper.

In some embodiments, the MOF comprises a multidentate ligand. A multidentate ligand generally comprises at least two moieties capable of binding to Lewis acids (e.g., metal ions). In some embodiments, the multidentate ligand is an organic molecule. A multidentate ligand may be able to bind at least two, at least three, or at least four metals. In some embodiments, the multidentate ligand comprises at least two carboxylate groups. Non-limiting examples of some such group include benzene-1,3,5-tricarboxylate, benzene-1,4-dicarboxylate, naphthalene-2,6-dicarboxylate, 1,3,5-tris (carboxyphenyl)benzene, 2-terephthalate, 2,5-dioxido-1,4-benzenedicarboxylate, and 5,5'-(9,10-anthracenediyl)diisophthalate. In other embodiments, the multidentate ligand does not comprise multiple carboxylate groups. For example, in some embodiments, the multidentate ligand comprises imidazolate. For example, the multidentate ligand, in accordance with certain embodiments, can be imidazolate. In some embodiments, the multidentate ligand is 2-methyl-imidazolate.

The branched nanoparticles can comprise a variety of classes of MOFs. In some embodiments, the branched nanoparticles comprise carboxylate-based MOFs. Carboxylate-based MOFS generally comprise multidentate ligands comprising at least two carboxylate groups. Non-limiting examples of carboxylate MOFs that the branched nanoparticles can comprise include UiO-66, MIL-53, MIL-96, MIL-100, MIL-101, MIL-125, and MOF-74. In some embodiments, the branched nanoparticles comprise HKUST-1, which is a carboxylate-based MOF. The MOF names listed here are generally known to those familiar with metal-organic frameworks. Other classes of MOFs are suitable as well, including zeolitic imidazolate frameworks (ZIFs). Zeolitic imidazolate frameworks may comprise any of a variety of metal ions. For example, in some embodiments, a zeolitic imidazolate framework comprises iron, cobalt, copper, of zinc ions, or combinations thereof. In some embodiments, the zeolitic imidazolate framework comprises zinc ions. For example, in some embodiments, the branched MOF nanoparticles comprises ZIF-8. Modified MOFs, which may include multidentate ligands that have been derivatized via the addition of various functional groups (e.g., hydroxy groups, alkyl groups, amino groups, halo groups, thio groups, nitro groups, etc.), as well as MOFs in which at least a portion of the metals have been substituted with different metals (e.g., zinc substituted with magnesium) may also be used in the branched nanoparticles.

Figure 2A:
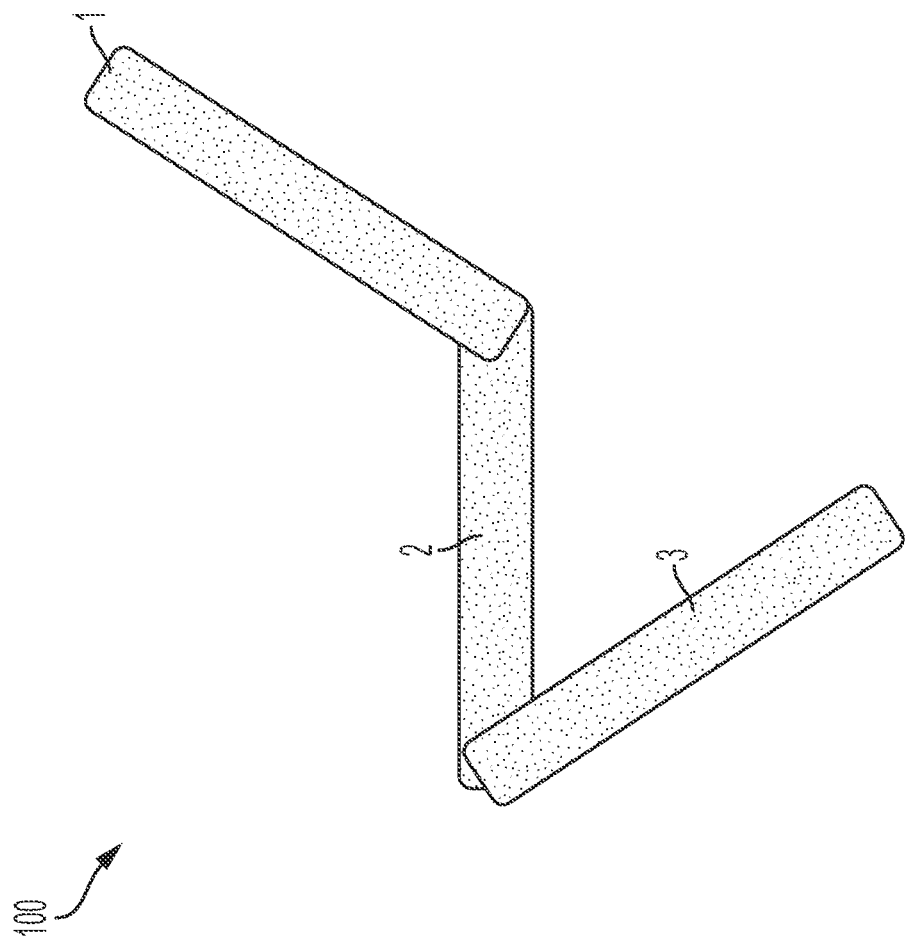
FIG. 2A shows a schematic illustration of an exemplary branched nanoparticle, in accordance with certain embodiments.
Figure 2B:
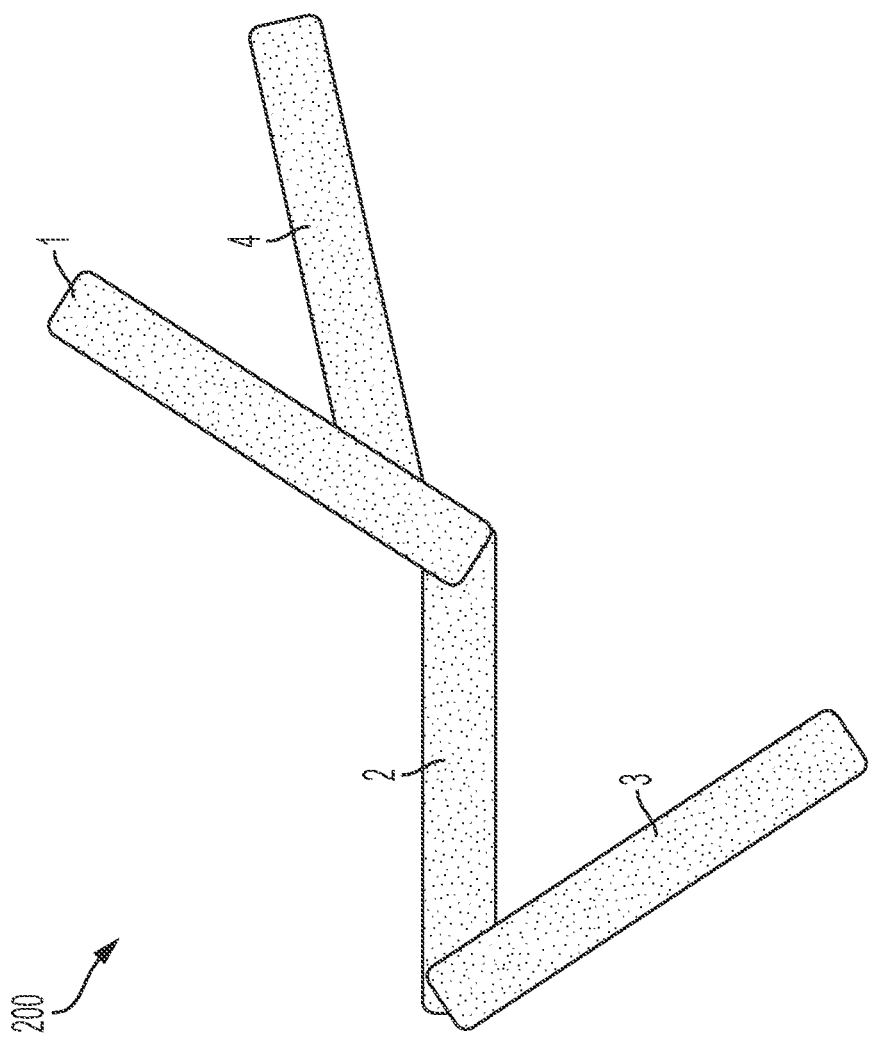
FIG. 2B shows a schematic illustration of an exemplary branched nanoparticle, in accordance with certain embodiments.

As mentioned above, in some embodiments, the composition comprises branched nanoparticles. Nanoparticles generally refer to particles having at least one cross sectional dimension of less than or equal to 500 nanometers, when measured through the geometric center of the structure. Generally, a nanoparticle is branched if it contains at least two branches each having a relatively high aspect ratio (e.g., a relatively high length to width ratio) that are connected end-to-end, and at least two of the branches are non-collinear. In some embodiments, a branch having a relatively high aspect ratio has a length to width ratio of greater than or equal to 5, greater than or equal to 10, and/or up to 15, up to 20, or more. For example, FIG. 2A shows, in accordance with certain embodiments, branched nanoparticles 100 comprising branch 1, branch 2, and branch 3. Branch 1, branch 2, and branch 3, are connected end-to-end and are all non-collinear. As another non-limiting example, FIG. 2B shows branched nanoparticle 200 comprising branch 1, branch 2, branch 3, and branch 4, according to certain embodiments. In some embodiments, the branched nanoparticles comprise branches that are nonplanar with respect to each other. For example, referring back to FIG. 2A, in accordance with certain embodiments, branch 1, branch 2, and branch 3 are nonplanar.

In some embodiments, the branched nanoparticles can be considered to be interconnected. In some embodiments, having interconnected branches, rather than relatively linear, one-dimensional rods, can allow for denser MOF skeletal structures than can make fabrication of devices easier. One reason, in accordance with some embodiments, is that little alignment of interconnected branched particles is required, because the fact that the branches of the interconnected branched particles are directed relatively randomly, any rotation of the interconnected branched nanoparticles is unlikely to prevent inter-particle contacts with other interconnected branched nanoparticles. Such connections may occur, in accordance with certain embodiments, when interconnected branched nanoparticles are connected end-to-end with other interconnected branched nanoparticles, thereby forming a multi-dimensional MOF structure. Such a structure, in accordance with certain embodiments, may formed in a continuous phase such as a polymer matrix or a liquid solution. Additionally, branched nanoparticles, in some embodiments, have tight branch points (i.e., relatively small angles between branches). Such tight branch points may lead to high density MOF-polymer contacts in mixed-matrix membranes, due to relatively small interstitial spaces between the branches.

In some embodiments, the branched nanoparticles have a relatively high aspect ratio. Having a high aspect ratio can, in some embodiments, assist the branched particles in forming connected structures with long channels. The aspect ratio can be measured by dividing the hydrodynamic radius of the branched nanoparticles (as measured by dynamic light scattering) by the diameter of the branch in the branched particle having the greatest diameter (as measured by TEM). In some embodiments, the branched nanoparticles have an aspect ratio of at least 5. In some embodiments, the branched nanoparticles have an aspect ratio is at least 8, at least 10, or more. In some embodiments, the aspect ratio less than or equal to 20, less than or equal to 15, or less. Combinations of the above ranges are possible. For example, in some embodiments, the branched nanoparticles have an aspect ratio in the range of from 5 to 20.

In some embodiments, the branched nanoparticles have a relatively low hydrodynamic diameter. Hydrodynamic diameter refers to the diameter of a hypothetical hard sphere that diffuses in the same fashion as that of the particle being measured. A relatively low hydrodynamic radius can allow, in part, the branched nanoparticles to avoid aggregation or agglomeration in solution suspensions and be well-dispersed and uniformly distributed in membrane structures, as described below. As mentioned above, the hydrodynamic radius of a particle can be measured using dynamic light scattering (DLS). More specifically, the hydrodynamic radius can be measured by suspending the branched nanoparticles in a solution of methanol (MeOH), sonicating to uniformly disperse the branched nanoparticles, and then taking the DLS measurement at a temperature of 35° C. with a Zetasizer Nano S90 (Marvern). In some embodiments, the branched nanoparticles have a hydrodynamic diameter of less than or equal to 2 μm. In some embodiments, the branched nanoparticles have a hydrodynamic diameter of less than or equal to 1 μm, less than or equal to 500 nm, less than or equal to 400 nm, less than or equal to 300 nm, less than or equal to 200 nm, less than or equal to 150 nm, less than or equal to 100 nm, or less. In some embodiments, the branched nanoparticles have a hydrodynamic diameter of at least 20 nm, at least 30 nm, or more. Combinations of the above ranges are possible. For example, in some embodiments, the branched nanoparticles have a hydrodynamic diameter of at least 20 nm and less than 2 μm.

As mentioned above, the branches of the branched nanoparticles have a relatively narrow diameter. Such a diameter can be measured by TEM. A narrow diameter of the branches can contribute in part to the formation of multi-dimensional structures having good permeation properties. In some embodiments, the branches of the branched nanoparticles have a diameter of less than or equal to 200 nm. In some embodiments, the branches have a diameter of less than or equal to 100 nm, less than or equal to 50 nm, less than or equal to 30 nm, less than or equal to 20 nm, less than or equal to 15 nm, less than or equal to 10 nm, or less. In some embodiments, the branches have a diameter of at least 2 nm, at least 5 nm, or more. Combinations of the above ranges are possible. For example, in some embodiments, the branches of the branched nanoparticles have a diameter of at least 2 nm and less than 200 nm. In some embodiments, the branches of at least 50% (e.g., at least 60%, at least 75%, at least 90%, or at least 95%) of the branched nanoparticles have a diameter of less than or equal to 200 nm. In some embodiments, the branches of at least 50% (e.g., at least 60%, at least 75%, at least 90%, or at least 95%) of the branched nanoparticles have a diameter of less than or equal to 100 nm, less than or equal to 50 nm, less than or equal to 30 nm, less than or equal to 20 nm, less than or equal to 15 nm, less than or equal to 10 nm, or less. In some embodiments, the branches of at least 50% (e.g., at least 60%, at least 75%, at least 90%, or at least 95%) of the branched nanoparticles have a diameter of at least 2 nm, at least 5 nm, or more. Combinations of the above ranges are possible. For example, in some embodiments, the branches of at least 50% (e.g., at least 60%, at least 75%, at least 90%, or at least 95%) of the branched nanoparticles the branched nanoparticles have a diameter of at least 2 nm and less than 200 nm. The percentage of branched nanoparticles having branches having diameters in the abovementioned ranges can be determined using TEM.

Particles comprising MOFs can, in some embodiments, be formed by combining precursors in a solution. In some embodiments, particles containing MOFS are formed by combining a metal salt, a multidentate ligand, and a chemical modulator in a liquid. For example, in accordance with certain embodiments, copper nitrate is combined with benzene-1,3,5-carboxylic acid (trimesic acid) and sodium acetate in methanol to form branched nanoparticles comprising HKUST-1. As another example, in some embodiments, zinc nitrate hexahydrate($Zn(NO_3)_2 \cdot 6H_2O$), (or any of $Zn(acac)_2$, $Zn(ClO_4)_2$, $ZnSO_4$, $Zn(OAc)_2$), $ZnCl_2$, $ZnBr_2$, $ZnI_2$, or combinations thereof), 2-methylimidazole, and triethylamine in methanol to form branched nanoparticles comprising ZIF-8.

In some embodiments, the presence of a certain amount of a chemical modulator can affect the size and/or morphology of the resulting MOF particles. A chemical modulator generally refers to an additive to a reaction mixture whose presence during the chemical reaction that forms the particles leads to differences in size and/or morphology. In some embodiments, the chemical modulator can compete with the multidentate ligand and bind to the metal ion of the metal salt, thereby slowing the speed of growth of the particles. In some embodiments, the chemical modulator can promote nucleation of the particles, thereby increasing the number of distinct particles formed during the reaction. In some embodiments, the chemical modulator can cause defects in the crystal structure of the metal-organic framework, thereby affecting surface energies of the crystal faces and resulting morphologies. In some embodiments, the chemical modulator can affect the proton activity in solution (i.e., affect the acid-base chemistry in the reaction mixture).

In some embodiments, the chemical modulator is a salt comprising a cation and an anion. In some embodiments, the anion has at least one carboxylate group. For example, in some embodiments, the anion is acetate. For example, in some embodiments, the chemical modulator is sodium acetate. In some, but not all embodiments, the chemical modulator is sodium formate, or sodium propionate.

In some embodiments, the chemical modulator comprises an amine. In some embodiments, the chemical modulator is an amine. The amine of the chemical modulator can, be any of a variety of suitable amines. For example, in some embodiments, the amine is a primary amine. In some embodiments, the amine is a secondary amine. In some embodiments, the amine is a tertiary amine. The amine may comprise any of a variety of suitable substituents. For example, in some embodiments, the chemical modulator comprises an amine having a formula $NR_3$, wherein each R is independently selected from hydrogen, optionally-substituted $C_{1-8}$ branched and unbranched alkyl, optionally-substituted cycloalkyl, and optionally substituted aryl. As one example, in some embodiments, the chemical modulator is or comprises triethylamine. Other non-limiting examples of chemical modulators include trimethylamine, diethylamine, tri-n-butylamine, and n-butylamine.

As mentioned above, in some cases, the chemical modulator may affect the acid-base chemistry of the reaction mixture. In some such cases, the chemical modulator has a $pK_a$ in a certain range. For example, in some embodiments, the chemical modulator has a $pK_a$ in the liquid in which the chemical reaction occurs that is greater than or equal to the $pK_a$ of a moiety of the multidentate ligand that binds to the metal ion in the metal-organic framework. For example, in some embodiments in which the multidentate ligand comprises at least two carboxylate groups (and the carboxylate groups bind to the metal ion in the resulting MOFs), and the liquid in which the synthesis occurs is methanol, the chemical modulator has a $pK_a$ that is greater than the carboxylate group of the multidentate ligand in methanol. As another example, in some embodiments in which the multidentate ligand comprises an imidazolate group, and the liquid in which the synthesis occurs is methanol, the chemical modulator has a $pK_a$ that is greater than that of the imidazolate ligand in methanol. In some embodiments, the chemical modulator has a relatively high pKa. For example, in some embodiments, the chemical modulator (e.g., acetate, amine, etc.) has a $pK_a$ of greater than or equal to 3.0, greater than 4.0, greater than 5.0, greater than 6.0 greater than 7.0, greater than 7.5, greater than 8.0, greater than 8.0, greater than 9.0, or higher in methanol. In some embodiments, the chemical modulator has a $pK_a$ of less than or equal to 15.0, less than or equal to 12.0, less than or equal to 11.5, less than or equal to 11.0, less than or equal to 10.5, less than or equal to 10.0, or less in methanol. Combinations of these ranges are possible. For example, in some embodiments, the chemical modulator has a $pK_a$ of greater than or equal to 3.0 and less than or equal to 15.0, greater than or equal to 5.0 and less than or equal to 12.0, or greater than or equal to 8.0 and less than or equal to 11.5 in methanol.

In some embodiments, metal salt, multidentate ligand, and/or chemical modulator that are combined in the liquid to form the branched nanoparticles comprising the MOF are selected to achieve certain properties of the resulting branched nanoparticles. In some embodiments, the presence of at least 0.1 equivalents of the chemical modulator with respect to the concentration of the multidentate ligand increases the aspect ratio of the branched nanoparticles by at least a factor of 3 with respect to particles formed under identical conditions in the absence of the chemical modulator. In some embodiments, metal salt, multidentate ligand, and/or chemical modulator are selected such that the presence of at least 0.1, at least 0.15, at least 0.2, at least 0.3, at least 0.5, at least 1.0, at least 2.0, at least 5.0, or more equivalents of the chemical modulator with respect to the concentration of the multidentate ligand increases the aspect ratio of the branched nanoparticles by at least a factor of 3, at least a factor of 4, at least a factor of 5, at least a factor of 10, or more with respect to particles formed under identical conditions in the absence of the chemical modulator. Those of ordinary skill in the art, with the benefit of this disclosure, would understand how to select the metal salt, multidentate ligand, and/or chemical modulator to achieve the abovementioned effects. For example, in some embodiments, the metal salt and multidentate ligand are selected in order to form a desired MOF, and the chemical modulator is selected based on one or both of its relative $pK_a$ compared to the binding moieties of the multidentate ligand or an ability to coordinate to the metal ion of the metal salt. Reactions performed under identical conditions are generally considered to be reactions performed in the same liquid (e.g., the same solvent mixture) at the same temperature and pressure for the same duration with the same concentrations of reagents unless otherwise noted, and with the same mixing conditions (e.g., same volume of reaction mixture and same stir rate). For example, in accordance with certain embodiments, when copper nitrate trihydrate is mixed with trimesic acid in methanol at 23° C. in the presence of at 0.1 equivalents of sodium acetate with respect to the concentration of trimesic acid, the resulting branched nanoparticles of HKUST-1 have an aspect ratio at least three times higher than the aspect ratio of the HKUST-1 particles formed by mixing the same concentrations of copper nitrate and trimesic acid in methanol at 23° C. in the absence of 0.1 equivalents of sodium acetate.

In some embodiments, the liquid in which the metal salt, multidentate ligand, and chemical modulator are mixed contains a relatively high volume percent of methanol. A high volume percent of methanol may, at least in part, contribute to the surprising sizes and morphologies of the MOF-containing branched nanoparticles described herein. In some embodiments, the liquid is at least at least 99% methanol, or 100% methanol. It should be understood that, in some embodiments, other solvent mixtures are used. For example, in some embodiments, the liquid in which the branched nanoparticles are formed is a solvent mixture that contains less than 100% (e.g., less than 100 vol %), less than 99%, or less methanol. In some embodiments, the liquid is a solvent mixture that does not contain methanol. Without wishing to be bound by any particular theory, differences in miscibility of the protonated and deprotonated forms of components of the reaction mixtures such as the multidentate ligands may contribute at least in part to the formation of branched MOF nanoparticles.

In some embodiments, the precursors described above are combined at a relatively mild conditions. For example, in some embodiments, the liquid is mixed at a temperature greater than or equal to 15° C. and less than or equal to 60° C. for at least 10 minutes. Such mild conditions may allow for ease of manufacturing and processing branched nanoparticles comprising MOFs.

In some embodiments, the branched nanoparticles are unaggregated. That is, when suspended in a continuous phase such as a liquid suspension or in a polymer matrix, the branched nanoparticles do not aggregate, in accordance with certain embodiments. In some embodiments, the branched nanoparticles do not agglomerize or aggregate in suspensions in continuous phases for a time period of at least one month. For example, in some embodiments, a suspension of HKUST-1 branched nanoparticles does not aggregate, agglomerize, or settle for a period of at least one month. The ability of the branched nanoparticles to avoid aggregation or agglomeration in polymer suspensions may, without being bound by theory, contribute to uniform distributions of particles in mixed-matrix membranes, as described below.

In some embodiments, the branched MOF nanoparticles comprise a compound associated with the MOF. In some such embodiments, a chemical modulator used during the synthesis of the branched nanoparticles is associated with the MOF following the formation of the branched nanoparticles. The compound (e.g., chemical modulator) may be associated with the MOF in any of a variety of ways, including, but not limited to, adsorption (e.g., physisorption, chemisorption), coordination with a portion of the MOF. For example, in some embodiments, the compound (e.g., a chemical modulator) is a Lewis base that coordinates with a Lewis acid of the MOF, such as the metal ion of the MOF. In some embodiments, the branched nanoparticles comprise any of the chemical modulators described above, or combinations thereof. In some embodiments, the branched nanoparticles comprise a carboxylate group associated with the metal-organic framework (e.g., an acetate group associated with the MOF). In some embodiments, the branched nanoparticles comprise an amine. In some embodiments, the amine is associated with the MOF of the branched nanoparticles (e.g., coordinated to a metal ion of the MOF). The amine can be any of the amines described above. For example, in some embodiments, the branched nanoparticles comprise an amine having a formula $NR_3$, wherein each R is independently selected from hydrogen, optionally-substituted $C_{1-8}$ branched and unbranched alkyl, optionally-substituted cycloalkyl, and optionally substituted aryl. In some embodiments, the branched nanoparticles comprise triethylamine. The presence of a compound associated with the branched nanoparticles can be determined, for example, using analytical techniques such as X-ray photoelectron spectroscopy (XPS), or thermogravimetric analysis-mass spectrometry (TGA-MS).

In some embodiments, a device is described. In some embodiments, the device comprises a mixed-matrix membrane. In some embodiments, the mixed-membrane matrix comprises a matrix comprising a polymer ("polymer matrix"). A variety of polymers can be used for the mixed-matrix membrane. Non-limiting examples of suitable polymers include polyimides, polycarbonates, polysulfones, cellulose triacetate, polyphenylene oxide, or derivatives or combinations thereof. In some embodiments, the polymer is a polymer of intrinsic porosity. In some embodiments, the polymer is a 6FDA-DAM polyimide having the following structure:

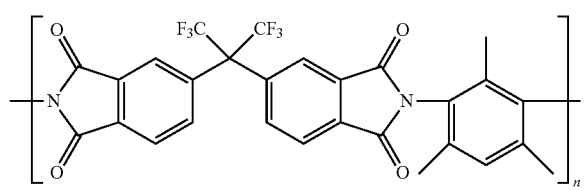

As mentioned above, the matrix comprising the polymer ("polymer matrix") means a matrix defined by the polymer, or a matrix including polymer and other materials. Other materials that can be present in the polymer matrix in some embodiments include, but are not limited to metal ions, residual chemical modulator molecules, additives such as plasticizers, zeolites, carbons, and silica particles, or combinations thereof. In some embodiments, the polymer is present in the matrix in an amount of greater than or equal to 50 weight percent (wt %), greater than or equal to 75 wt %, greater than or equal to 90 wt %, greater than or equal to 95 wt %, greater than or equal to 99 wt %, or greater, by weight of the matrix. In some embodiments, essentially all of the matrix is composed of the polymer. In some embodiments, all of the matrix is composed of the polymer.

In some embodiments, the mixed-matrix membrane comprises particles comprising metal-organic frameworks. In some embodiments, the particles have a certain weight percentage in the mixed-matrix membranes. In some embodiments, the particles have a weight percentage of at least 10%, at least 20%, at least 30%, or more in the mixed-matrix membrane. In some embodiments, the particles have a weight percentage of up to 50% in the mixed-matrix membrane. In some embodiments, the particles have a weight percentage up to 40%, or less in the mixed-matrix membrane. Combinations of the above ranges are possible. For example, in some embodiments, the particles have a weight percentage of at least 5% and up to 50% in the mixed-matrix membrane. In some embodiments, the mixed-matrix membrane comprises particles comprising HKUST-1. In some embodiments, the mixed-matrix membrane comprises particles of at least 90% HKUST-1. In some embodiments, the mixed-matrix membrane comprises particles comprising ZIF-8. In some embodiments, the mixed-matrix membrane comprises particles of at least 90% ZIF-8. In some embodiments, the particles of the mixed-matrix membrane are branched MOF nanoparticles as described herein (e.g., branched HKUST-1 nanoparticles, branched ZIF-8 nanoparticles).

As mentioned above, the mixed-matrix membranes, in accordance with certain embodiments, is capable of separating portion of a first gas from a gas mixture comprising the first gas and a second gas. Some such separations may occur when the gas mixture is passed through the mixed-matrix membrane. For example, in accordance with certain a mixed-matrix membrane can be configured to separate $CO_2$ from $CH_4$, or $CO_2$ from $N_2$. In some embodiments, the mixed-matrix membrane is capable of performing separations involving hydrocarbons. In some embodiments, the mixed-matrix membrane is capable of performing separations of olefins from paraffins. For example, in some embodiments, the mixed-matrix membrane is capable of separating ethylene from ethane, or propylene from propane.

It is generally beneficial for mixed-matrix membranes to have relatively high selectivity and relatively high permeability or permeation during gas separation processes. Permeability of a gas through a membrane generally relates to the flux of a gas through a membrane divided by the thickness of the membrane. Selectivity for a first gas over a second gas in a gas mixture generally refers to the ratio of permeability of the first gas to the second gas. A common problem with mixed-matrix membranes comprising MOF particles is that of either low permeation or poor selectivity. Such problems are often caused by phase-separation between the MOF particles and the polymer networks or the polymer matrix. An example of a phase separation between a polymer and MOF particles that are not the branched nanoparticles described herein is shown in the TEM in FIG. 4B (described in Example 1 below), where the polymer phase is the forms a top layer and the MOF particle phase forms a bottom layer. Such phase separation can also cause void spacing between the MOF and the polymer matrix. Examples of such void spaces are shown in FIGS. 7A-7C (described in Example 1 below). The presence of phase separation and void spaces in mixed-matrix membranes leads to poor selectivity.

Figure 4B:
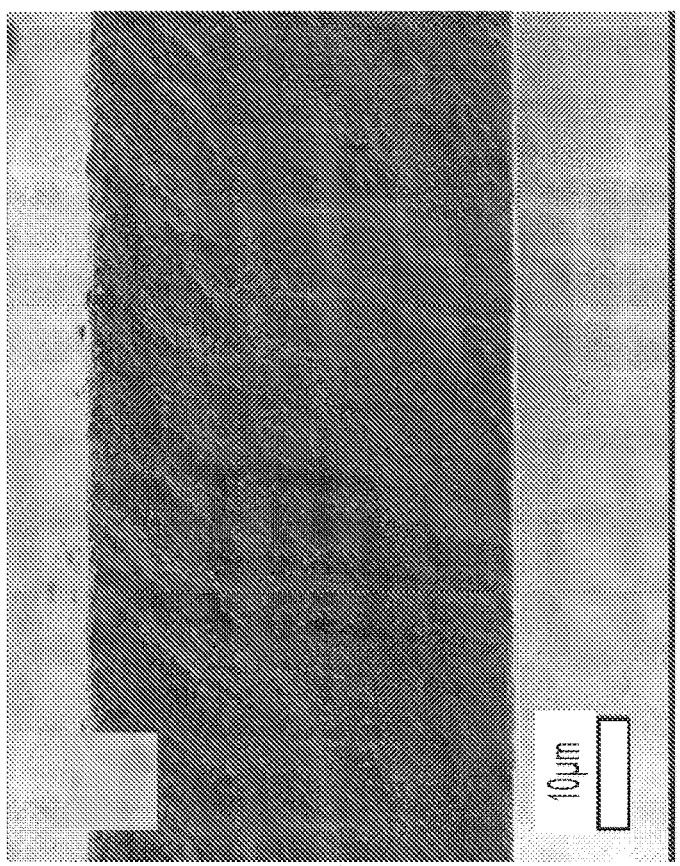
FIGS. 4A-4B cross-sectional SEMs of mixed-matrix membranes comprising bulk and branched nanoparticle HKUST-1 particles, in accordance with certain embodiments.

In some embodiments, the particles comprising metal-organic frameworks are uniformly distributed in the mixed-matrix membrane. In some such embodiments, the top layer of the mixed-matrix membrane and the bottom-layer of the mixed-matrix membrane have the same, uniform distribution of particles and polymer. FIG. 4B shows an example of such a uniform distribution, in accordance with certain embodiments. This can be determined by using the ATR-FTIR technique (the use of which is described by example below) to compare spectra acquired at the top-layer and the bottom-layer of the mixed-matrix membrane (or vice versa). If the ATR-FTIR spectra show no resolvable differences, then the particles can be considered to be uniformly distributed.

In some embodiments, the mixed-matrix membrane has a relatively low amount of void space. Void spaces in mixed-matrix membranes tend to lead to convective permeation of gases. Convective transport is observed when gas permeability increases with increasing pressure for non-plasticizing gases. This trend is characteristic of pressure-dependent pore flow, which results from polymer-metal-organic framework interfacial defects that have effective dimensions that are larger than those of the metal-organic framework pores. In some embodiments, convective transport is not detectable by permeation measurements.

In some embodiments, the mixed-matrix membrane comprises branched nanoparticles comprising metal-organic frameworks. For example, in some embodiments, the particles of the mixed-matrix membrane described above are any of the branched nanoparticles containing metal-organic frameworks described herein. In some embodiments, at least 50 weight percent (wt %), at least 75 wt %, at least 90 wt %, at least 95 wt %, at least 99 wt % or all of the metal-organic framework particles in the mixed-matrix membrane are the branched nanoparticles as described herein, by weight of the particles in the membrane. In some embodiments, the mixed-matrix membrane comprises branched nanoparticles comprising carboxylate-based branched nanoparticles. In some embodiments, the mixed-matrix membrane comprises branched nanoparticles comprising HKUST-1. In some embodiments, the mixed-matrix membrane comprises branched nanoparticles comprising ZIF-8.

Having a certain weight percentage of metal-organic framework particles having the branched structures described herein can, in accordance with certain embodiments, improve the performance of the mixed-metal membranes for gas separation (see below and in example 1 below). In some embodiments, the branched nanoparticles have a weight percentage of at least 5% in the mixed-matrix membrane. In some embodiments, the branched nanoparticles have a weight percentage of at least 10%, at least 20%, at least 30%, or more in the mixed-matrix membrane. In some embodiments, the branched nanoparticles have a weight percentage of up to 50% in the mixed-matrix membrane. In some embodiments, the branched nanoparticles have a weight percentage up to 40%, or less in the mixed-matrix membrane. Combinations of the above ranges are possible. For example, in some embodiments, the branched nanoparticles have a weight percentage of at least 5% and up to 50% in the mixed-matrix membrane.

In some embodiments, the branched nanoparticles form an at least partially percolated network. In some embodiments, the mixed-matrix membrane comprises the at least partially percolated network. The at least partially percolated network may assist in improving performance of the mixed-matrix membrane during gas separations. FIGS. 5A-5E show an examples of such a percolated network, in accordance with certain embodiments.

In some embodiments, the mixed-matrix membrane is resistant to swelling or plasticization. Plasticization refers to the swelling of polymer networks or matrices upon the adsorption of certain gas. Plasticization of a membrane can be monitored by monitoring the permeability of a gas through the membrane as a function of the pressure of the gas. At low pressures the gas permeability decreases with increasing pressure. If plasticization occurs, a certain pressure point, referred to herein as the plasticization pressure point, is reached at which the permeability of the gas begins to increase with increasing pressure, due to the swelling of the membrane. Such swelling generally reduces selectivity. In some embodiments, the mixed-matrix membrane has a plasticization pressure point with respect to a gas that is at least 1.5 times greater than that of a substantially identical membrane that lacks the particles. In some embodiments, the mixed-matrix membrane has a plasticization pressure point with respect to a gas (e.g., $CO_2$) that is at least 1.5 times, at least 2.0 times, at least 5.0 times, at least 10 times, at least 20 times, and/or up to 50 times greater than that of a substantially identical membrane that lacks the particles. In some embodiments, no plasticization pressure point is observed at pressures even greater than 750 psi of the gas. In some embodiments, the gas is $CO_2$. In some embodiments, the gas is a hydrocarbon. Plasticization pressure tests require testing multiple pressure points first below and then above the observed plasticization pressure and holding each pressure for at least six times the time lag, $\theta$, where $\theta = 1^2/(6*D)$. In this equation 1 is equal to the film thickness of the mixed-matrix membrane and D is the experimentally determined effective diffusion coefficient of $CO_2$ in the membrane.

The following examples are intended to illustrate certain embodiments of the present invention, but do not exemplify the full scope of the invention.

Example 1

Synthesis of HKUST-1 Particles

Figure 3A:
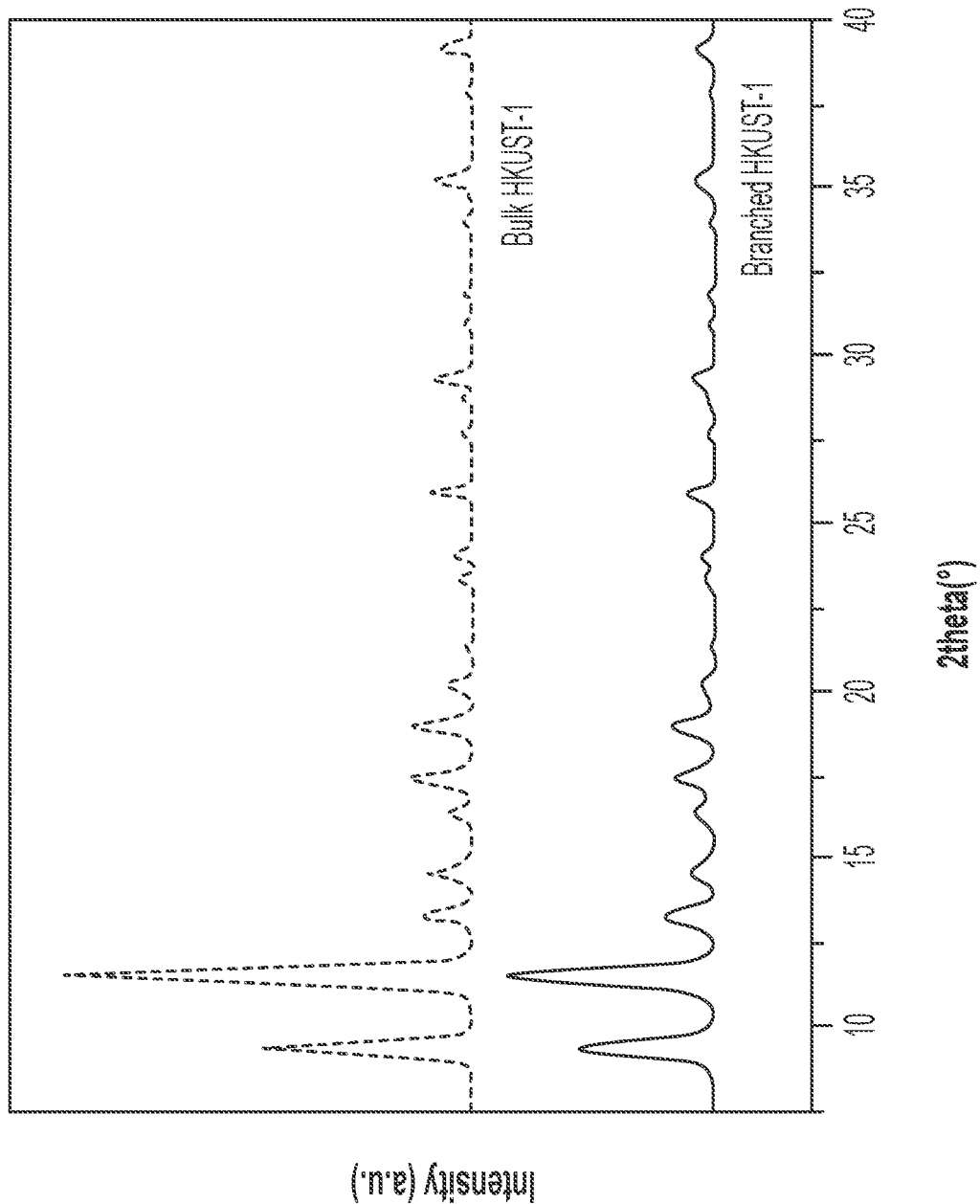
FIG. 3A shows X-ray diffraction (XRD) patterns of branched and bulk HKUST-1 particles, in accordance with certain embodiments.
Figure 3B:
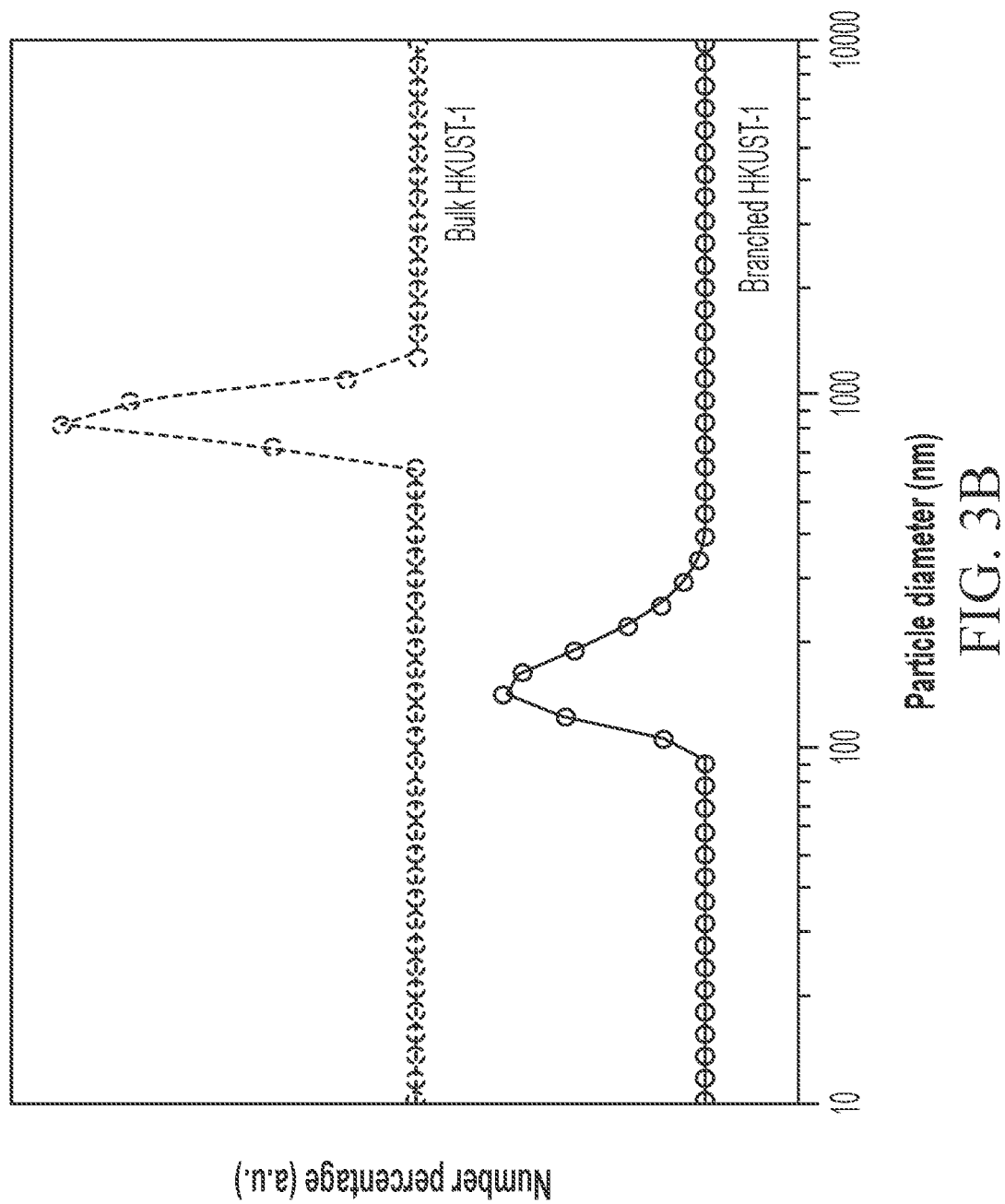
FIG. 3B shows a dynamic light scattering (DLS) plot of a bulk HKUST-1 particles and branched HKUST-1 particles, number-averaged, in accordance with certain embodiments.

HKUST-1 particles with various structures and sizes were synthesized using a methanol (MeOH) solvent and a carboxylate chemical modulator (sodium acetate) at room temperature for 1 h. FIG. 1B shows a TEM image for typical HKUST-1 particles synthesized without a chemical modulator, exhibiting micron-sized (1-2 μm cross section), octahedral morphology with large agglomeration. On the other hand, the introduction of modulator (0.3 molar equivalents to trimesic acid) in the HKUST-1 synthesis produced a branched architecture, as shown in FIG. 1A. FIG. 1A shows that these HKUST-1 particles exhibited end-to-end distances of approximately 100-300 nm in length and branches with widths of approximately 10-30 nm, which corresponds to aspect ratios of approximately 5-20. The branched HKUST-1 particles were dispersed on the TEM copper grid from a dried particle solution. Several meshes on the TEM grid showed well-dispersed branched HKUST-1 nanoparticles without any significant agglomeration. In addition, TEM images shown in FIGS. 6A-6D demonstrated the effect of systematically varying chemical modulator concentration (0, 0.1, 0.3, and 0.5 molar equivalents to trimesic acid corresponding to FIGS. 6A, 6B, 6C, and 6D, respectively) on the size and structure of HKUST-1 particles. As chemical modulator concentration increased, the size of HKUST-1 particles decreased until they reached a minimum size for 0.3 to 0.5 molar equivalents of modulator to trimesic acid. This size also corresponded to relatively high aspect ratios for branched structures. To evaluate the effects of size and structure of HKUST-1 particles, micron-sized HKUST-1 particles, synthesized without sodium acetate, were chosen as a bulk HKUST-1 reference sample. FIG. 1B shows a TEM image of bulk HKUST-1 particles. FIG. 1A shows a TEM of HKUST-1 nanoparticles, synthesized with 0.3 equivalents of sodium acetate to trimesic acid, as a branched HKUST-1 sample. FIG. 3A shows the XRD patterns for bulk and branched HKUST-1 particles. Both bulk and branched HKUST-1 particles showed the same crystalline phase of HKUST-1 but with peak width broadening for branched HKUST-1 nanoparticles, indicating a smaller crystallite size. Applying the Scherrer equation to the dominant Bragg peak of the (222) plane, the branched HKUST-1 nanoparticles were evaluated to have crystallite sizes around 16 nm. This feature size corresponded to the width of branch architecture. The XRD results indicated that increasing the sodium acetate concentration from 0 to 0.1 to 0.3 to 0.5 molar equivalents during HKUST-1 synthesis led to a decrease in crystallite branch sizes, as suggested by a broadening of peak width, while still maintaining the HKUST-1 crystal structure. FIG. 3B shows the particle distributions for bulk and branched HKUST-1 particles measured by DLS with dilute suspensions using MeOH as a solvent. The bulk HKUST-1 particles approximately matched that of the 1-2 μm-sized particles observed by TEM, while the HKUST-1 nanoparticles are much smaller, exhibiting diameters of approximately 100-300 nm. It should be noted that the particle size distribution calculated by DLS measurement is based on the hydrodynamic radius of a sphere using the Stokes-Einstein equation, which means the DLS instrument cannot consider the aspect ratio of the particles. Thus, the DLS instrument assumed that the large length of particles is the radius of a skeletal hydrodynamic sphere. For this reason, the particle diameter estimation by DLS of 100-300 nm in length closely matched the hydrodynamic radius of the interconnected branched structures. DLS measurements showed that varying the sodium acetate concentration during the synthesis of HKUST-1 led to a variation in particle size distributions HKUST-1 particles. The addition of more sodium acetate led to a decrease in particle size distribution until the lowest particle size of branch architecture (100-200 nm) was achieved. Overall, the branched HKUST-1 nanoparticles formed with sodium acetate modulators had 10-30 nm branch widths and 100-300 nm in hydrodynamic diameters, as confirmed by TEM, XRD and DLS analysis. These results suggested aspect ratios of approximately 5-20 for these multi-dimensional MOFs.

Further characterization tests were conducted on a series of HKUST-1 particles to investigate synthesis and the effect of chemical modulator concentration on chemical structure. Fourier Transform-Infrared (FT-IR) spectra of independent reagents (i.e., copper nitrate trihydrate and trimesic acid), chemical modulator (sodium acetate), and product (branched HKUST-1 nanoparticles) were acquired. The branched HKUST-1 nanoparticles exhibited absorption bands at 1649, 1448 and 1373 cm$^{-1}$, which indicated the coordination between carboxylate groups and copper metal sites (COO—Cu$_2$), suggesting successful formation of HKUST-1 framework. Unreacted trimesic acid was thoroughly washed out by multiple washing steps with fresh MeOH solvent at least three times followed by THF solvent at least three times. Moreover, an absorption band around 490 cm$^{-1}$ indicated a strong bond between copper metal ions and organic ligands through carboxylate group bridges. FT-IR spectra for a series of HKUST-1 particles synthesized using various sodium acetate concentrations to demonstrate the effects of the chemical modulator on HKUST-1 synthesis were acquired. FT-IR spectra of HKUST-1 synthesized with 0, 0.1, 0.3, and 0.5 molar equivalents of sodium acetate all looked similar, showing all characteristic HKUST-1 peaks described above. However, a gradual increase in peak intensity was observed around 1550 cm$^{-1}$, with the peak intensity at 1550 cm$^{-1}$ increasing with increasing equivalents of sodium acetate. This change suggested an increase in acetate concentration in the framework, which originated from the sodium acetate modulator, creating defects in the crystal lattice of HKUST-1. These defects likely result from monodentate ligands (acetate ions) replacing tridentate ligands (trimesic acid) that are characteristic of HKUST-1 frameworks. Increasing the sodium acetate concentration in HKUST-1 synthesis led to higher defects resulting from sodium acetate substitutions in HKUST-1. Nevertheless, the framework structure of HKUST-1 was retained. Raman spectra for a series of HKUST-1 particles formed with various sodium acetate concentrations were also acquired, and all chemical bonding such as Cu—Cu (177 cm$^{-1}$), C—H (745 and 829 cm$^{-1}$), C=C (1005 and 1614 cm$^{-1}$), and C—O$_2$ (1462 and 1542 cm$^{-1}$) vibration modes for HKUST-1 particles were located at the same position regardless of sodium acetate concentration. However, when the Raman spectra were magnified, a small peak shift from 1462 cm$^{-1}$ to 1456 cm$^{-1}$ was detectable for the C—O$_2$ functional peaks in branched HKUST-1 nanoparticles. This shift suggested that as sodium acetate concentrations in the HKUST-1 synthesis were increased, the C—O$_2$ functional peak position of HKUST-1 particles approached that of pure sodium acetate, suggesting sodium acetates substitutes in the branched HKUST-1 frameworks instead of only trimesic acid. Of particular interest, visual inspection of a series of HKUST-1 particles formed with various sodium acetate concentrations indicated that the appeared to have slightly different colors. The color difference indicated different particle sizes and/or different coordination environments surrounding the Cu$^{2+}$ metal center. The color changes arise for both reasons. The branched HKUST-1 nanoparticles have a lower refractive index than that of bulk HKUST-1 particles, which results in a low light reflectance. These bulk particles showed a dark blue color, because increasing the particle size leads to a decrease in refractive index. In addition, the branched HKUST-1 nanoparticles contain defects, and the coordination environment around the Cu$^{2+}$ metal center may also affect sample color. Diffuse reflectance UV-vis spectra were acquired for a series of HKUST-1 particles formed with various sodium acetate concentrations (0, 0.1, 0.3, and 0.5 molar equivalents of HKUST-1), as prepared with a powder pellet accessory. Overall, the diffuse reflectance UV-vis absorption of HKUST-1 particles has two divided characteristic ranges: ligand-to-metal charge transfer (LMCT) from oxygen in the tricarboxylate group to Cu$^{2+}$ metal ions (<500 nm in wavelength) and d-d transitions around the Cu$^{2+}$ metal centers (>500 nm in wavelength). Compared to typical bulk HKUST-1 particles, the branched HKUST-1 nanoparticles exhibited an increased peak shift in the wavelength range less than 500 nm and a decreased peak shift in the wavelength range more than 500 nm. Both peak shifts indicate defects such as substituted acetates and missing linkers in HKUST-1 frameworks.

In Table 1, N$_2$ isotherm adsorption-desorption results are presented for a series of HKUST-1 particles formed with various sodium acetate concentrations. The bulk HKUST-1 sample had a BET surface area of approximately 1140 m$^2$/g. When sodium acetate was introduced in synthesis, the BET surface area of HKUST-1 particles significantly dropped from 1140 to 572 m$^2$/g. This decrease in BET surface area of HKUST-1 particles resulted from a decrease in micropore volume, indicating that the specific defects being formed are likely responsible for the reduced the accessible surface area of branched HKUST-1 nanoparticles relative to their bulk counterparts. These N$_2$ sorption isotherms also correlated with decreased crystalline intensities determined by XRD, which show bulk HKUST-1 particles have stronger crystalline intensities than that of branched HKUST-1 nanoparticles.

TABLE 1

| | BET (m$^2$/g) | P/P$_o$ range | t-plot micropore volume (cm$^3$/g) |
|---|---|---|---|
| HKUST-1 0NaAc (Bulk HKUST-1) | 1140 | 0-0.05 | 0.402 |
| HKUST-1 0.1 NaAc | 648 | 0-0.05 | 0.218 |
| HKUST-1 0.3NaAc (Branched HKUST-1) | 631 | 0-0.05 | 0.204 |
| HKUST-1 0.5NaAc | 572 | 0-0.05 | 0.178 |

Thermogravimetric analysis (TGA) curves for bulk and branched HKUST-1 particles were determined by two different methods to observe thermal behavior for as-prepared and activated samples. First, as-prepared bulk and branched HKUST-1 powder samples were loaded on TGA pans and tested under an air atmosphere from room temperature to 800° C. with a heat rate of 20° C./min. The branched HKUST-1 nanoparticles exhibited a 20 wt % weight loss before degradation, compared to a 30 wt % weight loss for the bulk sample. The difference in solvent weight loss resulted from a lower solvent capacity in the branched HKUST-1 nanoparticles due to defects. For the activation and decomposition procedure, the bulk and branched HKUST-1 samples were activated at 150° C. for 2 h under a nitrogen atmosphere and cooled to room-temperature before conducting a second TGA with ramp to 800° C. at the same rate as before. After activation, there was no significant change in weight until 300° C., indicating complete solvent removal during the activation process. At 300° C., both bulk and branched HKUST-1 particles decomposed and converted to copper oxides. Of note, the final masses of bulk and branched HKUST-1 particles after annealing were used to back-calculate the actual weight loading of HKUST-1 particles in mixed-matrix membranes.

Fabrication of Mixed-Matrix Membranes

Figure 4A:
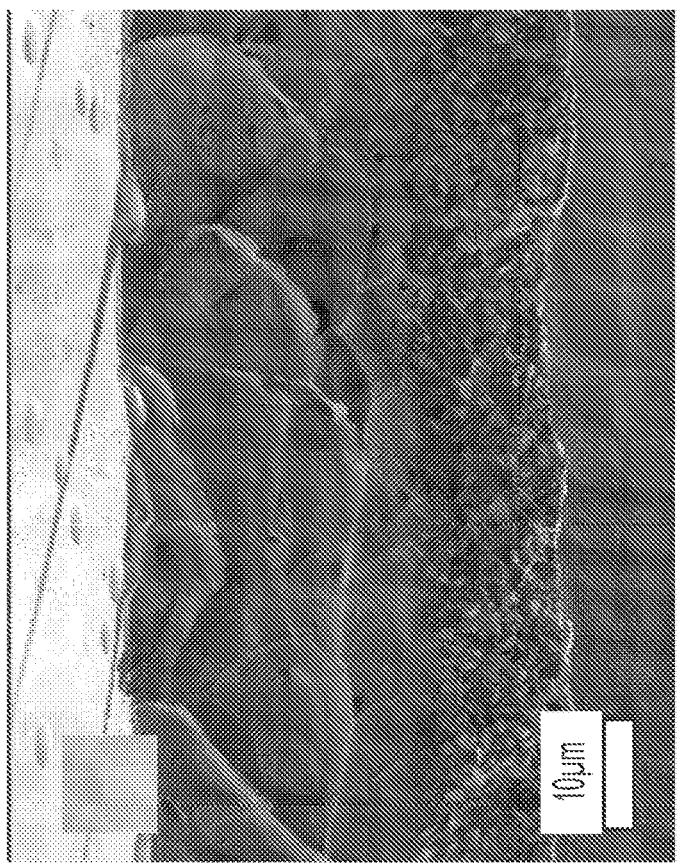

The dispersion stability of the MOF particles in solution is an important factor in determining if uniform MOF particle distributions can be incorporated into a polymer matrix. Therefore, dispersion tests were performed for a series of HKUST-1 suspensions (containing 0, 0.1, 0.3, and 0.5 molar equivalents of sodium acetate) in MeOH before mixed-matrix membrane fabrication. These results demonstrated that all HKUST-1 suspensions showed good dispersion right after vigorous stirring and ultra-sonication. However, upon leaving the suspensions on a bench top for a few hours, the bulk HKUST-1 began to sink to the bottom of the glass vial. All bulk HKUST-1 particles settled at the bottom of the glass vial after a day, while all branched HKUST-1 suspensions maintained their uniform distribution. Of particular interest, even though well-dispersed HKUST-1 suspensions are needed for at most 12 hours to make uniformly distributed MOFs for incorporation into mixed-matrix membranes, the branched HKUST-1 suspensions maintained their uniform dispersion state for more than 2 weeks. The bulk and branched HKUST-1 mixed-matrix membranes with various HKUST-1 weight loadings (10, 20, and 30 wt %) were fabricated using a solvent evaporation method with an evaporation time of around 6 hours to produce even film thickness and uniform filler distribution in composites. For mixed-matrix membranes fabrication, a 6FDA-DAM polyimide was used as a matrix. Detailed characterization results of the polymer (i.e., purity and molecular weight) are presented Table 2. Nuclear magnetic resonance (NMR) spectra confirmed the assignment and purity of the 6FDA-DAM polyimide matrix. Of note, the actual HKUST-1 weight loadings in mixed-matrix membranes from TGA curves are all close to target weight loadings with ±1% uncertainty for samples prepared independently from different batches. To demonstrate dispersion and network formation of bulk and branched HKUST-1 in the 6FDA-DAM polymer, FIG. 4 presents cross-sectional images for bulk (FIG. 4A) and branched (FIG. 4B) HKUST-1/6FDA-DAM mixed-matrix membranes with various HKUST-1 weight loadings. The mixed-matrix membranes were fractured into two pieces using liquid nitrogen to observe the cross-section using FE-SEM. FIG. 4A shows a cross-sectional FE-SEM image for bulk HKUST-1/6FDA-DAM mixed-matrix with a bulk HKUST-1 loading of 20 wt %. Membranes with increasing bulk HKUST-1 particle loadings from 10 to 30 wt % were fabricated and observed using FE-SEM. The bulk HKUST-1/6FDA-DAM mixed-matrix membranes showed an undesirably phase-separated structure into MOF-rich and polymer-rich phases due to the fast particle settling of bulk HKUST-1 that occurs during solvent evaporation. The thickness of the MOF-rich layer in mixed-matrix membranes increased with increasing bulk HKUST-1 weight loading. The 30 wt % bulk HKUST-1/6FDA-DAM mixed-matrix membrane had a 20-25 μm thick MOF-rich layer, which was almost half of the total membrane thickness (40-50 μm). FIG. 4B shows an FE-SEM image for a branched HKUST-1/6FDA-DAM mixed-matrix membranes with a branched HKUST-1 particle loading of 20 wt %. Membranes with branched HKUST-1 loadings from 10 to 30 wt % were fabricated and observed using FE-SEM. Compared to bulk HKUST-1/6FDA-DAM mixed-matrix membranes, the branched HKUST-1 nanoparticles were uniformly distributed in the 6FDA-DAM polymer matrix, resulting in a homogeneous morphology across the entire film. It appeared that there was not any noticeable agglomeration of the branched HKUST-1 particles, even within the 30 wt % branched HKUST-1 sample. Additionally, because of the different particle sizes and dispersion properties between bulk and branched HKUST-1, the cast HKUST-1/6FDA-DAM mixed-matrix membranes exhibited a different appearance. The bulk HKUST-1/6FDA-DAM mixed-matrix membrane appeared opaque due to a high reflectance resulting from large HKUST-1 particle agglomeration, whereas the branched HKUST-1/6FDA-DAM mixed-matrix membrane appeared transparent due to the effective dispersion of small branched HKUST-1 nanoparticles. A picture of the crystal structure of HKUST-1 was clearly observable behind the transparent branched HKUST-1/6FDA-DAM mixed-matrix membrane, but the picture could be observed through the opaque bulk HKUST-1/6FDA-DAM mixed-matrix membrane.

TABLE 2

| | |
|---|---|
| Number Average Molecular Weight ($M_n$) | 36,300 |
| Weight Average Molecular Weight ($M_w$) | 149,000 |
| Polydispersity Index (PDI) | 4.1 |

It was difficult to obtain clear cross-sectional images using fractured mixed-matrix membranes. These cross-sectional SEM images did not clearly show localized HKUST-1 particle dispersion or interfacial void spaces between HKUST-1 particles and the 6FDA-DAM polymer, even at high-resolution. To address these issues, FIB-SEM imaging on bulk and branched HKUST-1/6FDA-DAM mixed-matrix membranes was performed for accurate cross-sectional analysis. The FIB-SEM technique used Ga-ion milling, which formed significantly smoother cross-sections than liquid nitrogen fracturing. Images for branched HKUST-1 samples were taken by milling from the top of the mixed-matrix membranes. However, because the bulk HKUST-1 particles settled to the bottom of the mixed-matrix membrane, the membranes were reversed for FIB-SEM milling to analyze only the MOF-rich phase. FIG. 7 shows FIB-SEM images of bulk HKUST-1/6FDA-DAM mixed-matrix membranes. Various HKUST-1 weight loadings were used, all of which showed consistent results with those shown in FIGS. 7A-7C. In the FIB-SEM images, the bright portions are HKUST-1 particles, whereas the dark portions are the 6FDA-DAM polymer. In agreement with the previous FE-SEM images, the thickness of the MOF-rich layer increased with increased HKUST-1 weight loading. Of particular interest, there were clear and visible interfacial void spaces between the bulk HKUST-1 particles and the 6FDA-DAM polymer, which was consistent with the permeation results presented below. In addition, a curtaining effect, highlighted by streaks in FIG. 19, resulted from density gradients related to inefficient materials packing, thereby providing further evidence of large void spaces. FIG. 8 shows FIB-SEM images for a branched HKUST-1/6FDA-DAM mixed-matrix membrane with a 30 wt % branched HKUST-1 loading at various magnifications (FIG. 8A-8C). Remarkably, in contrast with FIG. 7, the branched HKUST-1/6FDA-DAM mixed-matrix membranes in FIG. 20 showed uniform branched HKUST-1 nanoparticles dispersion in the polymer matrix and also did not exhibit interfacial void spaces between the particles and the polymer. Of particular interest, FIGS. 5A-5C show that the 30 wt % branched HKUST-1/6FDA-DAM mixed-matrix membrane retain percolation networks, characteristic of the cast particle morphology. The branched HKUST-1 nanoparticles were well-distributed across the entire film, and showed free surface-to-free surface particle connectivity that benefits from the high aspect ratios of the branched architecture. To more clearly assess the connectivity of branched HKUST-1 nanoparticles in mixed-matrix membranes, a FIB-SEM cross-sectional tomogram was carried out for a section of film that was 11 μm in length, 29 μm in width and 4 μm in depth. FIGS. 5D-5E show the 3D reconstructed images using FIB-SEM tomography for a 30 wt % branched HKUST-1/6FDA-DAM mixed-matrix membrane. The branched HKUST-1 nanoparticles formed into a highly interconnected nanostructured composite film.

Figure 9A:
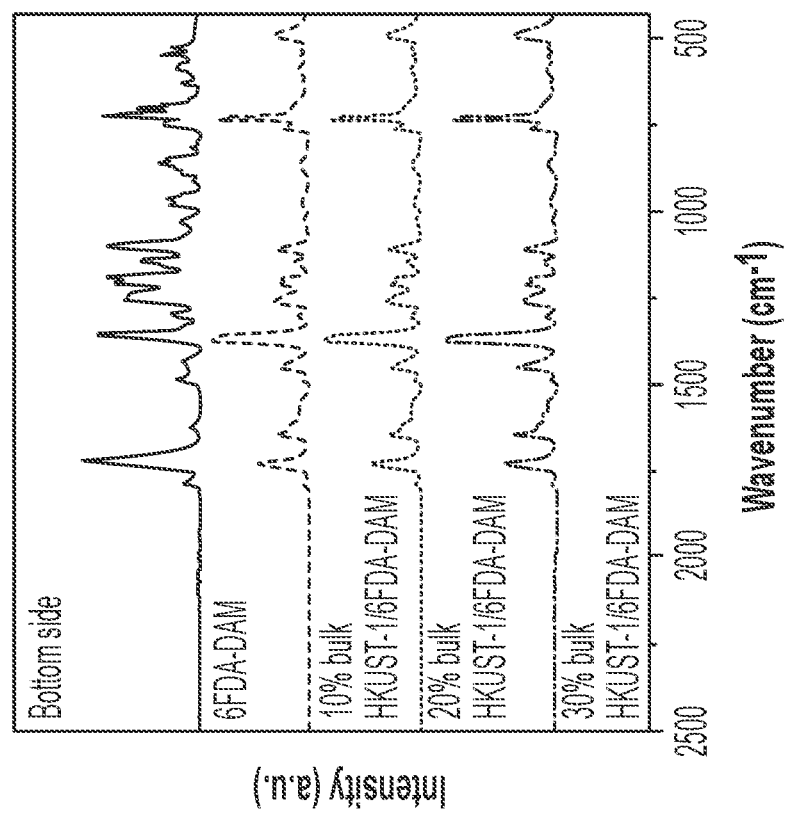
FIG. 9A-9B are charts illustrating FT-IR spectra of a pure 6FDA-DAM polymeric film and bulk HKUST-1/6FDA-DAM mixed-matrix membranes with various HKUST-1 weight loadings, in accordance with certain embodiments.
Figure 9B:
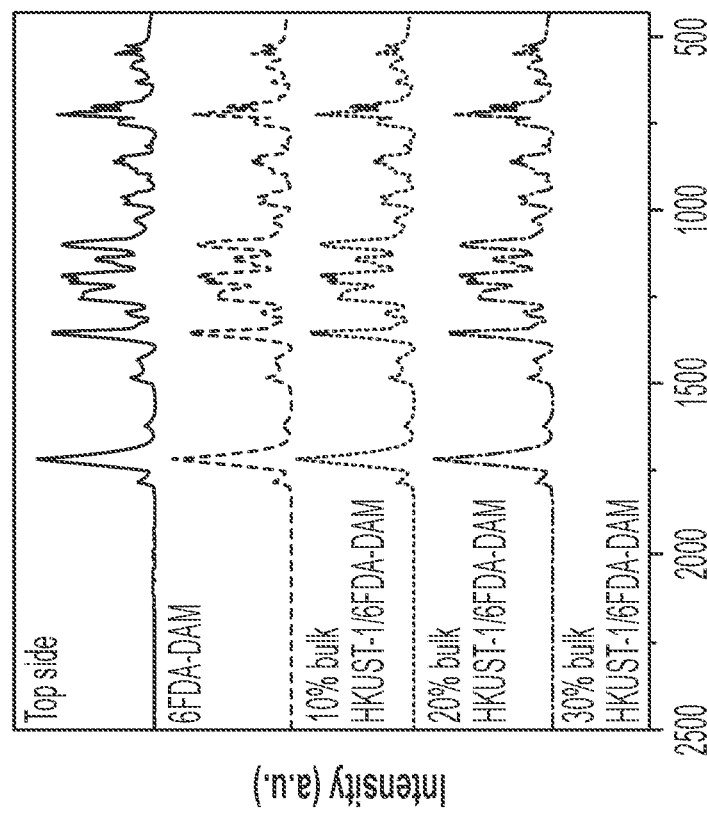
Figures 10A, 10B:
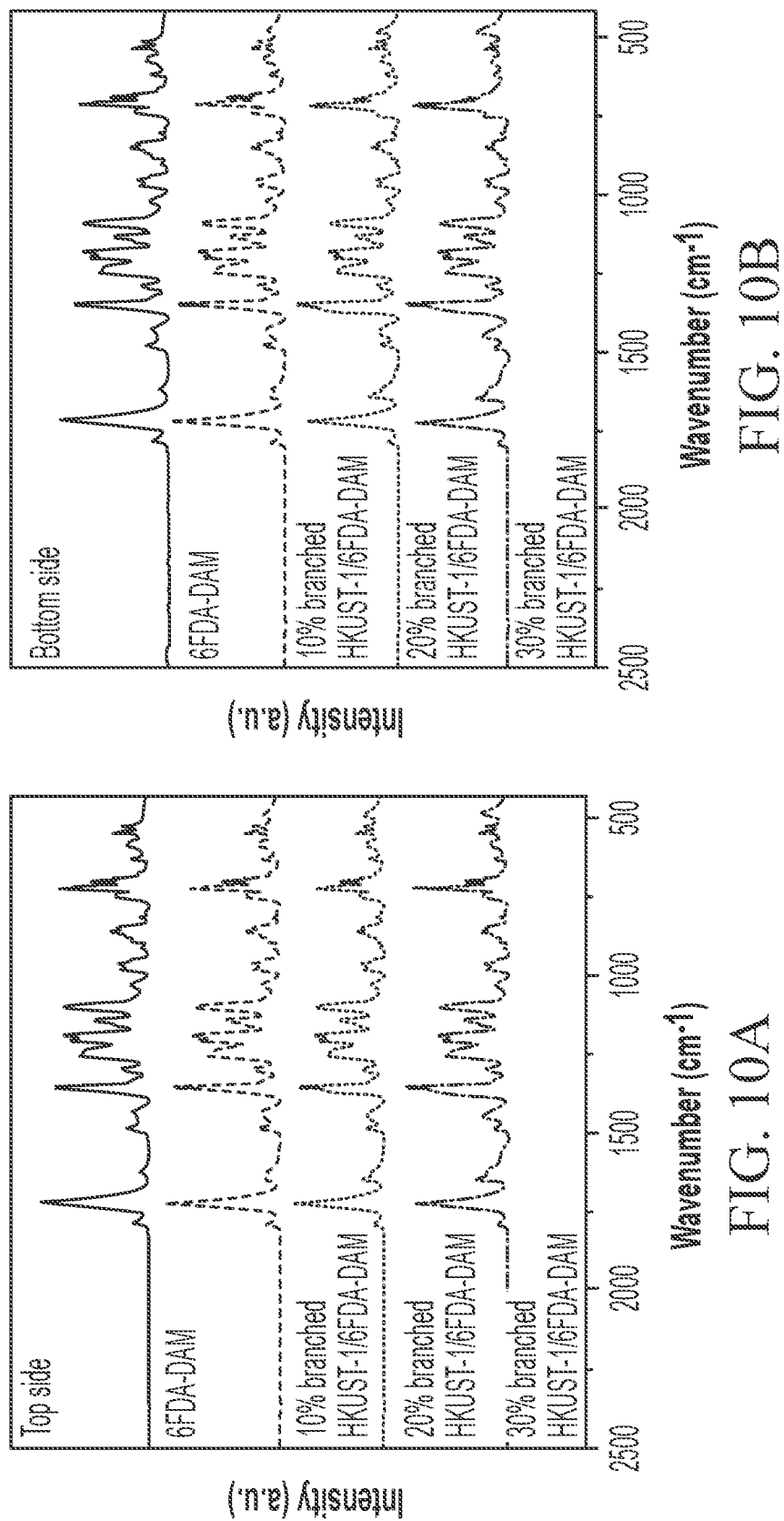
FIG. 10A-10B are charts illustrating FT-IR spectra of a pure 6FDA-DAM polymeric film and branched HKUST-1/6FDA-DAM MMMs with various HKUST-1 weight loadings, in accordance with certain embodiments.
Figures 12A, 12B, 12C, 12D:
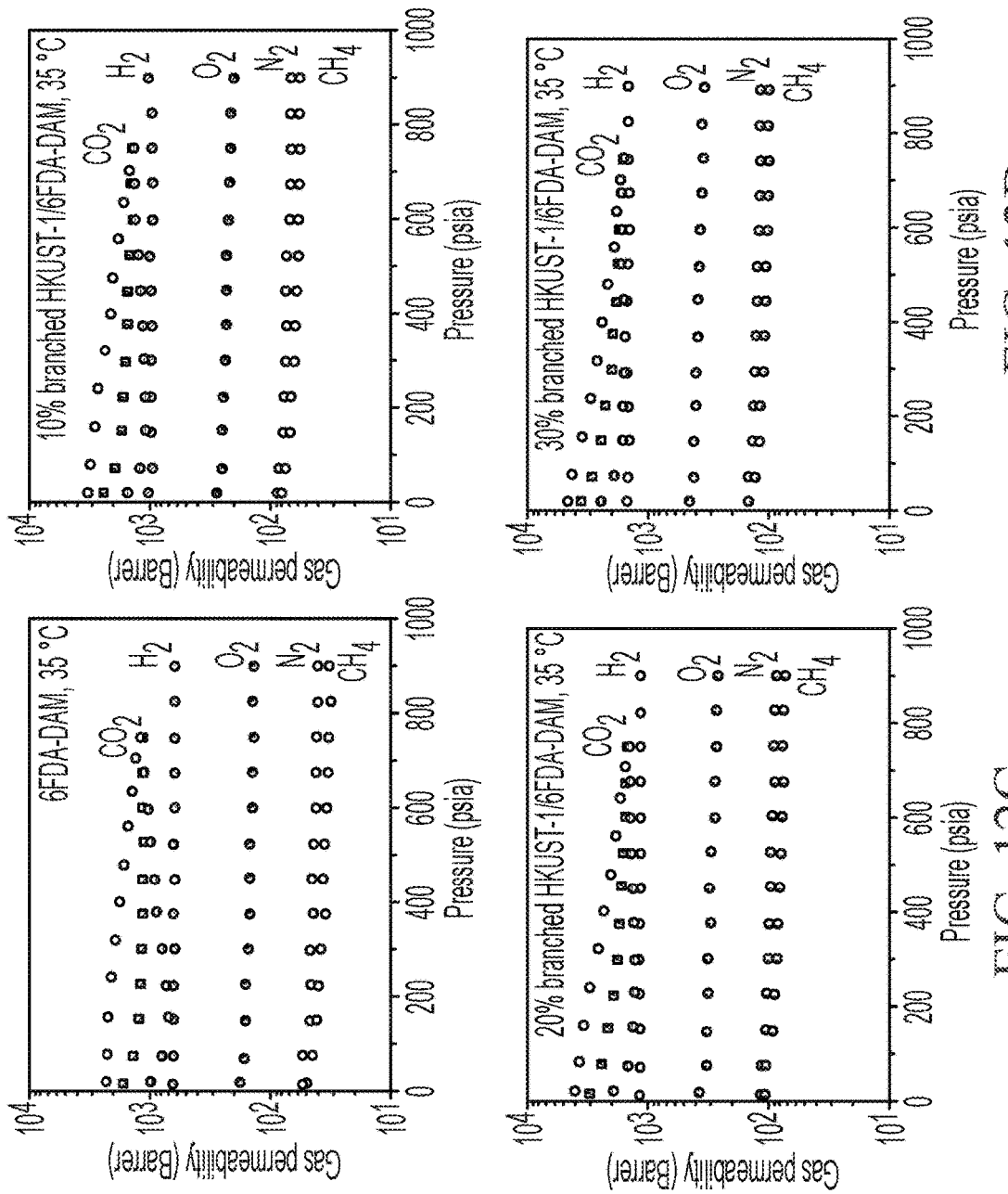
FIGS. 12A-12D are charts illustrating certain gas permeabilities as a function of gas feed pressure, in accordance with certain embodiments.

FIGS. 9A-9B presents FT-IR spectra using an ATR accessory for a pure 6FDA-DAM film, and bulk HKUST-1/6FDA-DAM mixed-matrix membranes with various HKUST-1 weight loadings. Of note, the penetration depth of the ATR accessory is approximately 1-2 μm, so it was possible to determine whether the approximately 50 μm-thick films had uniform MOFs distribution at both interfaces. Although the mixed-matrix membranes had various bulk HKUST-1 weight loadings, the FT-IR spectra for the top-side of the mixed-matrix membranes (FIG. 9A) showed the same characteristic 6FDA-DAM functional absorption bands without any noticeable characteristic peaks for bulk HKUST-1. On the other hand, as shown in FIG. 9B, the FT-IR spectra for the bottom-side of the mixed-matrix membranes showed almost identical characteristic HKUST-1 peak intensities at 1645 and 490 cm$^{-1}$ regardless of bulk HKUST-1 weight loadings, indicating that most of the bulk HKUST-1 particles settled to the bottoms side of mixed-matrix membranes. FIGS. 10A-10B presents FT-IR spectra for a pure 6FDA-DAM film and branched HKUST-1/6FDA-DAM mixed-matrix membranes with various HKUST-1 weight loadings using the same ATR accessory. Unlike the FT-IR spectra of the bulk HKUST-1/6FDA-DAM mixed-matrix membranes, the FT-IR spectra for the branched HKUST-1/6FDA-DAM mixed-matrix membranes exhibited a gradual increase in characteristic branched HKUST-1 peak intensities at 1645 and 490 cm$^{-1}$ for both the top and bottom sides of the mixed-matrix membranes as the branched HKUST-1 weight loading increased, suggesting a uniform branched HKUST-1 nanoparticles distribution in the 6FDA-DAM polymer matrix. These results further quantified the conclusions from the cross-sectional FE-SEM and FIB-SEM images that show bulk HKUST-1 particles settled at the bottom side of the mixed-matrix membranes, whereas the branched HKUST-1 nanoparticles were well-dispersed in the mixed-matrix membranes. X-ray diffraction (XRD) patterns for a pure 6FDA-DAM polymer film and bulk and branched HKUST-1/6FDA-DAM mixed-matrix membranes with various HKUST-1 weight loadings were acquired. In general, the higher HKUST-1 weight loadings showed more intense crystalline peaks regardless of the HKUST-1 morphology, and the bulk HKUST-1 peaks were more intense than those of the branched HKUST-1 at similar weight loadings. These results indicated that crystallinity was maintained in film preparation and that the bulk MOF structures had intrinsically higher crystallinity than did the branched structures.

Permeation Tests

Before determining gas permeation properties for the samples, we investigated the effect of activation temperature was investigated using a heating jacket, which covered the permeation cell while the mixed-matrix membranes were held under vacuum and heated to activate the HKUST-1 particles. $H_2$ and $N_2$ gases were used as probe gases for a 20 wt % branched HKUST-1/6FDA-DAM mixed-matrix membrane at 15, 30, and 45 psi. These results indicated that increasing temperature slightly reduced $H_2$ and $N_2$ permeabilities, possibly due to increased polymer-MOF interfacial interactions or subtle physical aging effects in the 6FDA-DAM polyimide phase, but also indicated that the samples were thermally stable under these conditions. Moreover, nearly identical XRD measurements on a 30 wt % branched HKUST-1/6FDA-DAM mixed-matrix membrane acquired before and after activation using a heating jacket indicated that high HKUST-1 crystallinity was retained during the activation. Therefore, it was concluded that the high-temperature activation process using the heating jacket did not have a significant effect on gas transport properties and the crystalline nature of HKUST-1 particles. Moreover, TGA analysis confirmed that the high-temperature activation process assisted in complete removal of solvent in the mixed-matrix membranes.

Figure 13B:
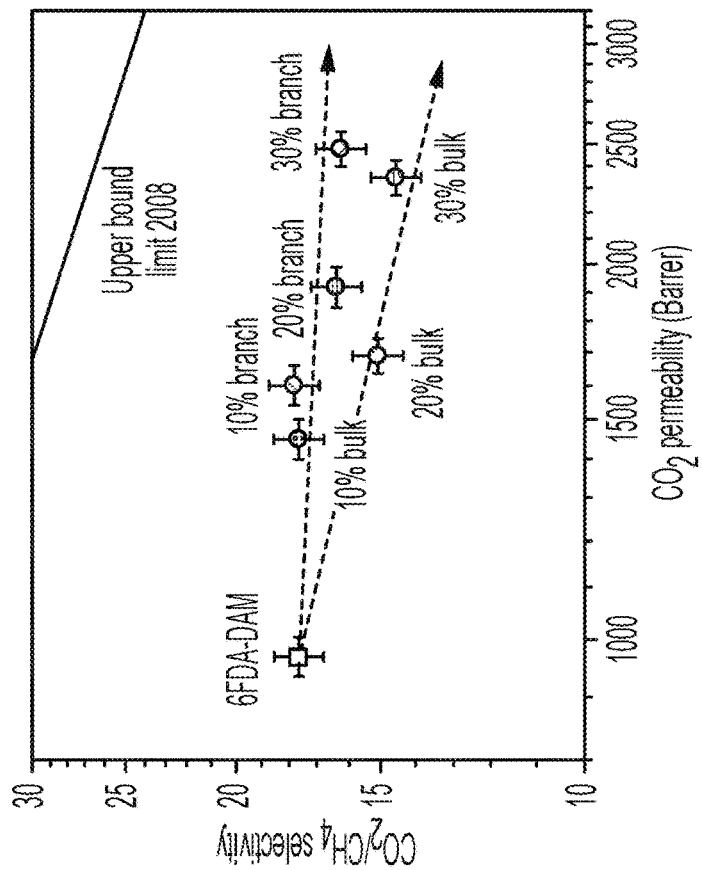
FIG. 13A-13B are charts illustrating gas separation performance of various membranes in accordance with certain embodiments.
Figure 13A:
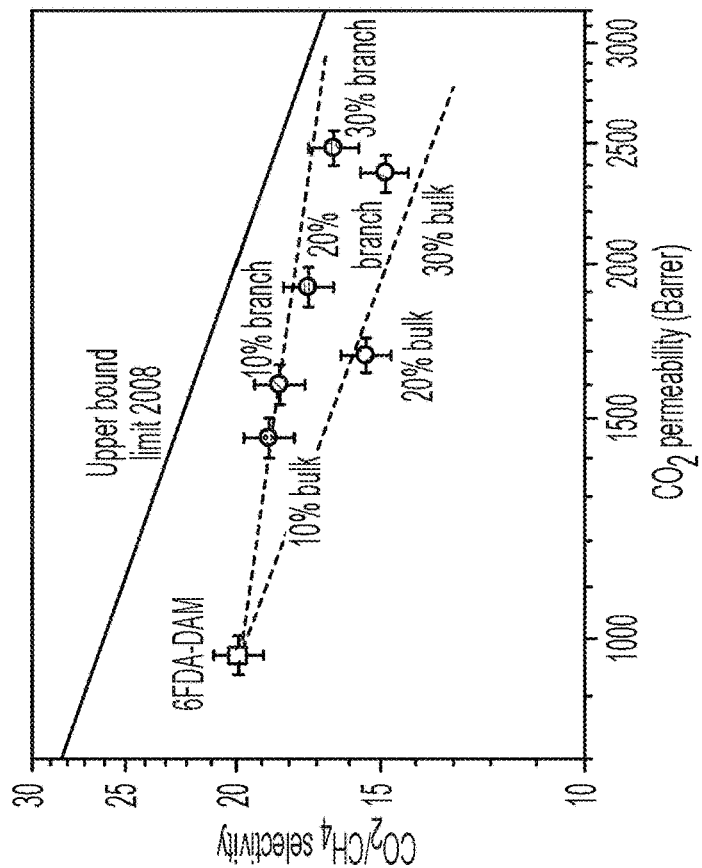
Figure 14B:
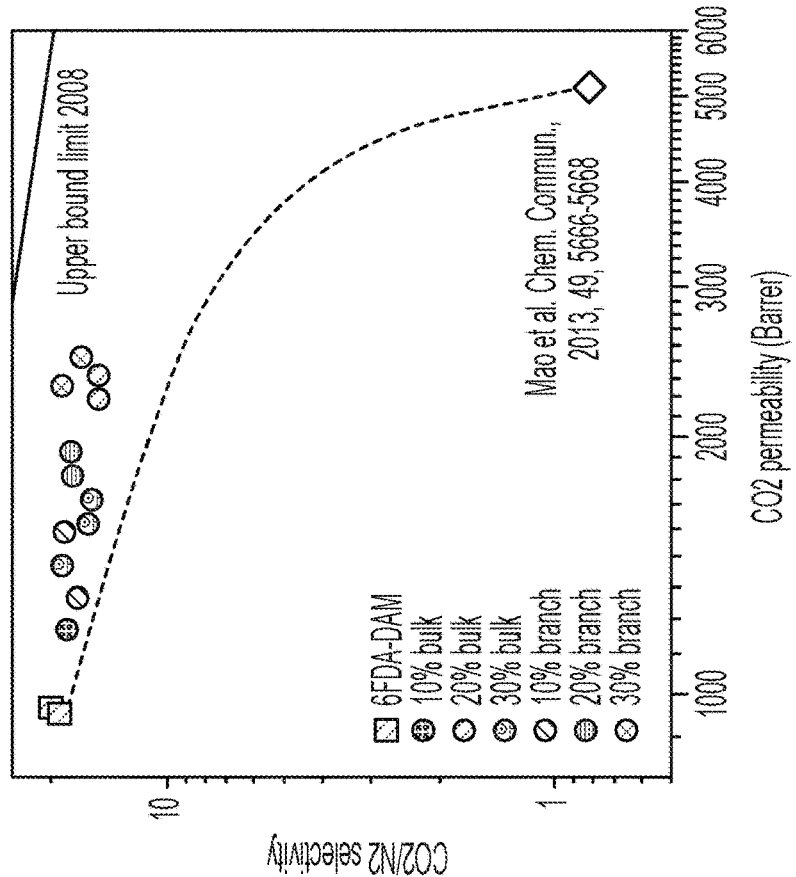
FIG. 14A-14B are charts illustrating gas separation performance of two sets of a pure 6FDA-DAM polymer film and bulk and branched HKUST-1/6FDA-DAM MMMs with various HKUST-1 weight loadings, in accordance with certain embodiments.
Figure 14A:
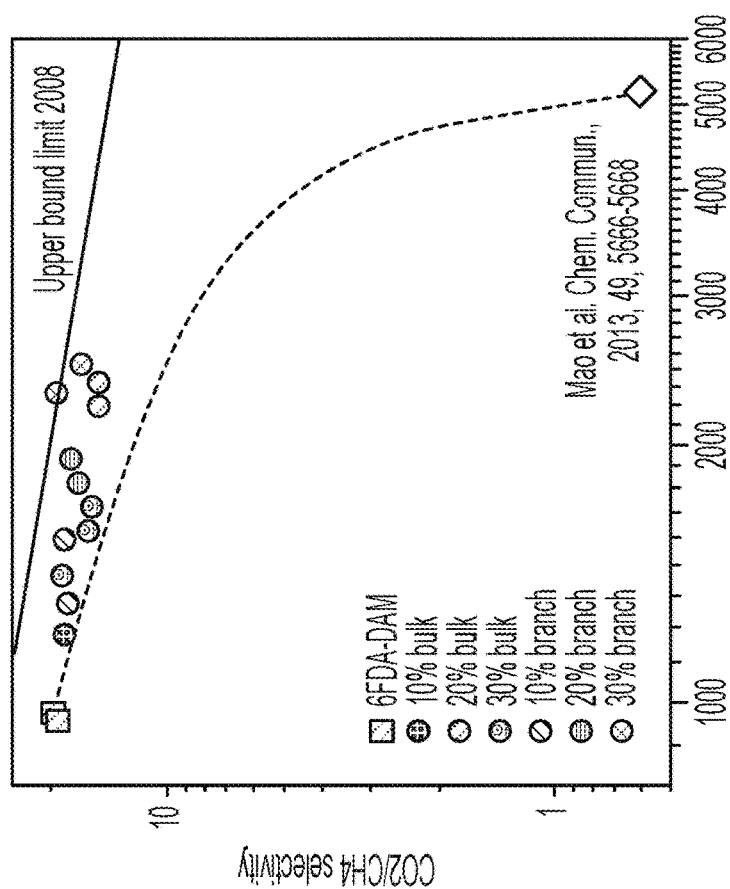
Figure 15A:
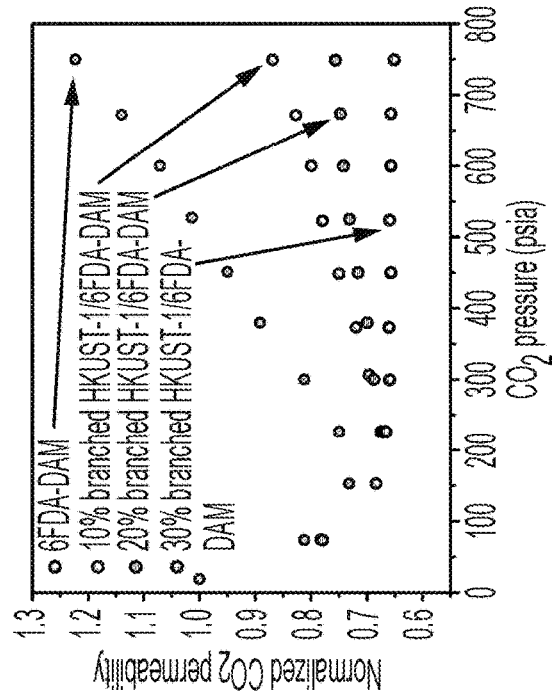
FIGS. 15A-15D include charts illustrating normalized $CO_2$ permeabilities as a function of $CO_2$ gas feed pressure for various membranes, in accordance with certain embodiments.
Figure 15B:
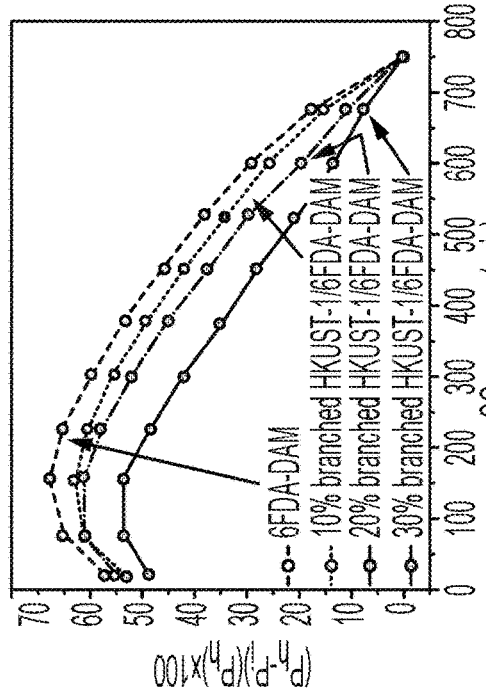
Figure 15C:
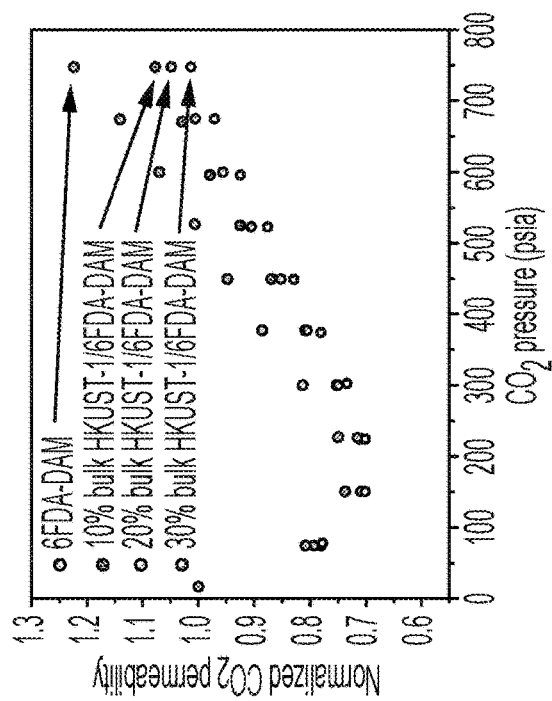
Figure 15D:
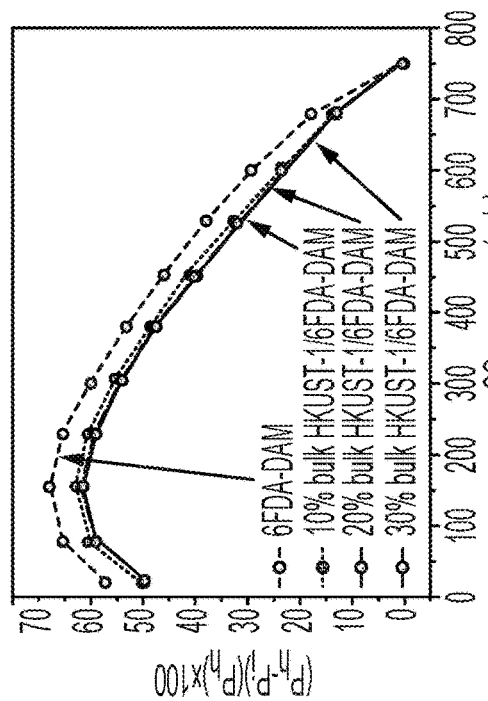

Gas permeation tests on a pure 6FDA-DAM polymer film and bulk and branched HKUST-1/6FDA-DAM mixed-matrix membranes with various HKUST-1 weight loadings were performed. Before testing, all membrane samples were annealed at 150° C. for 2 hours using a heating jacket to activate the HKUST-1 particles in the mixed-matrix membranes. FIGS. 11A-11D shows $H_2$, $CH_4$, $N_2$, $O_2$, and $CO_2$ gas transport properties as a function of gas feed pressure at 35° C. for the pure 6FDA-DAM polymer membrane and bulk HKUST-1/6FDA-DAM mixed-matrix membranes with various weight loadings (10, 20, and 30 wt %). As gas feed pressure increased, the light gases, $H_2$, $CH_4$, $N_2$, and $O_2$, showed slight decreases in permeability, while $CO_2$, which has a higher characteristic gas-phase activity, initially showed a decrease in permeability related to dual-mode and Langmuir sorption effects following by an increase in permeability at higher pressures due to plasticization. The addition of bulk HKUST-1 particles in the 6FDA-DAM polymer matrix significantly increased gas permeability and decreased gas selectivity for gas pairs of interest (i.e., $CO_2/CH_4$ and $CO_2/N_2$). For example, the 30 wt % bulk HKUST-1/6FDA-DAM mixed-matrix membrane showed $CO_2$ gas permeability of around 2500 Barrer at 15 psi, which was 2.5 times higher than that of the pure 6FDA-DAM (i.e., 1000 Barrer), but the $CO_2/CH_4$ selectivity decreased slightly from 19 to 15. FIGS. 12A-12D show $H_2$, $CH_4$, $N_2$, $O_2$, and $CO_2$ permeability as a function of gas feed pressure at 35° C. for the pure 6FDA-DAM polymer film and branched HKUST-1/6FDA-DAM mixed-matrix membranes with various weight loadings (10, 20, 30 wt %). As a function of increasing HKUST-1 weight loading, the branched HKUST-1/6FDA-DAM mixed-matrix membranes showed a significant concomitant increase in gas permeability similar to that of bulk HKUST-1/6FDA-DAM mixed-matrix membranes. As a comparison, the 30 wt % branched HKUST-1/6FDA-DAM mixed-matrix membrane showed $CO_2$ permeability of around 2500 Barrer at 15 psi, which was similar to that of 30 wt % bulk HKUST-1/6FDA-DAM mixed-matrix membrane. However, the branched HKUST-1/6FDA-DAM mixed-matrix membranes exhibited smaller losses in selectivity for $CO_2/CH_4$ and $CO_2/N_2$ separations relative to those of the pure 6FDA-DAM polymer film. To investigate gas transport trends as a function of HKUST-1 particle type and weight loading, FIGS. 13A-13B shows the transport properties at 35° C. at 15 psi for a pure 6FDA-DAM polymer film, bulk and branched HKUST-1/6FDA-DAM mixed-matrix membranes with various HKUST-1 weight loadings (10, 20 and 30 wt %) for $CO_2/CH_4$ and $CO_2/N_2$ separation with the upper bound limit. As bulk and branched HKUST-1 weight loading were increased in the mixed-matrix membranes, the $CO_2$ gas permeability increased with similar enhancements. However, the branched HKUST-1/6FDA-DAM mixed-matrix membranes showed more limited losses in selectivity, thereby shifting gas transport properties for the branched mixed-matrix membranes closer to the upper bound limit than what was observed for the bulk mixed-matrix membranes. The bulk HKUST-1/6FDA-DAM mixed-matrix membranes showed a loss in selectivity that resulted in gas transport properties paralleling the upper bound limit. The theoretical gas transport properties for the lowest HKUST-1 weight loaded mixed-matrix membrane (i.e., 10 wt %) and the pure 6FDA-DAM polymer film were unable to be predicted from the Maxwell Model. The basic two assumptions of the Maxwell Model are 1) the dispersed (i.e., filler) particles should be uniformly dispersed in a continuous (i.e., polymer) matrix, and 2) the dispersed (i.e., filler) particles are spherical to apply shape factor (n) of ⅓. However, the branched HKUST-1 nanoparticles were not spherical and the bulk HKUST-1 particles were not uniformly distributed in a 6FDA-DAM polymer matrix. As a result, the addition of 10 wt % branched HKUST-1 nanoparticles (or even 10 wt % bulk HKUST-1 particles) significantly increased the gas transport performance far more than the theoretically predicted gas transport properties. In particular, the high aspect ratio (5~20) of the branched HKUST-1 nanoparticles led to a shape factor of less than 0.1 and a low percolation threshold less than 10 vol %, but fitting the Maxwell Model with reduced shape factors still did not lead to a reasonable fit when compared to pure HKUST-1 transport properties reported in the literature. It is possible that the highly irregular structure and defects in these new branched particles may have more beneficial intrinsic transport properties that un-modulated does HKUST-1, but experimental determination of pure branched MOF permeabilities (i.e., without a polymer support) remains a significant and elusive challenge. FIGS. 14A-B show a trend of gas transport properties from 0 to 100 wt % HKUST-1 weight loading predicted by the Maxwell model, with a shape factor of ⅓ using pure 6FDA-DAM polymer film data and the HKUST-1 polycrystalline membrane on a porous support from data in the literature based on an interpolation method. In FIG. 14A-B, two sets of gas transport data points of the pure 6FDA-DAM polymer film and bulk and branched HKUST-1/6FDA-DAM mixed-matrix membranes are included with various HKUST-1 weight loadings (10, 20, and 30 wt %) with the Maxwell model prediction. Notably, the branched HKUST-1/6FDA-DAM mixed-matrix membranes showed significantly enhanced gas transport properties beyond the theoretically predicted gas transport trends using the HKUST-1 polycrystalline membrane. These results may suggest a non-standard mechanism for transport in these composite systems, potentially related to the interconnected multi-dimensional branched structures. An additional feature of branched multi-dimensional MOFs is the unusual stability to plasticization they endow to their polymer supports. To quantify this effect, FIGS. 15A-B shows normalized $CO_2$ permeability of the pure 6FDA-DAM polymer film, and bulk and branched HKUST-1/6FDA-DAM mixed-matrix membranes with various HKUST-1 weight loadings. The addition of the bulk HKUST-1 to the 6FDA-DAM polymer resulted in a slight shift in the $CO_2$ plasticization pressure point, suggesting a small improvement to plasticization resistance. On the other hand, the addition of the branched HKUST-1 to 6FDA-DAM resulted in a significant shift in the $CO_2$ plasticization pressure point, indicating substantial improvements in plasticization resistance. Of particular interest, the 30 wt % branched HKUST-1/6FDA-DAM mixed-matrix membrane did not exhibit an observable plasticization pressure point even up to 750 psi, indicating a highly $CO_2$-resistant membrane. To further investigate $CO_2$ plasticization behavior, the normalized differences in $CO_2$ permeabilities between the hysteresis curves and the initial permeation isotherm at identical $CO_2$ pressure points were calculated. Within the resolution of these calculations, the bulk HKUST-1/6FDA-DAM mixed-matrix membranes showed insignificant changes in normalized $CO_2$ permeabilities as a function of increased MOF loading, whereas the branched HKUST-1/6FDA-DAM mixed-matrix membranes showed significant reductions in normalized $CO_2$ permeabilities as a function of increased MOF loading. These results were consistent with a molecular-level interpretation of reductions in polymer chain mobility from increased surface contact between the polymer chains and branched HKUST-1 nanoparticles, which led to enhanced plasticization resistance.

Materials and Methods, and Characterization

The materials used for the following examples are as follows:

Copper(II) nitrate trihydrate ($Cu(NO_3)_2.3H_2O$), trimesic acid ($C_9H_6O_6$, 95%), sodium acetate (NaAc, $C2H_3NaO_2$, ≥99.0%), methanol (MeOH, $CH_4O$≥99.9%), tetrahydrofuran (THF, $C_4H_8O$, ≥99.0%), N-methylpyrrolidone (NMP, $C_5H_9NO$ anhydrous, 99.5%) were purchased from Sigma-Aldrich and used as received. Monomers 4,4'-(hexafluoroisopropylidene)diphthalic anhydride (6FDA, $C_{19}H_6F_6O_6$>99%) and 2,4-diaminomesitylene (DAM, $(CH_3)_3C_6H(NH_2)_2$>99%) were purchased from Akron Polymer Systems. The 6FDA was dried overnight at 160° C. in vacuo before use to cyclize di-acid impurities and the DAM was dried overnight at 70° C. in vacuo before use. Triethylamine ($Et_3N$, $C_6H_{15}N$ 99%) and o-dichlorobenzene (o-DCB>98%) were used as received from Fisher. Ethanol (EtOH, $C_2H_6O$ 99.5%) was used as received from VWR. The $H_2$ (HY UHP300, 100%), $CH_4$ (ME UHP300, 100%), $N_2$ (NI UHP300, 100%), $O_2$ (OX UHP300, 100%), $CO_2$ (CD UP300, 99.999%) gas cylinders were purchased from Airgas.

Synthesis of HKUST-1 Particles

For branched HKUST-1 nanoparticles, the copper precursor solution and organic ligand solution were prepared separately. Copper nitrate trihydrate (0.9 g, 3.7 mmol) and trimesic acid (0.43 g, 2 mmol) with corresponding sodium acetate concentrations (0.2, 0.6, and 1 mmol), which are 0.1, 0.3, and 0.5 molar equivalents to trimesic acid, were dissolved in separate MeOH solutions (100 mL). The two separate solutions were immediately mixed and the mixture solution was vigorously stirred (~800 rpm) at room temperature for 1 hour. The final solution was centrifuged followed by at least three washing steps with fresh MeOH (100 mL) where the MeOH was exposed to the sample for few hours at room temperature to remove unreacted monomers and chemical modulator. The HKUST-1 suspensions in MeOH were stored until use for characterization and mixed-matrix membrane formation. For bulk HKUST-1 particle synthesis, an identical procedure was used to that described above with the exception that sodium acetate was not added.

Synthesis of the 6FDA-DAM Polymer

6FDA-DAM polyimide was synthesized via the ester-acid route to afford complete imidization. The 3-necked 250 mL round bottom flask and all additional glassware were dried overnight at 200° C. before use. Glassware was removed from the oven and cooled under a nitrogen flow and monomers were cooled in a desiccator in vacuo. 6FDA (17.7695 g, 40 mmol) was transferred to the 3-necked flask with 125 mL of EtOH. The reaction flask was equipped with a mechanical stirrer, nitrogen inlet and Dean-Stark trap fitted with a condenser. The Dean-Stark trap was filled with EtOH and $Et_3N$ (10 mL) was added to the reaction flask. The reaction was heated under a nitrogen flow to reflux and stirred for 1 h. The Dean-Stark trap was drained and excess $Et_3N$ and EtOH were distilled until a viscous ester-acid solution remained. DAM (6.0088 g, 40 mmol) was added with NMP (128 mL) and o-DCB (32 mL). After EtOH and $Et_3N$ finished distilling, the Dean-Stark trap was filled with o-DCB and the reaction was heated to 175-180° C. The reaction was heated and stirred under nitrogen for 48 h to obtain a fully cyclized polyimide. The viscous polymer solution was precipitated dropwise into stirring MeOH to afford white polymer beads. Polymer beads were blended and Soxhlet extracted with MeOH overnight to remove additional NMP. The polymer was dried to a constant weight of 21.4 g (Mw=149 kDa, D=4.1, 96% yield).

Fabrication of Mixed-Matrix Membranes

HKUST-1 particles were not dried before mixing with polymer to prevent agglomeration. The solvent containing the HKUST-1 suspension was exchanged from MeOH to THF by repeated centrifugation and washing processes. For this step, the sample was centrifuged in a centrifuge tube, the supernatant was removed, and using fresh THF (100 mL) was placed on top of the sample to exchange with MeOH for few hours at room temperature. At least three centrifugations and washing steps were used to complete the solvent-exchange. To produce targeted HKUST-1 weight loadings in mixed-matrix membranes, the concentration of HKUST-1 in the stock solution was first determined by removing a small volume (0.5 ml) of the sonicated HKUST-1 suspension in THF. The volume was weighed immediately after removal before completely evaporating the solution in a vacuum oven. Once the color of HKUST-1 particles turned purple due to adsorption of atmospheric gases and vapors, the vial with the dried HKUST-1 particles was weighed again so that the approximate concentration of HKUST-1 solution could be determined. With the approximate concentrations of HKUST-1 solution known, mixed-matrix membranes were prepared as follows. The 6FDA-DAM polymer was dissolved in THF solvent, stirred with a stir bar for 3-4 h to produce a homogeneous solution. The total mass of casting solution for membrane fabrication was held constant at 0.15 g. Therefore, for the pure polymer film, 0.15 g of 6FDA-DAM polymer was used. For mixed-matrix membranes, 0.015, 0.03, and 0.045 g of HKUST-1 particles were added into 0.135, 0.12, and 0.105 g of 6FDA-DAM to produce 10, 20 and 30 wt % HKUST-1 weight loadings in mixed-matrix membranes, respectively. The HKUST-1 solution was horn-sonicated (Qsonica, Q500) for 1 min to further disperse HKUST-1 particles before mixing the HKUST-1 solution with the 6FDA-DAM polymer solution. The mixture solution was stirred for 3-4 h to uniformly disperse HKUST-1 particles in the 6FDA-DAM polymer. The mixture solution was horn-sonicated for 1 min and poured onto a glass petri dish covered by an aluminum foil cap that had small holes to permit slow evaporation of THF solvent. The film was cast in an oven at 50° C. overnight resulting in film thickness of 40-50 μm. The freestanding films were detached from the glass petri dish was dried in a vacuum oven for 24 hours to remove residual THF solvent.

Pure Gas Permeation Measurement

Pure gas permeation measurements were performed using automated, custom-built, constant volume, variable pressure pure-gas permeation systems (Maxwell Robotics). Brass shim stock disks with 47 mm outer diameter sizes and concentric inner holes were custom-machined for film supports. The films were cut into larger areas than that of the hole in the brass disks, and thicknesses of films were measured using a micrometer before making coupons. The films were placed over the support disk hole and were attached and sealed by an impermeable epoxy glue (Devcon, 5 Minute Epoxy, 14250) with a small area of film exposed. The active areas of the films were determined five times using a scanner and Image J software (NIH), and the average active area was used in permeability calculations. The films were loaded into a stainless steel filter holder for permeation experiments. Before gas permeation tests, all films were activated at 150° C. in situ under dynamic vacuum for 2 h in the permeation cell using a custom-built heating jacket (HTS/Amptek). After activation, the permeation cell was naturally cooled down overnight to bring the temperature in the permeation cell back to room temperature. To precisely control testing temperature, the permeation setup was submerged into a constant-temperature water bath that was heated at 35° C. using an immersion circulator (ThermoFisher Scientific, SC150). The leak test was performed under static vacuum by closing all valves in the permeation system and was performed before running gas permeation tests. The leak rate was subtracted from the measured gas transport rate to calculate gas permeability. Of note, the leak rate was <1% of the gas transport rate for all gas permeation tests. Pure $H_2$, $CH_4$, $N_2$, $O_2$, and $CO_2$ gases were sequentially fed for multiple pressure tests at 35° C. The first two feed pressures considered were 15 psi and 75 psi. Next, pressures were systematically increased in increments of 75 psi to 900 psi for all gases except $CO_2$, which was only tested to 750 psi due to the saturation vapor pressure of $CO_2$. To investigate hysteresis effects after pressurization, $CO_2$ gas feed pressure was decreased in increments that matched our initial pressurization steps. After finishing the depressurization steps, the sample was held under dynamic vacuum condition for 2 h. Then, a pressurization protocol identical to that of the first pressurization protocol considered was repeated. Each gas was tested for permeation for different holding times at each pressure: $H_2$ was held for 18 min, $CH_4$ for 30 min, $N_2$ for 30 min, $O_2$ for 24 min, and $CO_2$ for 3.6 min. The gas transport rates were calculated using at least six times the time-lag at each pressure point to ensure the permeation was evaluated at steady-state. The time-lag is defined as the time where the extrapolated permeate steady-state pressure rise line intercepts the time axis (x-axis) on a pressure (y-axis) versus time plot. The pure gas permeability ($P_i$) is calculated in the unit of Barrer (1 Barrer=$10^{-10}$($cm^3$ (STP)·cm)/($cm^2$·s·cmHg)) using the following equation $$P_i = \frac{Vl}{P_2 ART}\left[\left(\frac{dP_i}{dt}\right)_{ss} - \left(\frac{dP_i}{dt}\right)_{leak}\right] \quad (1)$$

where V is the calibrated downstream volume, l is the film thickness, A is the active area of the film, R is the ideal gas constant, T is the testing absolute temperature, $(dP_i/dt)_{ss}$ is the gas transport rate at steady-state, and $(dP_i/dt)_{leak}$ is the leak rate. The ideal gas selectivity (α) is calculated as the ratio of two pure gases permeabilities ($P_i/P_j$). Assuming that the gas transport properties of the films are governed by the solution-diffusion model, the permeability can be expressed as the following equation (2)

$$\bar{P} = \bar{S} \cdot \bar{D} \quad (2)$$

where $\overline{D}$ is the effective diffusivity (cm²/s) and $\overline{S}$ is the effective solubility (cm³(STP)/cm³·atm). The diffusivity can be determined using the time-lag method as the following equation (3)

$$D = \frac{l^2}{6\theta} \quad (3)$$

where l is the film thickness and θ is the time-lag. Using the calculated diffusivities (D) in Table 4 and permeabilities (P) in Table 3, the solubilities (S) were determined based on the solution-diffusion model in Table 5. The diffusivity-selectivities and solubility-selectivities were calculated as the ratio of two pure gases diffusivities ($D_i/D_j$) and selectivities ($S_i/S_j$), respectively. The uncertainties for permeabilities, diffusivities, and selectivities were calculated using by a propagation of error approach using 1) standard deviations of film thickness, active area and downstream volumes, and 2) measurement uncertainties of pressure, temperature and gas transport rates.

TABLE 3

|  | $P(H_2)$ (Barrer) | $P(CH_4)$ (Barrer) | $P(N_2)$ (Barrer) | $P(O_2)$ (Barrer) | $P(CO_2)$ (Barrer) | $P(CO_2)/P(CH_4)$ | $P(CO_2)/P(N_2)$ | $P(H_2)/P(CH_4)$ | $P(H_2)/P(N_2)$ | $P(O_2)/P(N_2)$ |
|---|---|---|---|---|---|---|---|---|---|---|
| 6FDA-DAM | 640 ± 20 | 49 ± 2 | 55 ± 2 | 182 ± 6 | 970 ± 30 | 19.9 ± 1.1 | 17.7 ± 0.9 | 13.1 ± 0.7 | 11.7 ± 0.6 | 3.3 ± 0.2 |
| 10% bulk HKUST-1/6FDA-DAM MMM | 1010 ± 40 | 77 ± 3 | 82 ± 3 | 270 ± 10 | 1450 ± 50 | 18.8 ± 1.0 | 17.7 ± 0.9 | 13.2 ± 0.7 | 12.4 ± 0.6 | 3.3 ± 0.2 |
| 20% bulk HKUST-1/6FDA-DAM MMM | 1270 ± 40 | 109 ± 4 | 112 ± 4 | 340 ± 12 | 1690 ± 60 | 15.5 ± 0.8 | 15.1 ± 0.7 | 11.6 ± 0.6 | 11.3 ± 0.6 | 3.0 ± 0.2 |
| 30% bulk HKUS-1/6FDA-DAM MMM | 1710 ± 60 | 158 ± 5 | 162 ± 5 | 490 ± 16 | 2360 ± 80 | 14.9 ± 0.7 | 14.6 ± 0.7 | 10.8 ± 0.5 | 10.6 ± 0.5 | 3.0 ± 0.1 |
| 10% branched HKUST-1/6FDA-DAM MMM | 990 ± 40 | 87 ± 3 | 90 ± 3 | 290 ± 11 | 1600 ± 60 | 18.4 ± 0.9 | 17.8 ± 0.9 | 11.4 ± 0.6 | 11.0 ± 0.6 | 3.2 ± 0.2 |
| 20% branched HKUST-1/6FDA-DAM MMM | 1180 ± 40 | 110 ± 4 | 117 ± 4 | 360 ± 13 | 1920 ± 70 | 17.4 ± 0.9 | 16.4 ± 0.8 | 10.7 ± 0.5 | 10.1 ± 0.5 | 3.1 ± 0.2 |
| 30% branched HKUST-1/6FDA-DAM MMM | 1510 ± 50 | 150 ± 5 | 152 ± 5 | 460 ± 16 | 2480 ± 80 | 16.5 ± 0.8 | 16.3 ± 0.8 | 10.1 ± 0.5 | 10.0 ± 0.5 | 3.0 ± 0.1 |

TABLE 4

|  | $D(H_2)$ | $D(CH_4)$ | $D(N_2)$ | $D(O_2)$ | $D(CO_2)$ | $D(CO_2)/D(CH_4)$ | $D(CO_2)/D(N_2)$ | $D(H_2)/D(CH_4)$ | $D(H_2)/D(N_2)$ | $D(O_2)/D(N_2)$ |
|---|---|---|---|---|---|---|---|---|---|---|
| 6FDA-DAM | 400 ± 200 | 6.00 ± 0.11 | 21.7 ± 0.8 | 54 ± 4 | 35 ± 2 | 5.8 ± 0.3 | 1.6 ± 0.1 | 60 ± 30 | 18 ± 9 | 2.5 ± 0.2 |
| 10% bulk HKUST-1/6FDA-DAM MMM | 300 ± 200 | 12.0 ± 0.4 | 42 ± 3 | 100 ± 20 | 100 ± 16 | 8.0 ± 1.3 | 2.2 ± 0.4 | 30 ± 10 | 8 ± 4 | 2.3 ± 0.4 |
| 20% bulk HKUST-1/6FDA-DAM MMM | 1000 ± 2000 | 11.0 ± 0.3 | 34 ± 2 | 68 ± 9 | 110 ± 20 | 10 ± 2 | 3.2 ± 0.7 | 100 ± 200 | 33 ± 67 | 2.0 ± 0.3 |
| 30% bulk HKUS-1/6FDA-DAM MMM | 340 ± 100 | 18.1 ± 0.6 | 54 ± 4 | 110 ± 15 | 160 ± 30 | 9 ± 2 | 3.0 ± 0.7 | 19 ± 8 | 6 ± 3 | 2.0 ± 0.3 |
| 10% branched HKUST-1/6FDA-DAM MMM | 400 ± 200 | 9.5 ± 0.3 | 30 ± 2 | 90 ± 13 | 57 ± 5 | 6.0 ± 0.6 | 1.9 ± 0.2 | 40 ± 30 | 14 ± 8 | 3.1 ± 0.5 |
| 20% branched HKUST-1/6FDA-DAM MMM | 500 ± 600 | 9.1 ± 0.3 | 33 ± 3 | 80 ± 15 | 70 ± 10 | 8 ± 1 | 2.1 ± 0.4 | 60 ± 70 | 16 ± 18 | 2.5 ± 0.5 |

TABLE 4-continued

| | D(H$_2$) | D(CH$_4$) | D(N$_2$) | D(O$_2$) | D(CO$_2$) | D(CO$_2$)/ D(CH$_4$) | D(CO$_2$)/ D(N$_2$) | D(H$_2$)/ D(CH$_4$) | D(H$_2$)/ D(N$_2$) | D(O$_2$)/ D(N$_2$) |
|---|---|---|---|---|---|---|---|---|---|---|
| 30% branched HKUST-1/6FDA-DAM MMM | 1000 ± 2000 | 10.1 ± 0.3 | 37 ± 2 | 90 ± 11 | 70 ± 7 | 6.7 ± 0.7 | 1.8 ± 0.2 | 100 ± 170 | 29 ± 47 | 2.3 ± 0.3 |

TABLE 5

| | S(H$_2$) | S(CH$_4$) | S(N$_2$) | S(O$_2$) | S(CO$_2$) | S(CO$_2$)/ S(CH$_4$) | S(CO$_2$)/ S(N$_2$) | S(H$_2$)/ S(CH$_4$) | S(H$_2$)/ S(N$_2$) | S(O$_2$)/ S(N$_2$) |
|---|---|---|---|---|---|---|---|---|---|---|
| 6FDA-DAM | 1.3 ± 0.7 | 6.2 ± 0.2 | 1.9 ± 0.1 | 2.6 ± 0.2 | 21 ± 1 | 3.4 ± 0.3 | 11.0 ± 0.9 | 0.2 ± 0.1 | 0.7 ± 0.4 | 1.3 ± 0.1 |
| 10% bulk HKUST-1/6FDA-DAM MMM | 2.0 ± 1.3 | 4.9 ± 0.2 | 1.5 ± 0.1 | 2.1 ± 0.4 | 12 ± 2 | 2.4 ± 0.4 | 8.0 ± 1.4 | 0.5 ± 0.3 | 1.6 ± 0.9 | 1.5 ± 0.3 |
| 20% bulk HKUST-1/6FDA-DAM MMM | 0.9 ± 1.8 | 7.5 ± 0.3 | 2.5 ± 0.2 | 3.8 ± 0.5 | 12 ± 2 | 1.6 ± 0.3 | 5.0 ± 1.0 | 0.1 ± 0.2 | 0.3 ± 0.7 | 1.5 ± 0.2 |
| 30% bulk HKUS-1/6FDA-DAM MMM | 4.0 ± 1.7 | 6.6 ± 0.3 | 2.3 ± 0.2 | 3.4 ± 0.5 | 11 ± 2 | 1.7 ± 0.4 | 5.0 ± 1.0 | 0.6 ± 0.3 | 1.7 ± 0.8 | 1.5 ± 0.3 |
| 10% branched HKUST-1/6FDA-DAM MMM | 1.8 ± 1.1 | 7.0 ± 0.4 | 2.3 ± 0.2 | 2.3 ± 0.3 | 21 ± 2 | 3.1 ± 0.3 | 10.0 ± 1.1 | 0.3 ± 0.2 | 0.8 ± 0.5 | 1.0 ± 0.2 |
| 20% branched HKUST-1/6FDA-DAM MMM | 1.7 ± 2.0 | 9.0 ± 0.4 | 2.7 ± 0.2 | 3.3 ± 0.6 | 21 ± 3 | 2.3 ± 0.4 | 8.0 ± 1.4 | 0.2 ± 0.2 | 0.6 ± 0.8 | 1.2 ± 0.3 |
| 30% branched HKUST-1/6FDA-DAM MMM | 1.1 ± 1.8 | 11.3 ± 0.5 | 3.2 ± 0.2 | 4.1 ± 0.6 | 28 ± 3 | 2.5 ± 0.3 | 9.0 ± 1.1 | 0.1 ± 0.2 | 0.3 ± 0.6 | 1.3 ± 0.2 |

The Maxwell Model (4) was used to predict theoretical gas transport properties of the mixed-matrix membranes.

$$P_{eff} = P_c \left[ \frac{nP_d + (1-n)P_C - (1-n)\Phi_d(P_C - P_d)}{nP_d + (1-n)P_C + n\Phi_d(P_C - P_d)} \right] \quad (4)$$

where $P_{eff}$ is the effective gas permeability, $P_c$ is the gas permeability of the continuous phase (polymer matrix), $P_d$ is the gas permeability of dispersed phase (HKUST-1 particles), n is the shape factor, and $\Phi_d$ is the volume fraction of dispersed phase in the mixed-matrix membrane. The volume fractions were calculated from the weight loadings using a density of pure HKUST-1 crystals.

At high feed pressures, non-ideal gas-phase behavior needed to be considered, especially for gases such as $CO_2$. For this reason, fugacity (f) was calculated to provide a more accurate assessment of permeability. The fugacity-based permeability was calculated as the following equation (5)

$$P_i = \frac{Vl}{fART} \left[ \left( \frac{dP_i}{dt} \right)_{ss} - \left( \frac{dP_i}{dt} \right)_{leak} \right] \quad (5)$$

Where f is the fugacity of the gas feed.

The fugacity was estimated using the virial equation including second and third virial coefficients at 35° C. The gas-phase activity ($f/f_{sat}$) was calculated using the estimated fugacity divided by the estimated fugacity at the theoretical saturation pressure point for $CO_2$ at 35° C. using the data table from NIST. Note that $CO_2$ is a supercritical gas at this temperature, so the extrapolation was conducted by extrapolating saturation fugacity through the critical point when plotting the ln of fugacity as a function of $T^{-1}$.

Characterization

Nuclear magnetic resonance (NMR) spectroscopy was performed using an Ascend™ 500 spectrometer (Bruker) with TopSpin™ 3.2. $^1$H-NMR spectra were collected at 500 MHz. All spectra were obtained from 1-5% (w/v) 0.7 mL solutions in DMSO-d$_6$. Gel permeation chromatography (GPC) measurements were performed by Intertek (Allentown, Pa.) with a Waters 2695 chromatographic system, THF mobiles phase and refractive index detection. Solutions were analyzed using a polystyrene/divinylbenzene column set manufactured by Agilent Technologies. Sample solutions were prepared as 2 mg/mL in THF and filtered using 0.45 μm nylon filters. Samples were hand shaken until fully dissolved. Molecular weight values were measured using online light scattering and intrinsic viscosity signals. Narrow polystyrene standards ranging from 6 M to 162 Daltons were used for calibration. Fourier transform infrared (FT-IR)

spectra were collected by Alpha II FT-IR spectrometer (Bruker) with attenuated total reflection (ATR) accessories using a resolution of 4 cm$^{-1}$ with 32 scans. TGA measurement was performed using a TA instrument (TGA500) with a 20° C./min heating rate for MOF powders and MOF mixed-matrix membranes. To determine the mass of residual metal oxides after complete burnoff of the MOF, the MOF powders were first activated at 150° C. for 2 h under nitrogen atmosphere in the TGA furnace, which is the same condition used for activation in gas permeation measurements. Next, the furnace was cooled down to room temperature, and once the temperature stabilized, a ramp was run up to 700° C. with a 20° C./min heating rate under an air atmosphere. The final product was pure metal oxides due to oxidation. To determine actual MOF weight loadings in mixed-matrix membranes, the same protocol was carried out for MOF mixed-matrix membranes. With a polymer matrix completely decomposed and only metal oxides left at 700° C. under an air atmosphere, the ratio of final weight (mixed-matrix membranes)/final weight (MOFs powders) was determined and is reported herein as a percentage for weight loadings. Glass transition temperatures were determined using a TA Instruments differential scanning calorimeter (DSC250) from the third trace of a cyclic heating protocol run between room temperature and 420° C. at a heating rate of 20° C./min. Number-averaged particle size distribution was obtained from dynamic light scattering (DLS) analysis. The dilute MOF suspensions in MeOH were sonicated to uniformly disperse MOF particles before DLS measurement at 35° C. with a Zetasizer Nano S90 (Marvern). The diffuse reflectance of MOF powders was measured by UV-vis spectrophotometer (Perkin Elmer Lambda 1050). For UV-vis sample preparation, the MOF powders were fully filled in a circle-type powder pellet cell, which is designed for measurements with solid samples. Raman spectra were obtained using a Renishaw Invia Reflex Micro Raman spectroscopy equipped with charge coupled device (CCD) camera with 532 nm laser and 1200 l/mm grating for MOF powders on a substrate. Powder X-ray diffraction (XRD) measurements were taken using a Bruker D8 Discover diffractometer equipped with a Copper tube (l=0.15418 nm) and a VANTEC-500 2-D detector. Data were recorded in the range of 5-40°. Nitrogen physisorption measurements were performed at −196° C. on a Micromeritics ASAP 2460. Prior to the measurements, all samples were degassed at 150° C. overnight under vacuum in a Micromeritics Smart VacPrep. The apparent surface areas were determined with the Brunauer-Emmett-Teller (BET) method in the range between P/P0 of 0.02-0.10. The t-plot method was used to estimate the micropore volume ($V_{mic}$). Transmission electron microscope (TEM) images were obtained using a FEI Tecnai (G2 Spirit TWIN) operating at 120 kV. A drop of the dilute MOF solution in MeOH with less than 0.5% concentration was cast on a copper TEM grid and the TEM grid was naturally dried for a few hours to completely evaporate MeOH solvent. Cross-sectional field emission scanning electron microscope (FE-SEM) images of films were collected using a FE-SEM instrument (Zeiss Merlin). The films were cryogenically fractured into two pieces in liquid-nitrogen to observe the cross-section. The cross-section of films was sputtered by gold (Au) to make a thin conductive layer (3~5 nm) onto non-conductive films to dissipate charge. To observe smoother cross-sections, focused ion beam scanning electron microscope (FIB-SEM) imaging was carried out using a FEI Helios Nanolab 600 Dual Beam System with gallium (Ga)-ion milling. The film surface was similarly coated by gold (Au) using the sputtering machine to make the thin conductive layer with the same thickness. Using e-beam position, the thin, rectangular platinum (Pt) layer was coated and, after the sample was tilted at 52°, the underneath position of that Pt layer was Ga-ion milled using a regular cross-section with a suitable beam current such as 6.5 nA. Additional Ga-ion milling with a lower current using a cleaning cross-section was performed to create a smooth cross-section before imaging. Note that all films regardless of HKUST-1 morphology were investigated with the same protocol and condition for consistent FIB-SEM imaging. For FIB-SEM tomographic reconstruction, the electron beam was used to deposit a protective Pt/C mixture (ca. 250 nm) over the area to be sectioned as well as an adjacent square area for positioning reference. A Ga-ion beam was then used to deposit a platinum layer (ca. 1 µm) over these same regions and to carve an X shape into the positioning square. The initial trench was milled using an acceleration voltage of 30 kV and a current of 2.5 nA. A final milling step at lower current (30 kV, 80 pA) was used to generate a smooth cross-sectional surface and to remove material damaged during the initial trenching. The FEI-provided software routine was then used to collect micrograph sections with a lateral spacing of 5 nm. The SEM was operated in backscatter mode (3 kV, 0.4 nA) using the through-the-lens detection system to increase contrast between materials with different atomic weights in the final collection of micrographs. The Avizo software package (FEI) was used for data processing, during which the images were aligned, cropped, and assembled into a stack. An adaptive histogram equalization routine was used to remove artifacts from depth-shadowing, and a frequency domain FFT filter was used to remove curtaining artifacts. Adaptive 3D histogram and edge detection routines were combined with smart thresholding techniques to find the edges of large intensity changes, and then a noise reduction routine was used to eliminate single-pixel regions. The different intensity regimes were assigned to polymer material, copper material, or void regions (bubbles), then the 3D reconstructed file was generated for the copper material network. Open-source software (Blender) was used to generate the final images of the 3D tomographic reconstruction for the copper network.

Example 2

This example describes the synthesis and characterization of branched nanoparticles of the metal-organic framework ZIF-8. In this example, triethylamine was used as a chemical modulator during the synthesis of the ZIF-8 branched nanoparticles. Triethylamine has a higher pKa value and better solubility in methanol than does sodium acetate. Metal precursor was prepared by dissolving 0.5 g of zinc nitrate hexahydrate ($Zn(NO_3)_2$ $6H_2O$, 1.68 mmol) in 20 mL of methanol (0.99 mmol), and ligand precursor was prepared by dissolving 0.5 g of 2-methylimidazole ($C_4H_6N_2$, 6.10 mmol). At room temperature and ambient pressure, the ligand solution was poured into the stirring metal solution. Immediately following mixing, 0.2 mL of pure triethylamine (1.43 mmol) was added dropwise. The reaction solution was stirred at 600 rpm for 1 hour to produce multi-dimensional ZIF-8 nanoparticles. Particles were purified by washing with methanol and centrifugation of the suspension at 11,000 rpm for 90 minutes. Between each washing and centrifugation step, particles were re-suspended into 40 mL of fresh methanol, sonicated by indirect sonication for 30 minutes, direct sonication for 90 s, and treated with a vortex instrument at 2000 rpm for more than 2 hours. Three washing steps were used for each sample. The multi-dimensional branched ZIF-8 nanoparticles had a previously unobserved surface termination which resulted in different dispersion behavior in solvents. Branched ZIF-8 nanoparticles were suspended in various solvents, each in a different glass vial. The solvents used were dichloromethane, chloroform (solubility parameter of 9.2 $(cal/cm^3)^{1/2}$), tetrahydrofuran (solubility parameter of 9.3 $(cal/cm^3)^{1/2}$), dimethylformamide (solubility parameter of 12.1 $(cal/cm^3)^{1/2}$), and methanol (solubility parameter of 14.5 $(cal/cm^3)^{1/2}$). For most solvents considered, it was challenging to form stable ZIF-8 suspensions, but uniform dispersions could be formed in dimethylformamide (DMF), which is also a good solvent for use in making casting solutions for certain polymers, such as certain polyimide polymers.

Example 3

This example describes the fabrication and characterization of mixed-matrix membranes containing branched nanoparticles of the metal-organic framework ZIF-8.

A 6FDA-DAM polymer matrix was used to fabricate mixed-matrix membranes containing branched ZIF-8 nanoparticles. The branched, multi-dimensional ZIF-8 nanoparticles described in Example 2 (hereafter referred to as branched ZIF-8 or BZ) showed a small hierarchical particle size (approximate 60 nm) and uniform distribution in the 6FDA-DAM polymer matrix. As a result, the BZ/6FDA-DAM MMM appeared transparent. On the other hand, the rhombic dodecahedral ZIF-8 particles (referred as RDZ), which were used as a control sample, had a 100-500 nm particle size, and agglomeration was observed when it was mixed with a 6FDA-DAM polymer matrix to form a RDZ/6FDA-DAM MMM. This agglomeration of the RDZ particles resulted in reduced transparency of the films, with the RDZ-6FDA-DAM sample appearing opaque due to a higher reflective index. Additionally, membranes containing commercial ZIF-8 particles (referred to as CZ) were fabricated (referred as CZ/6FDA-DAM MMM). The CZ/6FDA-DAM MMM exhibited significant aggregation of MOF particles, resulting in noticeable patterns on the film. Therefore, the BZ and RDZ mixed matrix membrane samples were used for making mixed-matrix membranes to precisely compare the structural effects of MOF particles on the transport properties.

Cross-sectional SEM images of BZ/6FDA-DAM MMMs with various BZ loadings (10, 20, 30, and 40 wt %) were acquired. The films were fractured into two pieces in liquid nitrogen. The cross-section SEM image of the 10 wt % BZ/6FDA-DAM MMM exhibited a bumpy torn cross-section with high roughness due to enhanced matrix elongation while fracturing films in liquid nitrogen. However, as BZ MOF loading was increased, the cross-sections appeared smooth because of immediate fracturing without significant matrix elongation. Higher magnification cross-sectional SEM were acquired and demonstrated that the FE-SEM images of BZ/6FDA-DAM MMMs exhibited uniform MOF distributions regardless of the MOF loading.

Figure 16B:
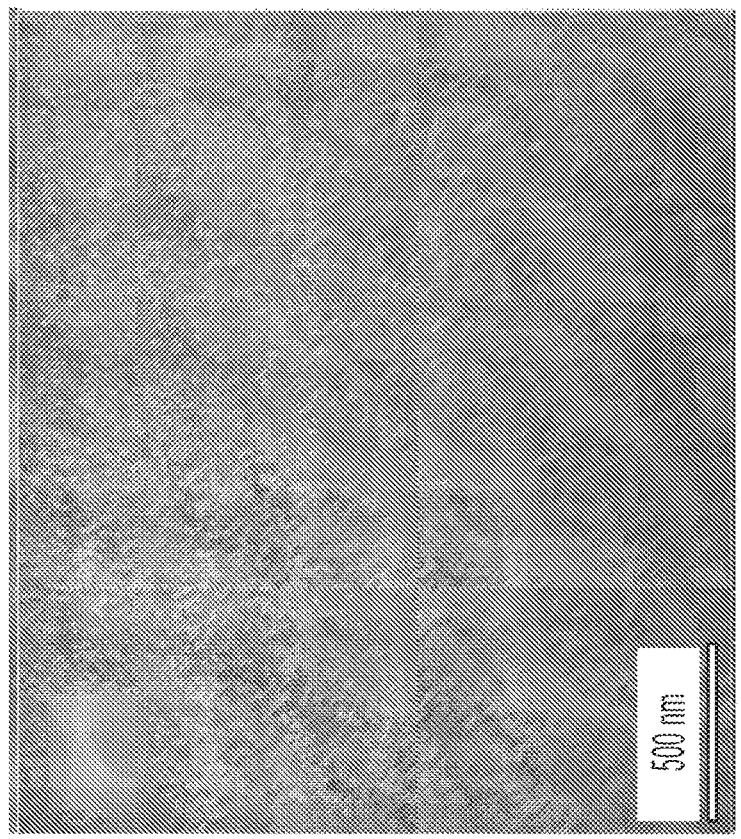
FIGS. 16A-16B include FIB-SEM images of a rhombic dodacahedral ZIF-8/6FDA-DAM mixed-matrix membrane (FIG. 16A) and a branched ZIF-8/6FDA-DAM mixed-matrix membrane, in accordance with certain embodiments.
Figure 16A:
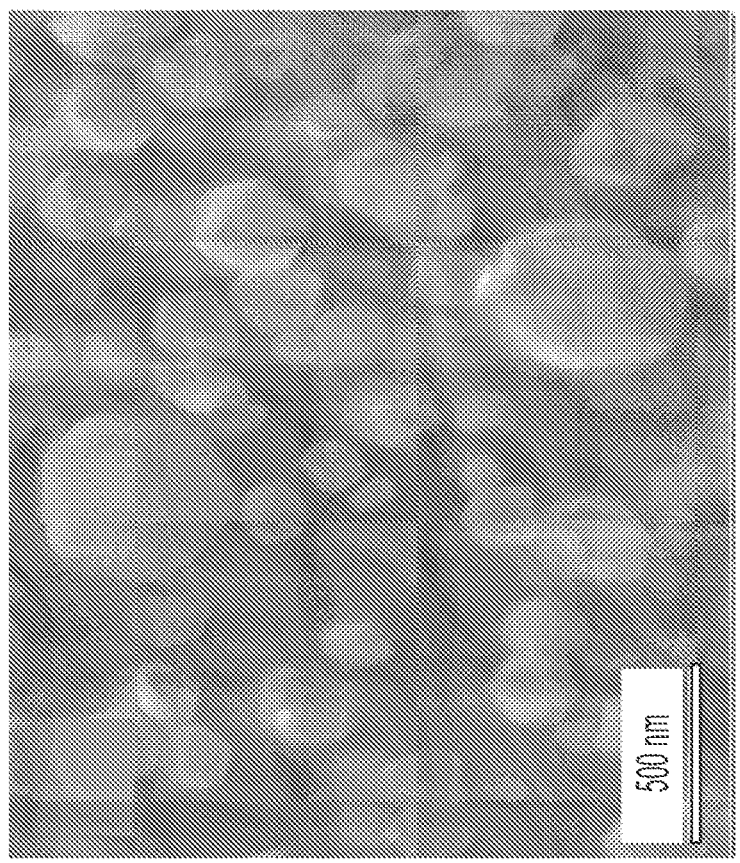
Figure 17B:
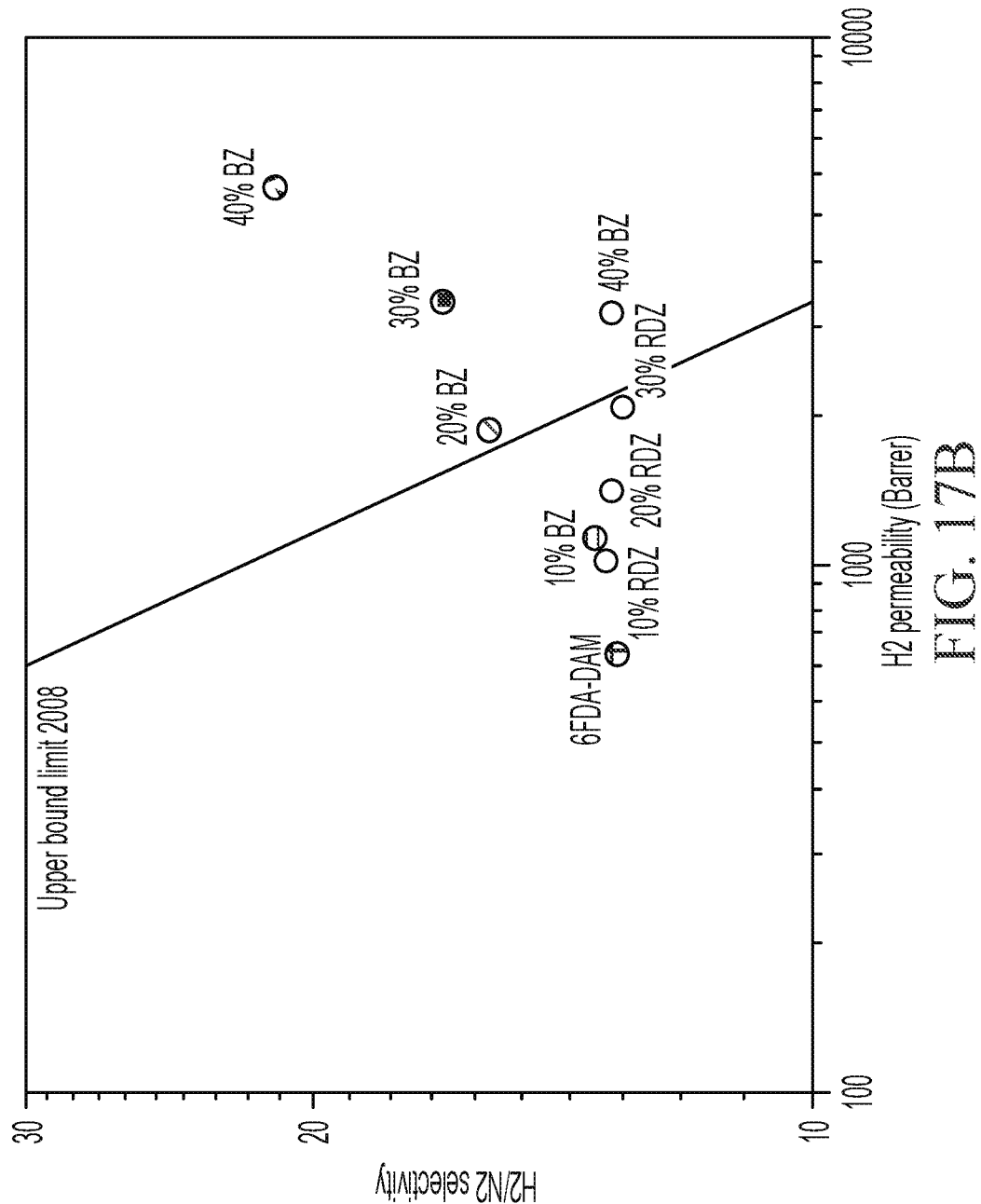
Figure 17C:
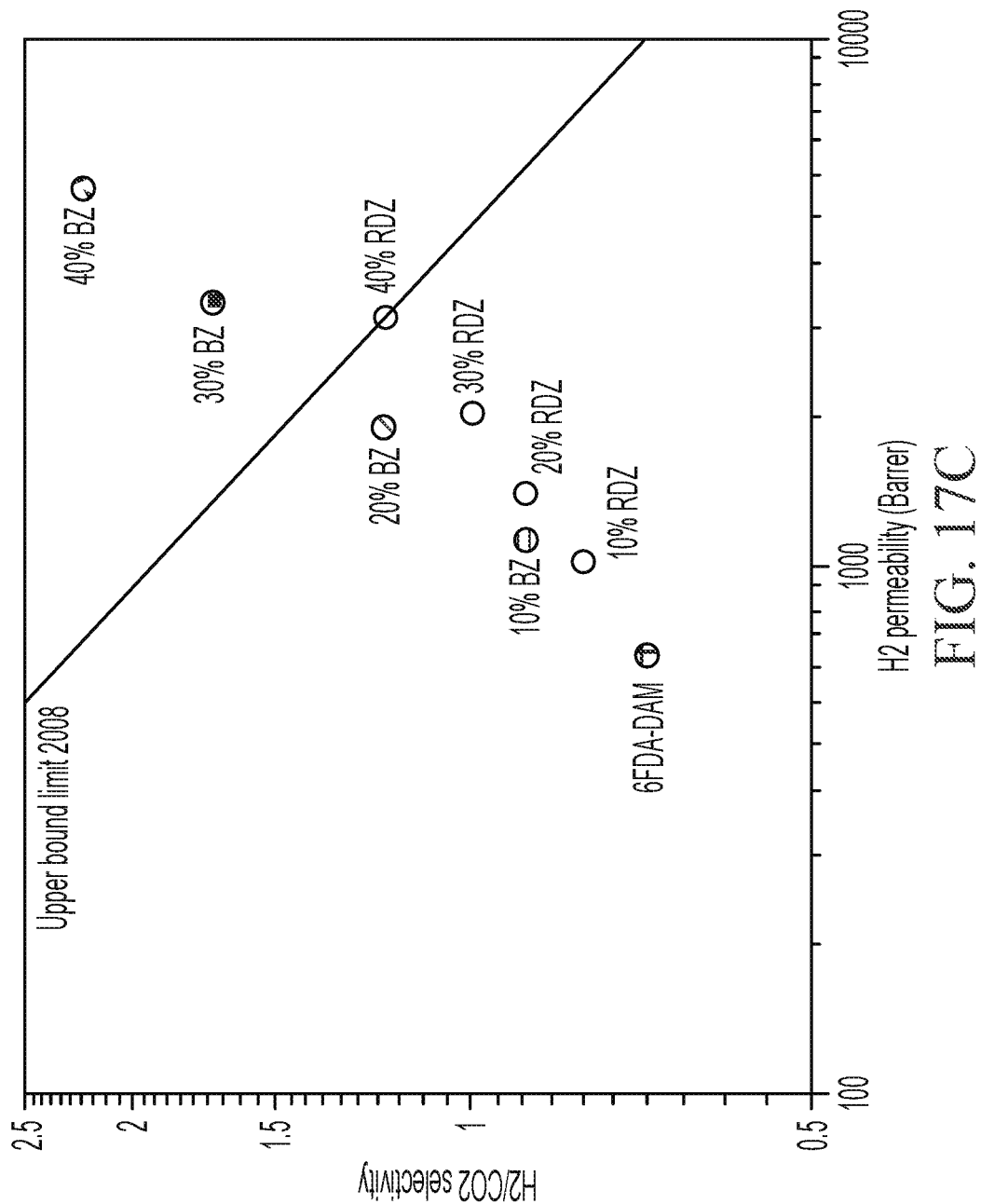
Figure 17D:
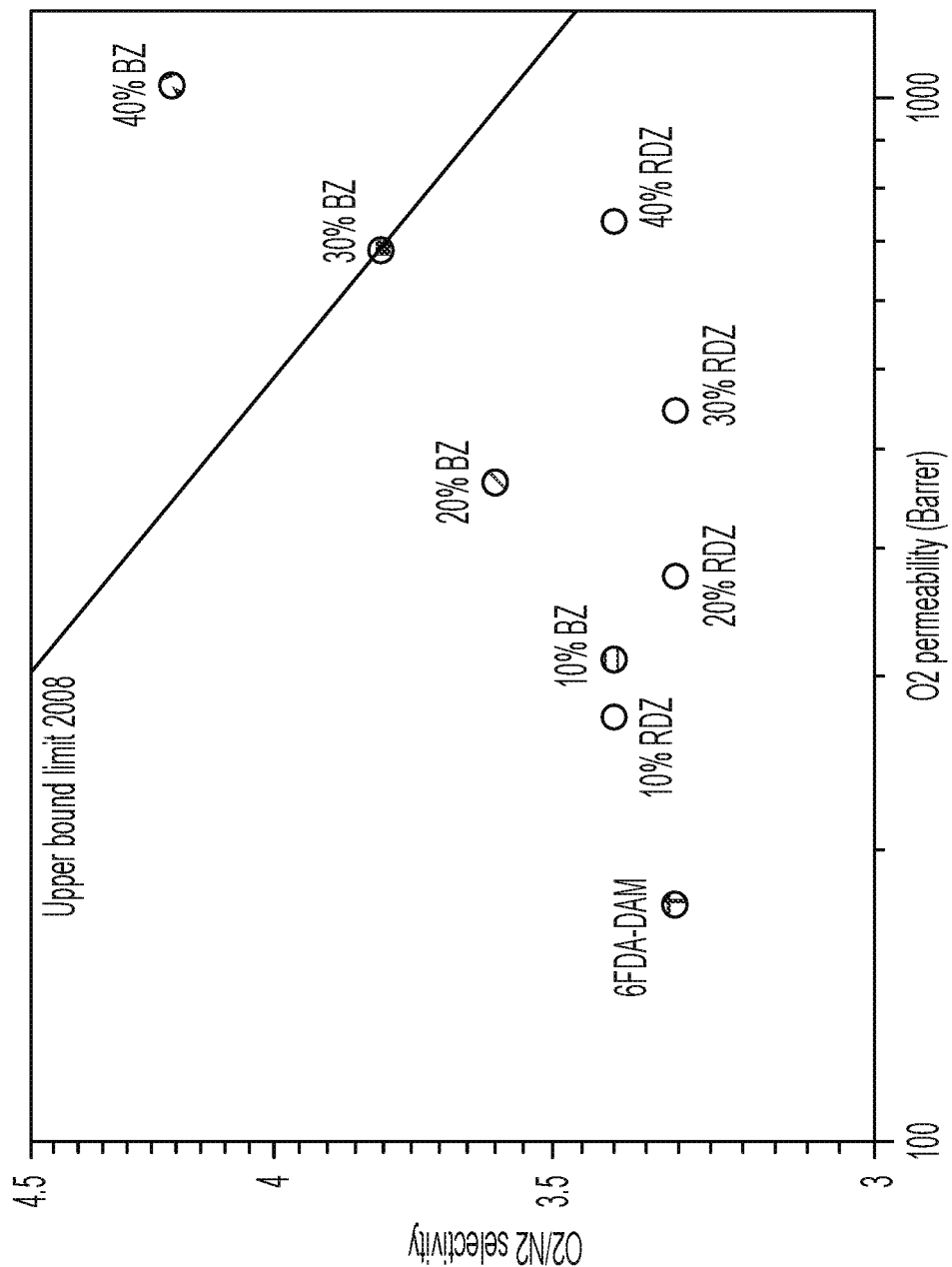

To further investigate the dispersion of the branched ZIF-8 particles in the membranes and whether they formed a percolation network, FIB-SEM imaging was performed on the 30 wt % RDZ/6FDA-DAM MMM and the 30 wt % BZ/6FDA-DAM MMM. FIG. 16A shows a FIB-SEM image showing that the 30 wt % RDZ/6FDA-DAM MMM contained roughly spherical ZIF-8 nanoparticles (100-500 nm) in a 6FDA-DAM polymer matrix. At this weight loading, when accounting for the density of ZIF-8 (0.97 g cm$^{-3}$) and 6FDA-DAM (1.3 g cm$^{-3}$), the RDZ nanoparticles were determined to have a volume fraction loading of 36%. Nevertheless, the 30 wt % RDZ/6FDA-DAM MMM did not show clear evidence of a percolation network in the FIB-SEM images. It is possible that the polymer interacts favorably with the RDZ ZIF-8 particles, providing a coating layer on the MOFs during casting, which prevents particle-particle contact. Such a feature is useful for preventing defects, but also precludes the ability to surpass Maxwell Model expectations for transport properties in MMMs. On the other hand, FIG. 16B shows a FIB-SEM image showing that the 30 wt % BZ/6FDA-DAM MMM exhibited a percolation network and maintained a uniform distribution across the entire film. It is possible that such a percolation network, which results from the interconnected structural features of the branched ZIF-8 nanoparticles, causes an increase gas transport properties.

To investigate transport performance, permeation tests for a pure 6FDA-DAM polymeric film, RDZ/6FDA-DAM MMMs, and BZ/6FDA-DAM MMMs were performed for light gas separations ($H_2$ separations over $CH_4$, $N_2$, and $CO_2$, and $O_2/N_2$ separation) at 35° C. and 15 psi. The MMMs used various MOF loadings (10, 20, 30, and 40 wt %). The permeation test results are shown in FIGS. 17A-D. As MOF loading increased, there was observed an increase in selectivities for the BZ/6FDA-DAM MMMs, while the RDZ/6FDA-DAM MMMs showed approximately constant selectivities. This surprising result indicated that the branched ZIF-8 samples had molecular sieving behavior for gases smaller than those traditionally considered for separations with this material, such as propylene/propane separations. The kinetic diameters of gases considered increases in the following order: $H_2$ (2.89 Å)<$CO_2$ (3.30 Å)<$O_2$ (3.46 Å)<$N_2$ (3.64 Å)<$CH_4$ (3.80 Å). Based on the findings presented in FIG. 17D, a molecular sieving window for $O_2/N_2$ separations was available for the BZ/6FDA-DAM membranes, which suggested that the BZ sample had an effective pore aperture between the size of $O_2$ and $N_2$. Notably, the mixed-matrix membranes containing the branched ZIF-8 nanoparticles achieved selectivities with light gases such as $H_2/N_2$ of greater than 15 and even greater than 20. Without wishing to be bound by any particular theory, It is believed that the chemical modulator (triethylamine) was incorporated into the ZIF-8 MOF crystal structure of the BZ particles, resulting in a smaller effective pore aperture either by tethering to the organic multidentate ligand (2-methylimidazole) or inhibiting the gate opening/closing effect (flexibility)

Example 4

This example describes attempts to synthesize branched ZIF-8 nanoparticles in methanol using a variety of different possible chemical modulators. The different chemical modulators tested were pyridine ($pK_a$=5.44 in methanol, $pK_a$=5.22 in $H_2O$), aniline ($pK_a$=6.05 in methanol, $pK_a$=4.6 in $H_2O$), p-phenylenediamine (pPDA, $pK_a$=6.2 in $H_2O$), 4-ethoxyaniline (p-phenetidine, $pK_a$=6.92 in methanol, $pK_a$=5.32 in $H_2O$), N,N-dimethylpropargylamine ($pK_a$=7.97 in methanol, $pK_a$=8.04 in $H_2O$), sodium formate ($pK_a$=8.87 in methanol), sodium acetate ($pK_a$=9.63 in methanol), sodium propionate ($pK_a$=9.71 in methanol), trimethylamine (TMA, $pK_a$=9.8 in methanol, $pK_a$=9.74 in $H_2O$), triethylamine ($pK_a$=10.78 in methanol, $pK_a$=10.67 in $H_2O$), diethylamine ($pK_a$=11.2 in methanol, $pK_a$=10.72 in $H_2O$), tri-n-butylamine (TBA, $pK_a$=10.89 in $H_2O$), and n-butylamine ($pK_a$=11.48 in methanol, $pK_a$=10.6 in $H_2O$). The ZIF-8 nanoparticles were synthesized by the same procedure described in Example 2 using different structural modulators at the same molar amount; ligand source (0.5 g of $C_4H_6N_2$ dissolved in 20 mL of methanol) was poured in metal source (0.5 g of $Zn(NO_3)\cdot 6H_2O$) dissolved in 20 mL of methanol). 1.43 mmol of each modulator was added dropwise (or was dissolved into the ligand solution before mixing if the modulator was in the solid state), and stirred under ambient conditions for an hour, then washed with fresh methanol three times as described in Example 2.

Figure 18B:
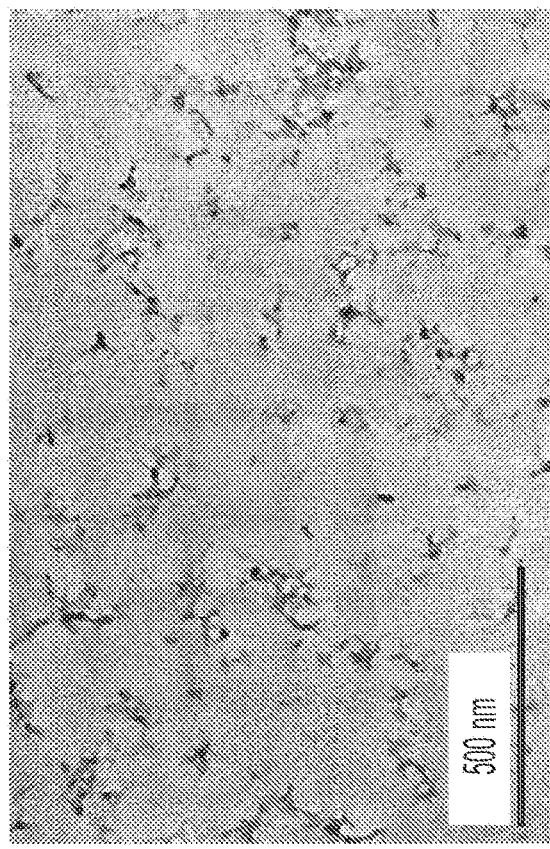
FIGS. 18A-18B are TEM images of ZIF-8 particles formed in the presence of pyridine (FIG. 18A) and triethylamine (FIG. 18B), in accordance with certain embodiments.
Figure 18A:
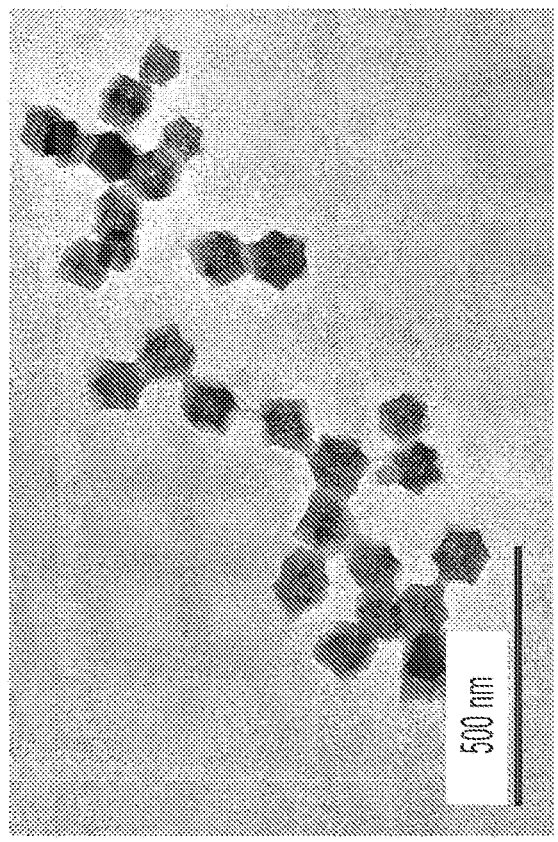

It was observed that ZIF-8 nanoparticles synthesized using pyridine, aniline, pPDA, sodium formate, sodium acetate, and sodium propionate were not branched, instead having the RDZ morphology described above in Example 2. It was observed that branched ZIF-8 nanoparticles were formed when any one of the following were used as a chemical modulator: trimethylamine, triethylamine, diethylamine, tri-butylamine, and n-butylamine. FIG. 18 shows images of ZIF-8 nanoparticles formed in the presence of aniline (FIG. 18A, not branched) and triethylamine (FIG. 18B, branched). It was observed that each of the chemical modulators that had a $pK_a$ greater than or equal to the $pK_a$ of the basic nitrogen of the 2-methyl imidazolate ($pK_a$ of approximately 7.97) multidentate ligands of the ZIF-8 MOFs resulted in the formation of branched ZIF-8 nanoparticles. This result indicates that in some instances, and without wishing to be bound by any particular theory, use of a chemical modulator having $pK_a$ that is greater than or equal to the pKa of a moiety of the multidentate ligand that binds to the metal ion in the metal-organic framework can contribute to the formation of the branched morphology of the branched MOF nanoparticles.

X-ray photoelectron spectroscopy was also performed on RDZ and BZ ZIF-8 nanoparticles, with the BZ particles have been synthesized using triethylamine as a chemical modulator. The XPS data was used to determine the molar percentages of elements in the two types of nanoparticles, as summarized in Table 6.

TABLE 6

| Molar % | C1s | N1s | O1s | $Zn2p_{3/2}$ |
|---|---|---|---|---|
| RDZ | 66.57 | 19.71 | 4.47 | 10.25 |
| BZ | 54.95 | 26.54 | 3.51 | 15 |

As can be seen in Table 6, a significant difference in composition between the RDZ and BZ ZIF-8 nanoparticles. Coordination of the triethylamine chemical modulator to the zinc ions in the BZ nanoparticles could explain the difference in composition.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A device, comprising:
    a mixed-matrix membrane comprising:
        a matrix comprising a polymer; and
        particles comprising a metal-organic framework, the metal-organic framework comprising a metal ion and a multidentate ligand;
    wherein the particles are uniformly distributed throughout the matrix, convective transport is not detectable by permeation measurements, and wherein the particles are branched nanoparticles having:
        a hydrodynamic diameter of less than or equal to 2 µm when measured by dynamic light scattering in methanol,
        an aspect ratio of at least 5, and
        branches having a largest diameter of less than or equal to 200 nm.

2. The device of claim 1, wherein essentially all of the matrix is composed of the polymer.

3. The device of claim 1, wherein the multidentate ligand comprises at least two carboxylate groups.

4. The device of claim 2, wherein the metal ion is copper.

5. The device of claim 1, wherein the metal-organic framework is HKUST-1.

6. The device of claim 1, wherein the multidentate ligand comprises imidazolate.

7. The device of claim 1, wherein the metal ion is zinc.

8. The device of claim 1, wherein the metal-organic framework is a zeolitic imidazolate framework.

9. The device of claim 1, wherein the metal-organic framework is ZIF-8.

10. The device of claim 1, wherein the particles form a percolation network in the mixed-matrix membrane.

11. The device of claim 1, wherein the device is capable of separating a portion of a first gas from a gas mixture comprising the first gas and a second gas.

12. The device of claim 1, wherein the mixed-matrix membrane has a plasticization pressure point with respect to a gas that is at least 1.5 times greater than that of a substantially identical membrane that lacks the particles.

13. The device of claim 12, wherein the gas comprises $CO_2$, ethylene, ethane, propane, and/or propylene.

14. The device of claim 1, wherein the polymer comprises a polyimide.

15. The device of claim 12, wherein the polyimide has the following structure:

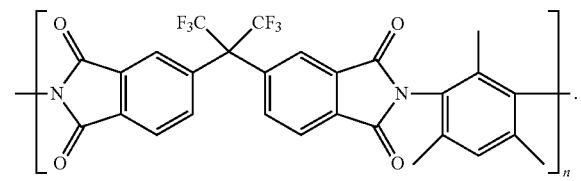

16. The device of claim 1, wherein the branched nanoparticles comprise an amine associated with the metal-organic framework.

17. A method, comprising contacting the device of claim 1 with a gas mixture comprising a first gas and a second gas such that a portion of the first gas is separated from the gas mixture.

18. A composition, comprising:
    branched nanoparticles comprising a metal-organic framework, the metal-organic framework comprising a metal ion and a multidentate ligand,
    wherein the branched nanoparticles have a hydrodynamic diameter of less than or equal to 2 µm when measured by dynamic light scattering in methanol, an aspect ratio of at least 5, and branches having a largest diameter of less than or equal to 200 nm, and
    wherein the composition is constructed and arranged as a gas separation membrane.

19. A method, comprising:
    combining a metal salt comprising a metal ion, a multidentate ligand, and a chemical modulator in a liquid to form branched nanoparticles, the branched nanoparticles comprising a metal-organic framework, the metal-organic framework comprising the metal ion and the multidentate ligand,
    wherein the metal salt, multidentate ligand, and/or chemical modulator are selected such that the presence of at least 0.1 equivalents of the chemical modulator with respect to the concentration of the multidentate ligand increases the aspect ratio of the branched nanoparticles by at least a factor of 3 with respect to particles formed under identical conditions in the absence of the chemical modulator,
    the method further comprising combining the branched nanoparticles with a polymer to form a mixed-matrix membrane comprising a polymer network.

* * * * *

UNITED STATES PATENT AND TRADEMARK OFFICE
CERTIFICATE OF CORRECTION

PATENT NO. : 11,827,647 B2
APPLICATION NO. : 17/251129
DATED : November 28, 2023
INVENTOR(S) : Smith et al.

Page 1 of 1

It is certified that error appears in the above-identified patent and that said Letters Patent is hereby corrected as shown below:

In the Claims

At Column 37, Line 34, Claim 4:
"The device of claim 2, wherein the metal ion is copper."
Should read:
-- The device of claim 1, wherein the metal ion is copper. --

And

At Column 38, Line 5, Claim 15:
"The device of claim 12, wherein the polyimide has the following structure:

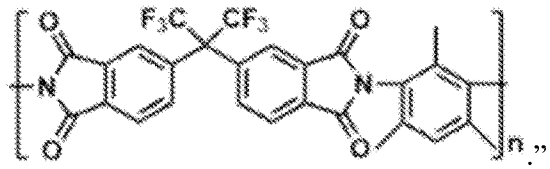
."
Should read:
-- The device of claim 14, wherein the polyimide has the following structure:

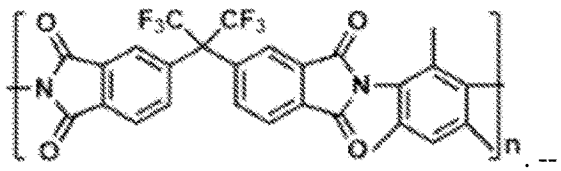
. --

Signed and Sealed this
Thirty-first Day of December, 2024

Derrick Brent
*Acting Director of the United States Patent and Trademark Office*